US011483567B2

(12) United States Patent
Paluri et al.

(10) Patent No.: US 11,483,567 B2
(45) Date of Patent: Oct. 25, 2022

(54) METHOD AND APPARATUS FOR PROCESSING VIDEO SIGNALS ON BASIS OF INTER PREDICTION

(71) Applicant: LG ELECTRONICS INC., Seoul (KR)

(72) Inventors: Seethal Paluri, Seoul (KR); Mehdi Salehifar, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/278,478

(22) PCT Filed: Sep. 23, 2019

(86) PCT No.: PCT/KR2019/012354
§ 371 (c)(1),
(2) Date: Mar. 22, 2021

(87) PCT Pub. No.: WO2020/060366
PCT Pub. Date: Mar. 26, 2020

(65) Prior Publication Data
US 2022/0038707 A1  Feb. 3, 2022

Related U.S. Application Data

(60) Provisional application No. 62/735,028, filed on Sep. 22, 2018.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11);
(Continued)

(58) Field of Classification Search
CPC .. H04N 19/137; H04N 19/105; H04N 19/132; H04N 19/159; H04N 19/176; H04N 19/46
See application file for complete search history.

(56) References Cited

U.S. PATENT DOCUMENTS

| 2015/0341637 A1 | 11/2015 | Kim et al. |
| 2019/0104319 A1* | 4/2019 | Zhang .................. H04N 19/54 |

(Continued)

FOREIGN PATENT DOCUMENTS

| KR | 1020140121022 | 10/2014 |
| KR | 1020180005119 | 1/2018 |
| KR | 1020180044269 | 5/2018 |

OTHER PUBLICATIONS

Korean Search Report in International Appln. No. PCT/KR2019/012354, dated Jan. 22, 2020, 6 pages (with English translation).
(Continued)

*Primary Examiner* — Francis Geroleo
(74) *Attorney, Agent, or Firm* — Fish & Richardson P.C.

(57) ABSTRACT

A method for processing video signals on the basis of inter prediction includes the steps of: deriving a motion vector predictor by using motion information of a neighboring block of the current block; parsing layer information for indicating the current layer, to which a motion vector difference used for the inter prediction of the current block belongs, within a predefined layer structure in which a combination of motion vector differences between one or more horizontal and vertical components is classified into a plurality of layers; parsing index information for indicating a specific combination in the current layer; deriving a motion vector difference of the current block by using the layer information and the index information; and deriving a
(Continued)

motion vector of the current block by adding the motion vector difference to the motion vector predictor.

11 Claims, 46 Drawing Sheets

(51) Int. Cl.
*H04N 19/132* (2014.01)
*H04N 19/159* (2014.01)
*H04N 19/176* (2014.01)
*H04N 19/46* (2014.01)

(52) U.S. Cl.
CPC ......... *H04N 19/159* (2014.11); *H04N 19/176* (2014.11); *H04N 19/46* (2014.11)

(56) References Cited

U.S. PATENT DOCUMENTS

2020/0213612 A1* 7/2020 Liu .................. H04N 19/537
2021/0203947 A1* 7/2021 He ................... H04N 19/54

OTHER PUBLICATIONS

LG Electronics Inc., "Vector Coding of Affine MVD," JVET-K0101, Joint Video Experts Team (JVET) of ITU-T SG 16 WP3 and ISO/IEC JTC 1/SC 29/WG11, 11$^{th}$ meeting, Ljubljana, SI, Jul. 10-18, 2018, 5 pages.

* cited by examiner

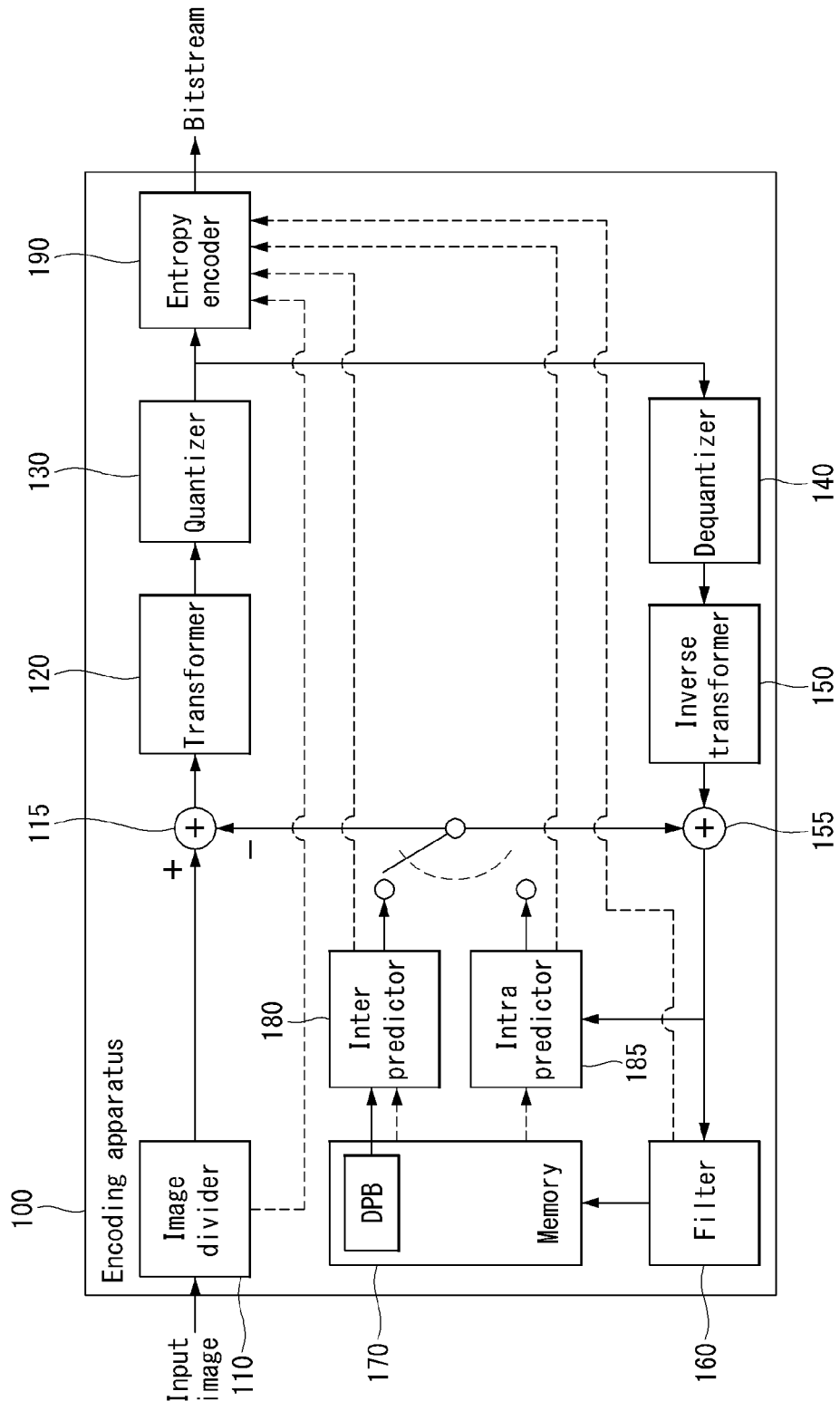
[FIG. 1]

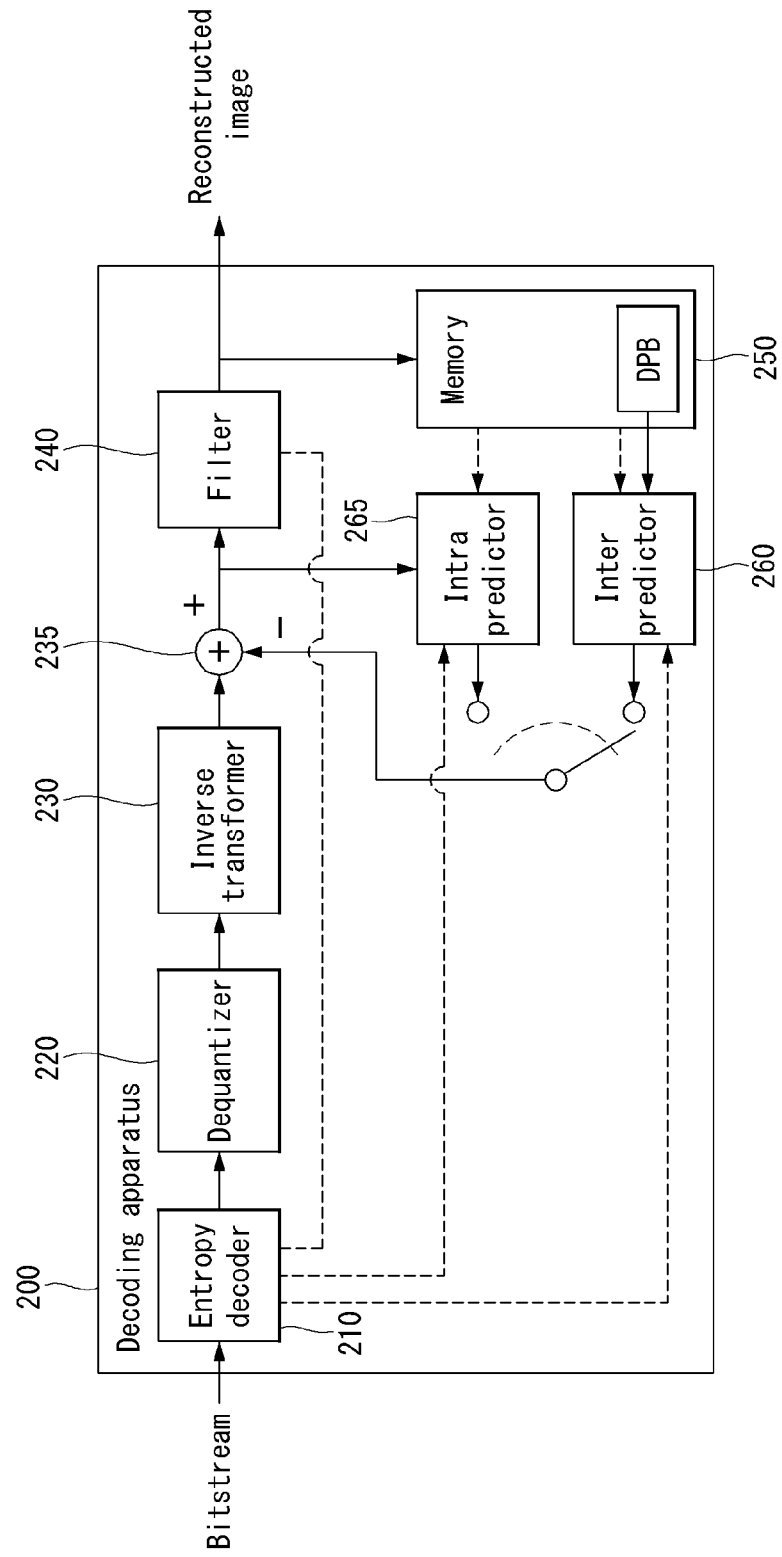
[FIG. 2]

[FIG. 3]
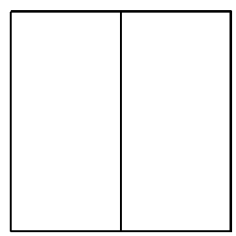  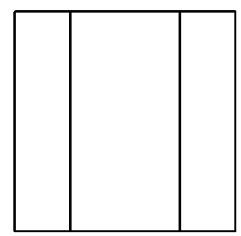 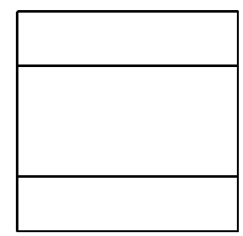
SPLIT_BT_VER   SPLIT_BT_HOR   SPLIT_TT_VER   SPLIT_TT_HOR

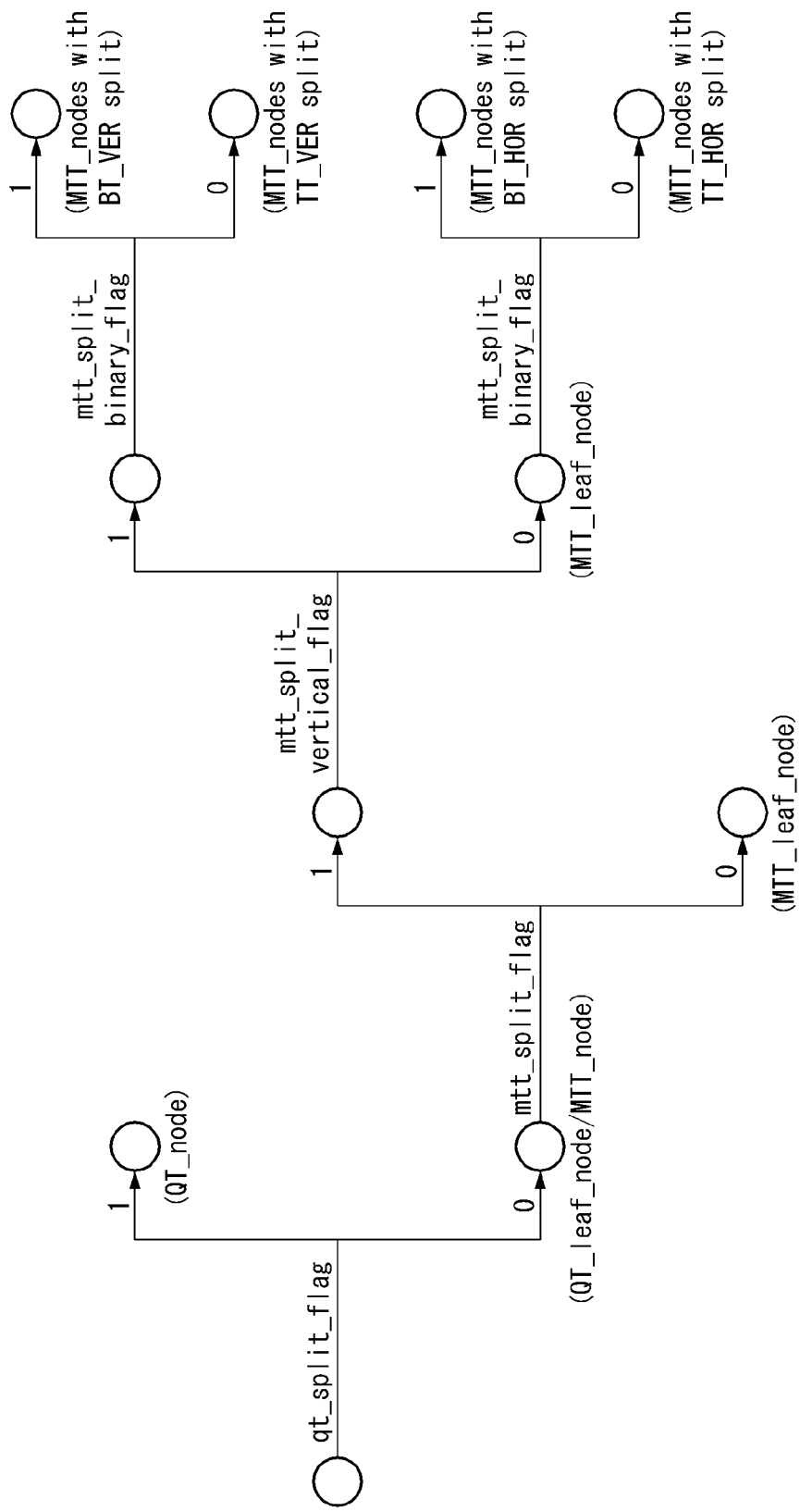
[FIG. 4]

[FIG. 5]
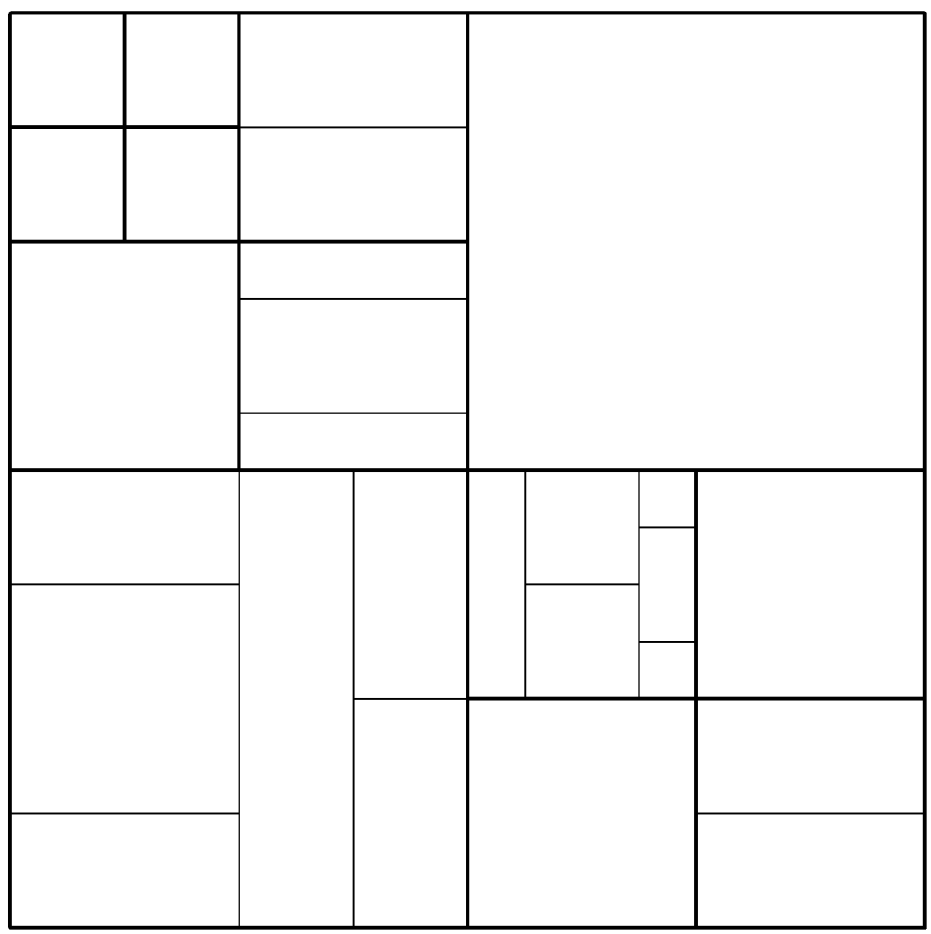

[FIG. 6]
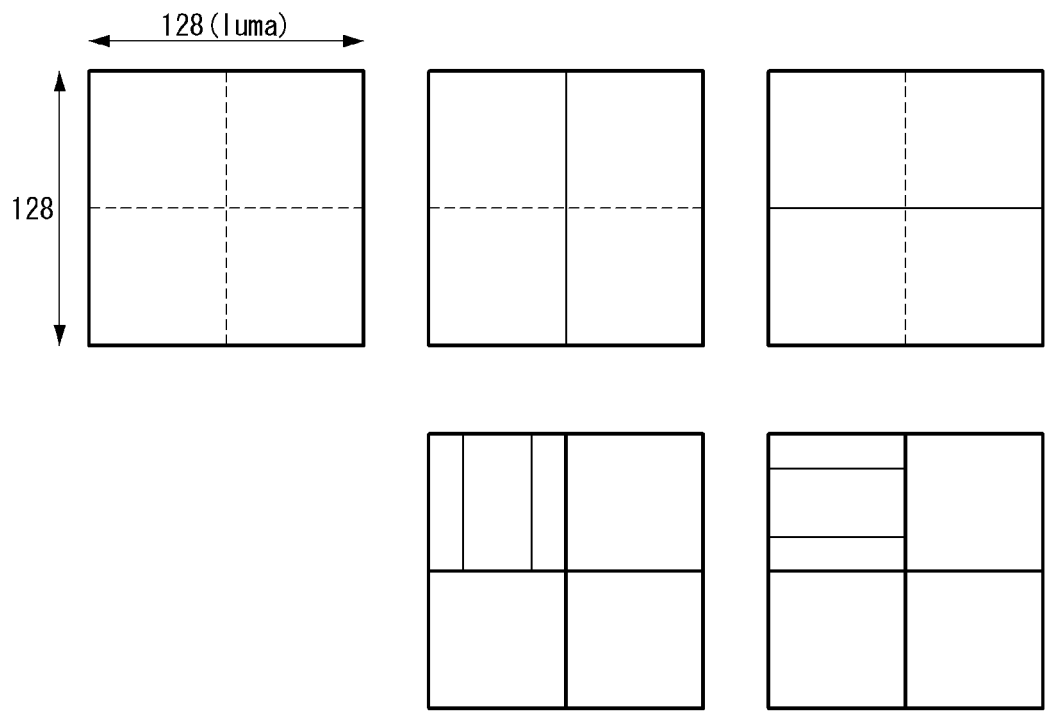

[FIG. 7]
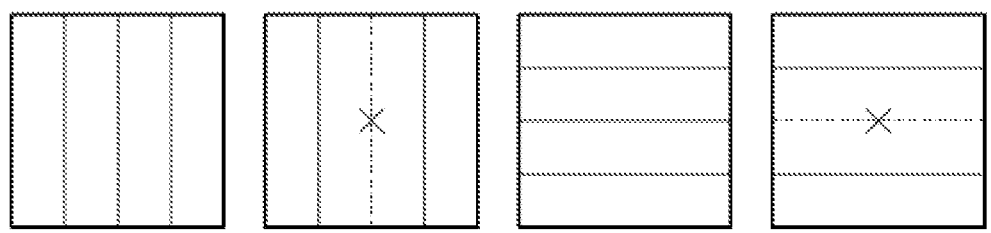

[FIG. 8]
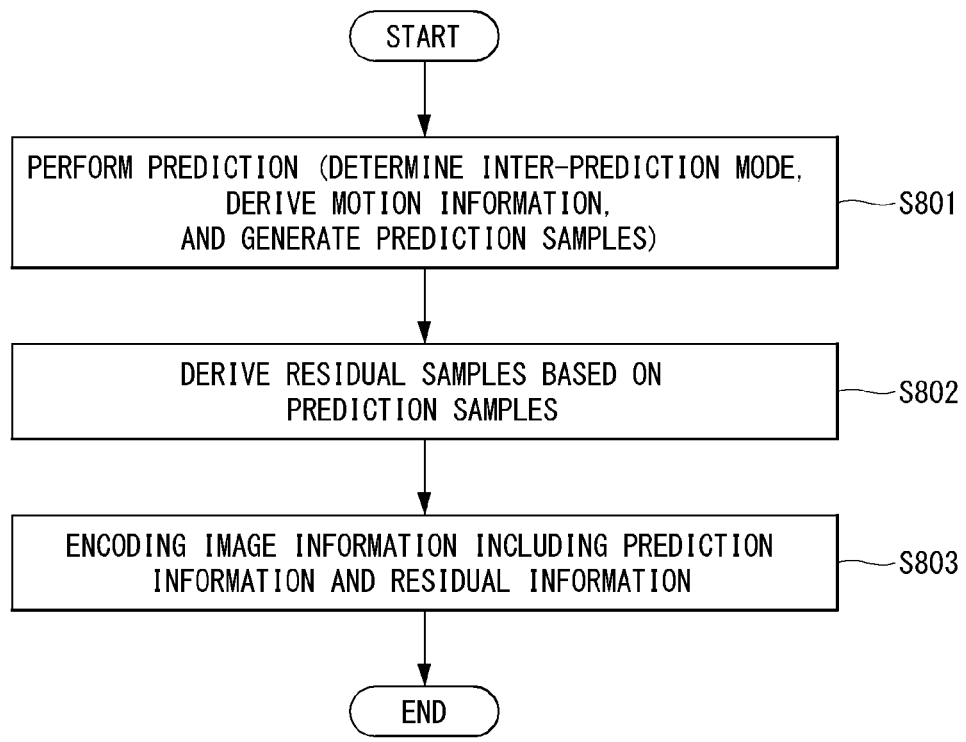

[FIG. 9]
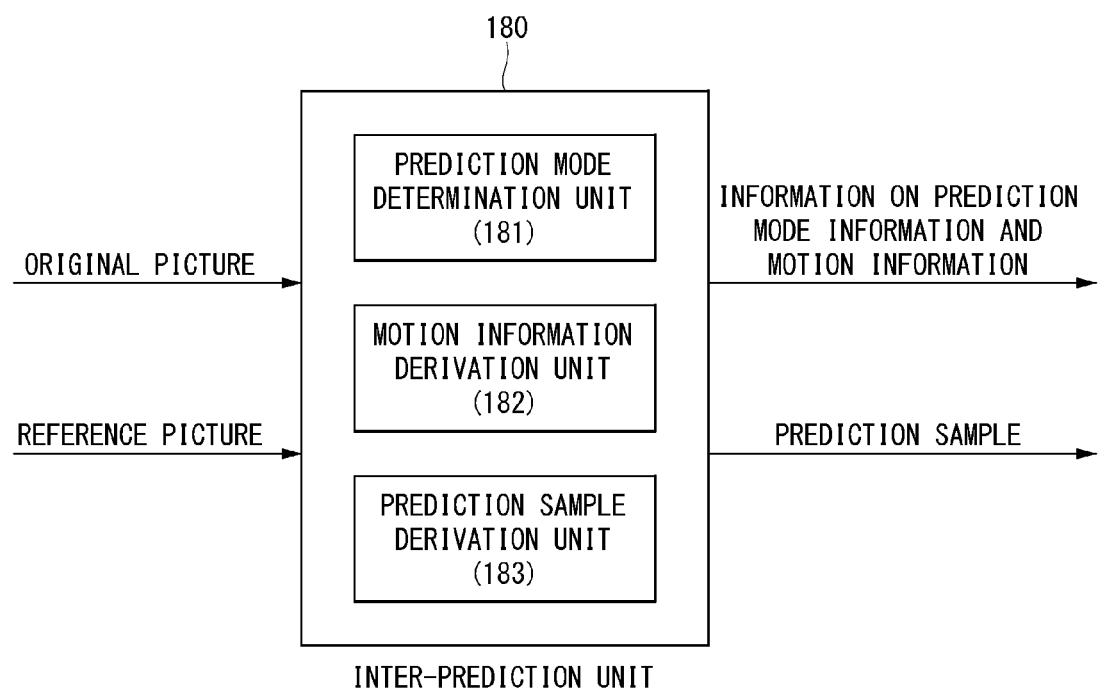

[FIG. 10]
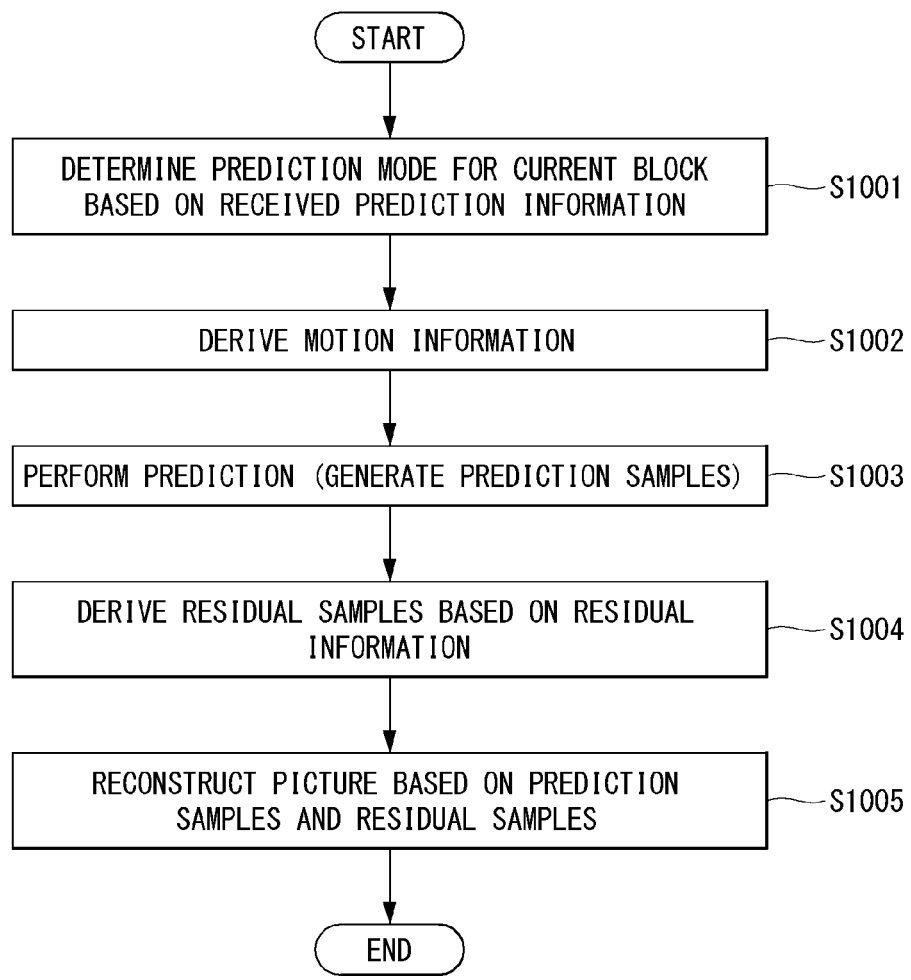

[FIG. 11]
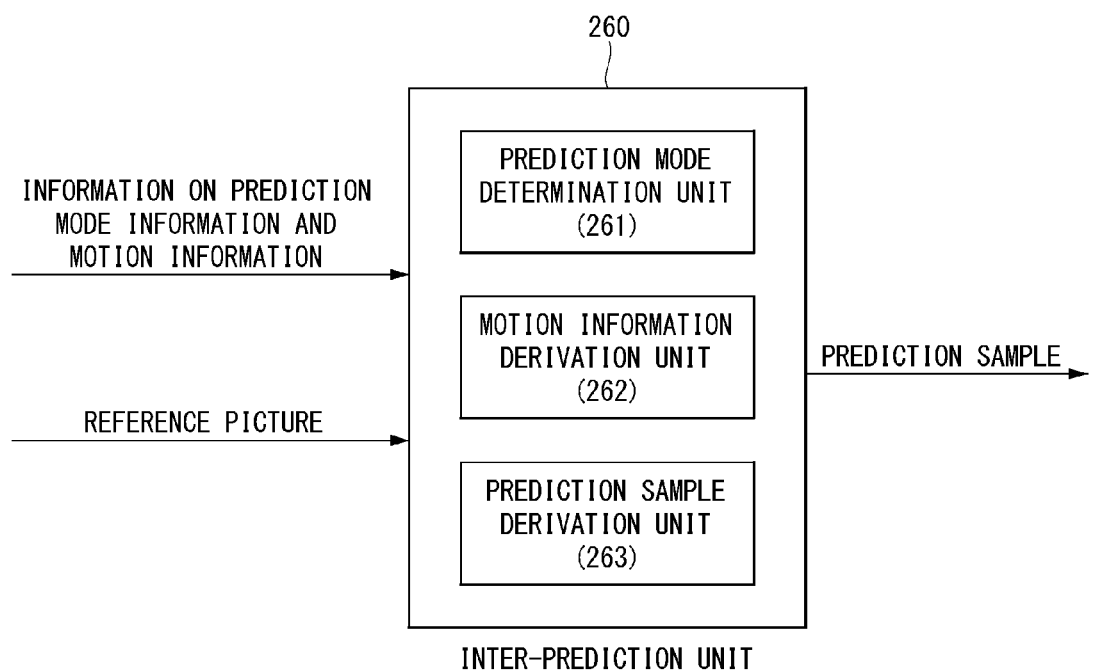
INTER-PREDICTION UNIT

[FIG. 12]
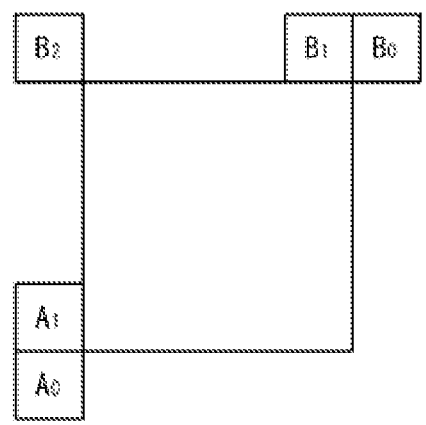

[FIG. 13]
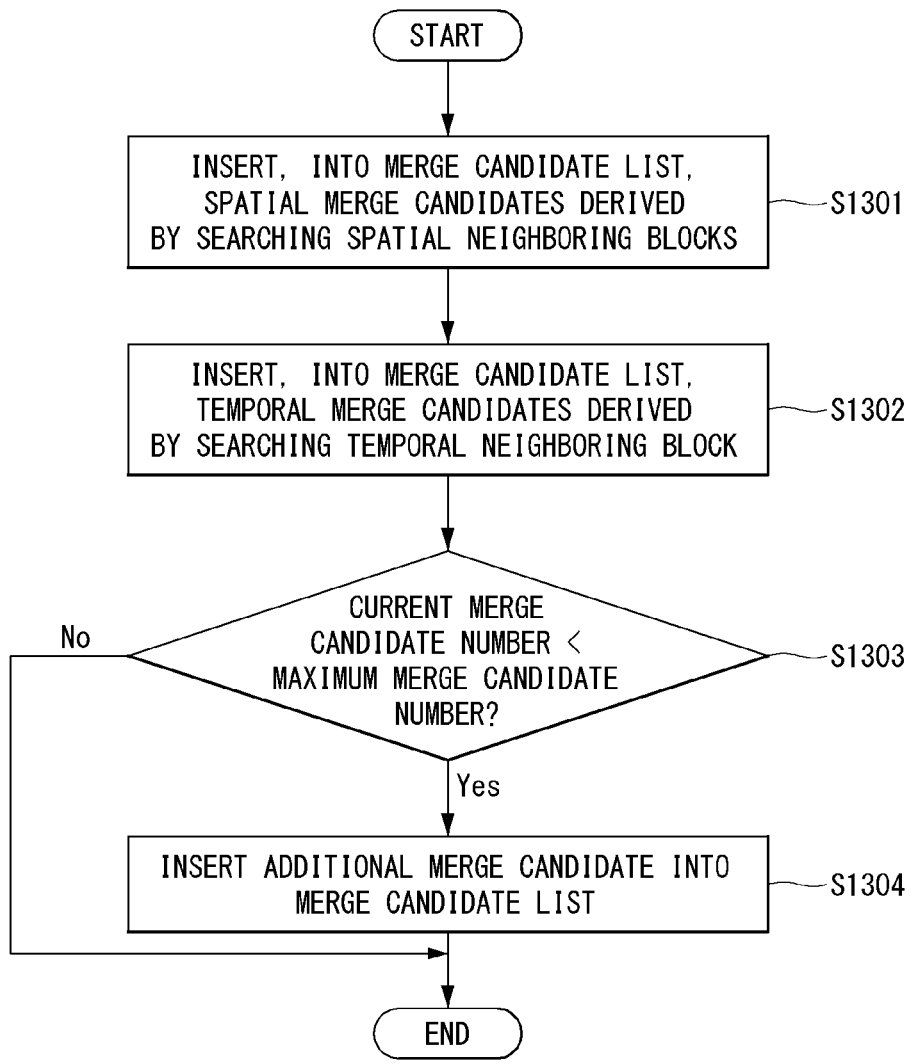

[FIG. 14]
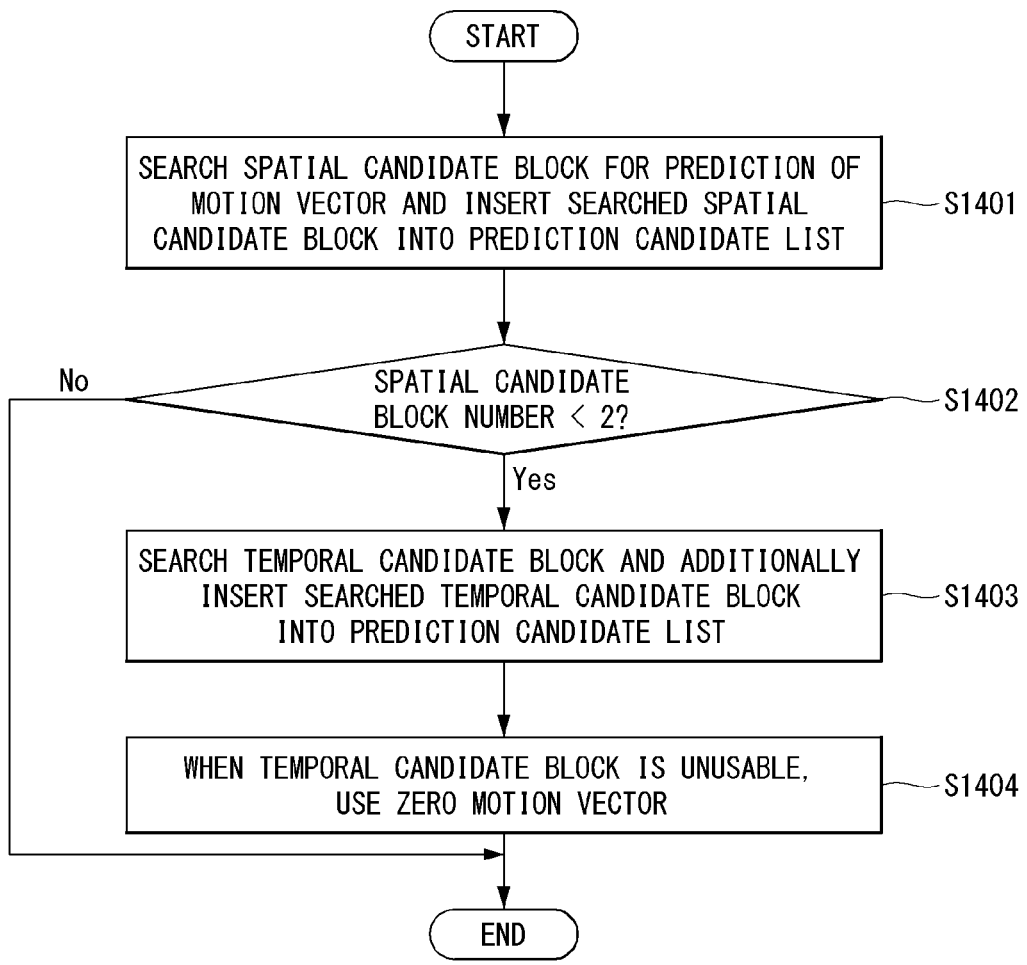

[FIG. 15]
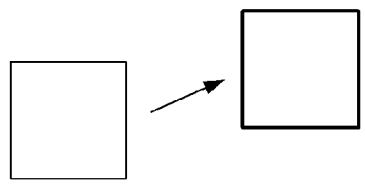
Translate
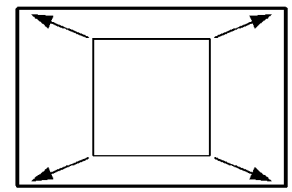
Scale
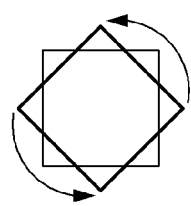
Rotate
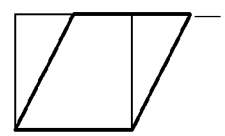
Shear
[FIG. 16]
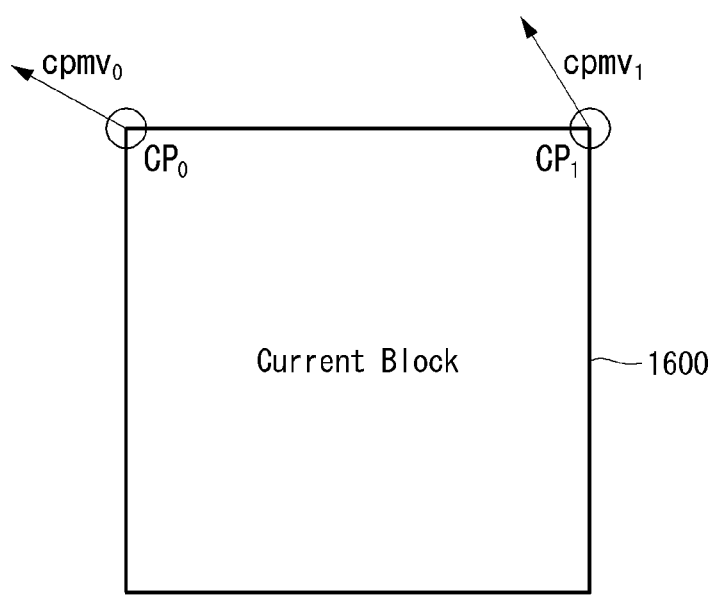

[FIG. 17]
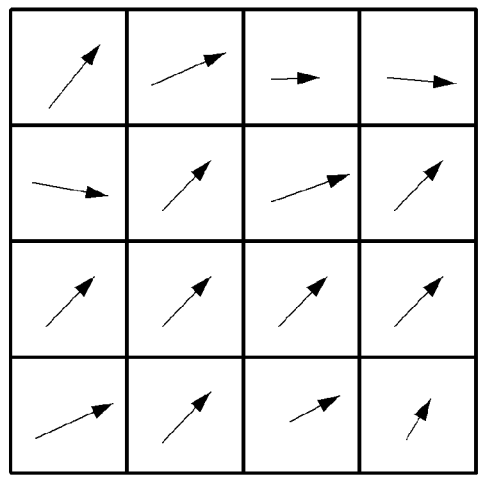
[FIG. 18]
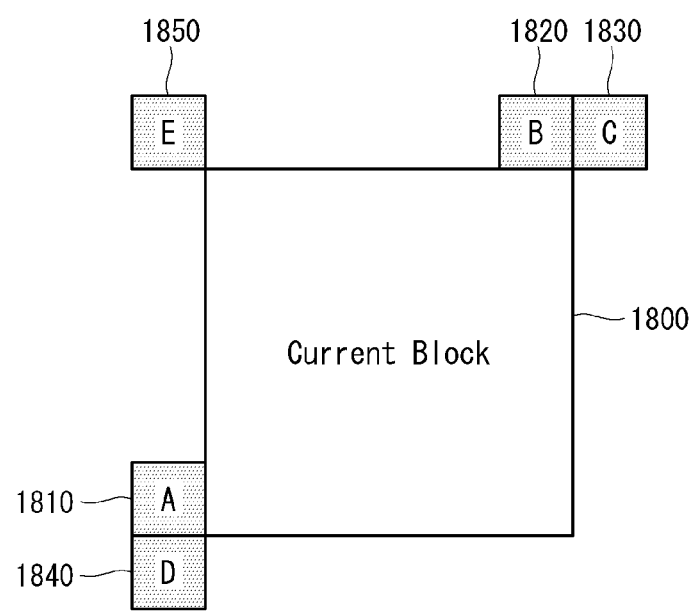

[FIG. 19]
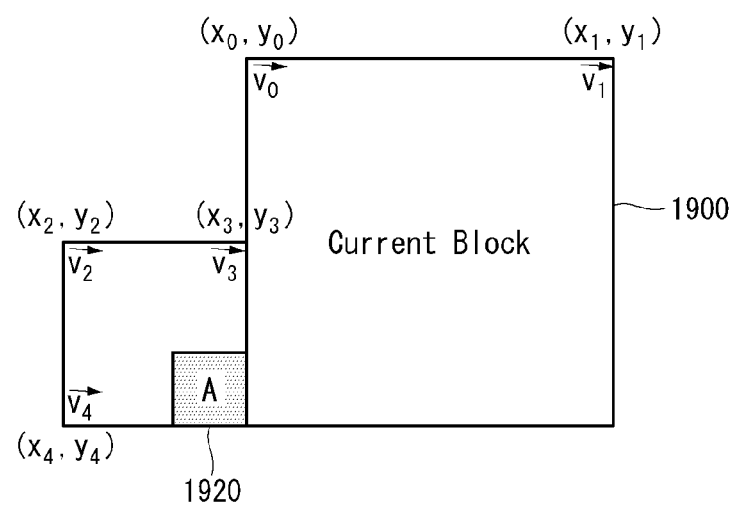

[FIG. 20]
(a) 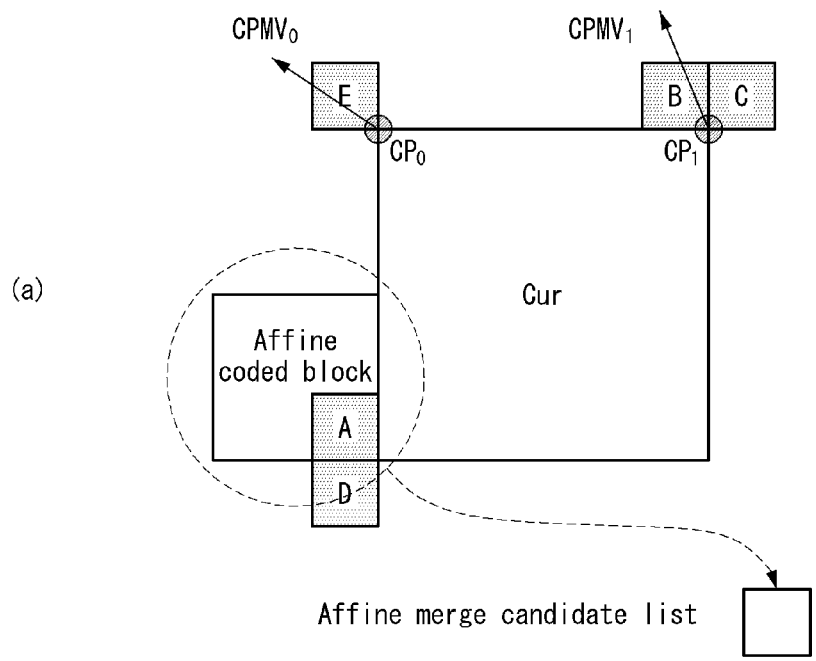
(b) 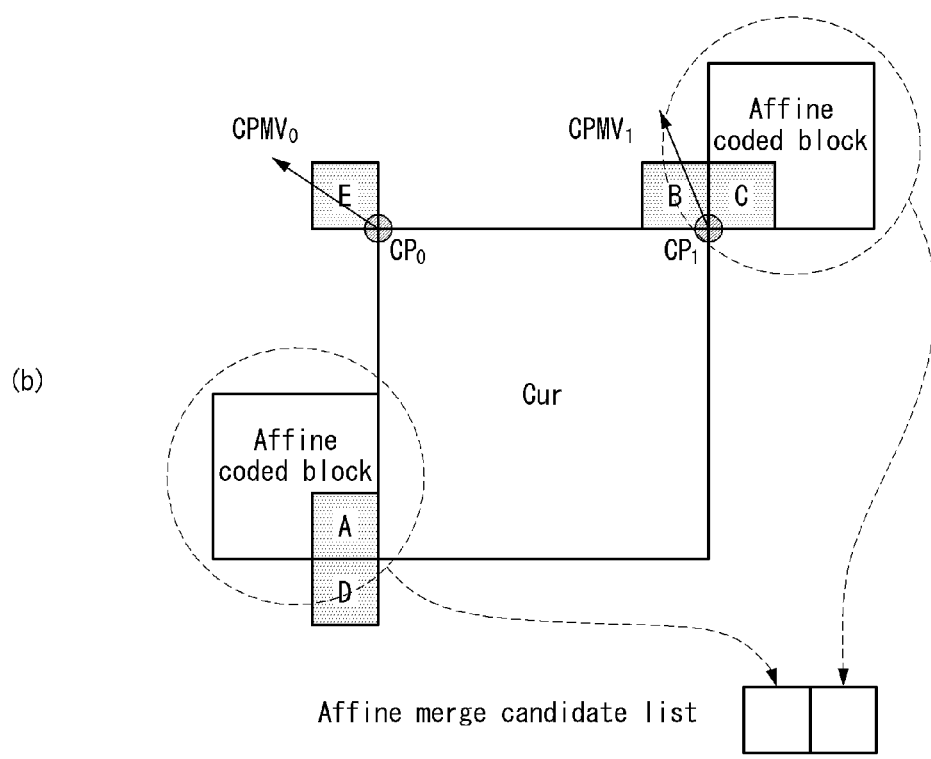

[FIG. 21]
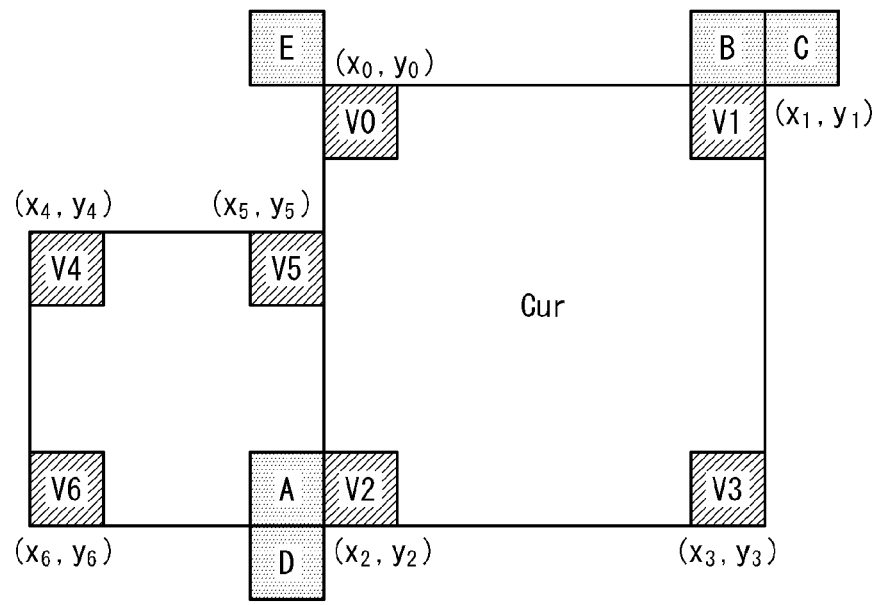
[FIG. 22]
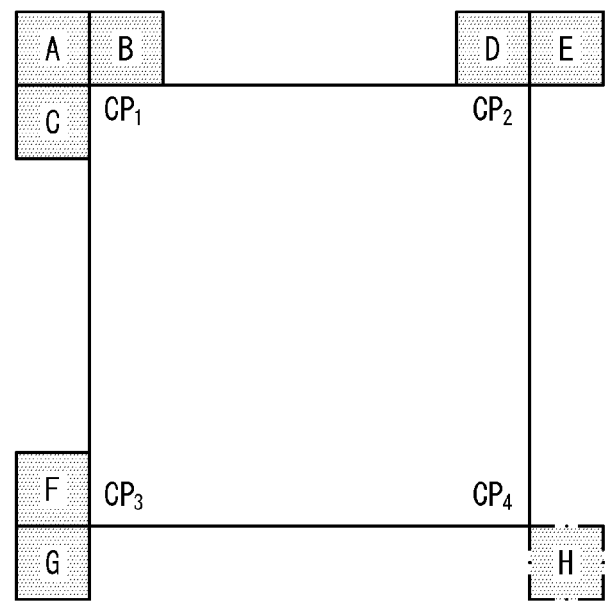

[FIG. 23]
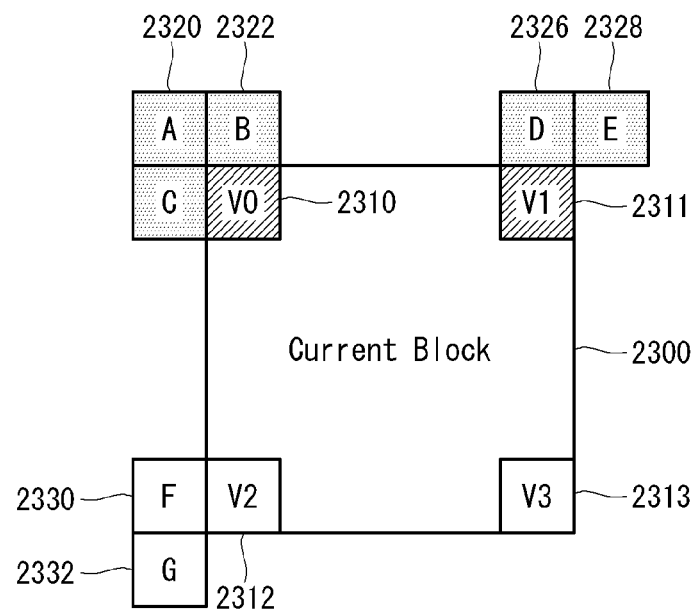
[FIG. 24]
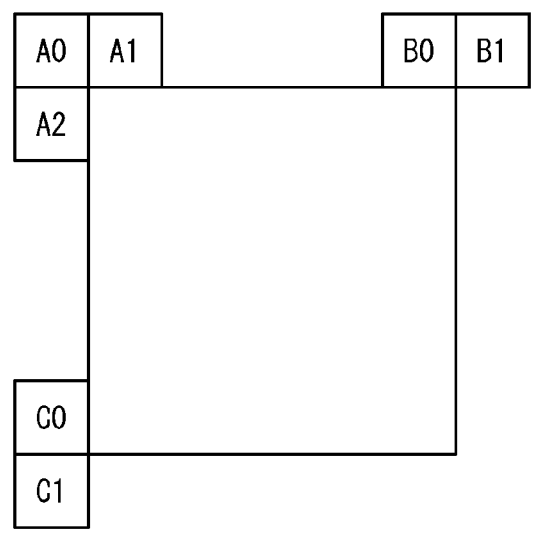

[FIG. 25]
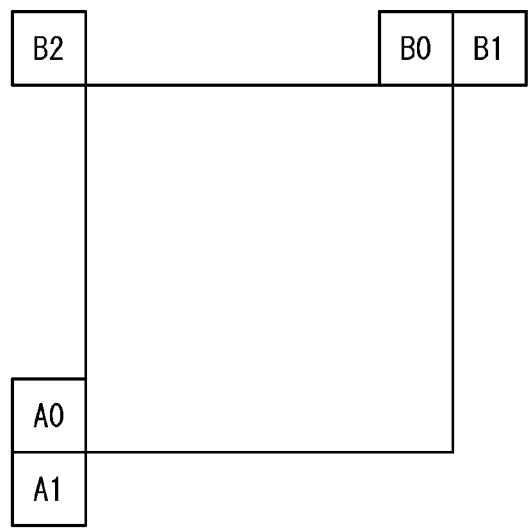
[FIG. 26]
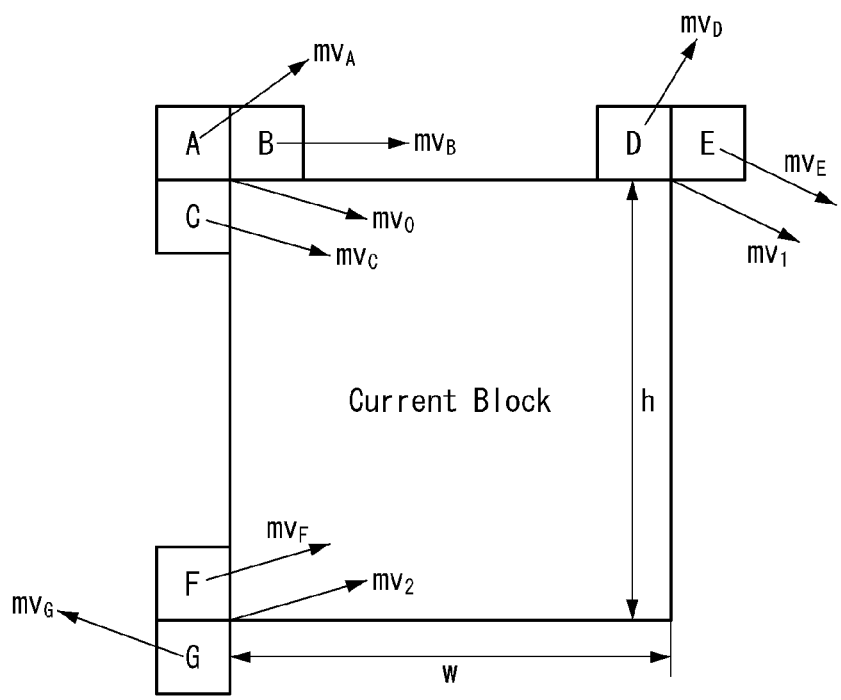

[FIG. 27]
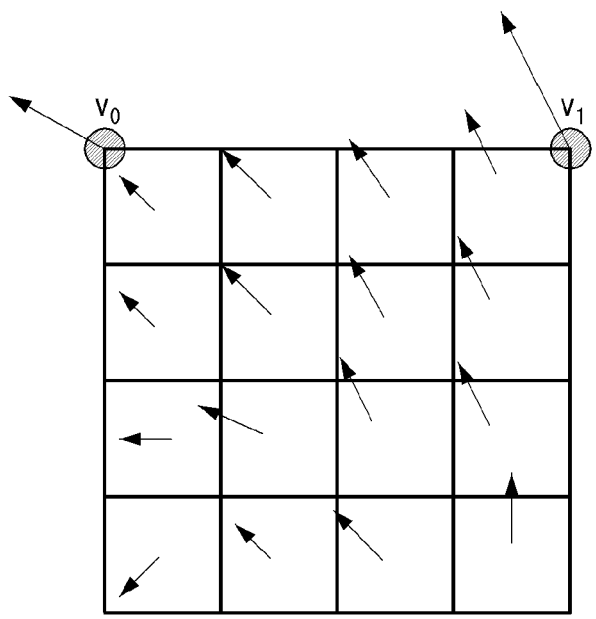
[FIG. 28]
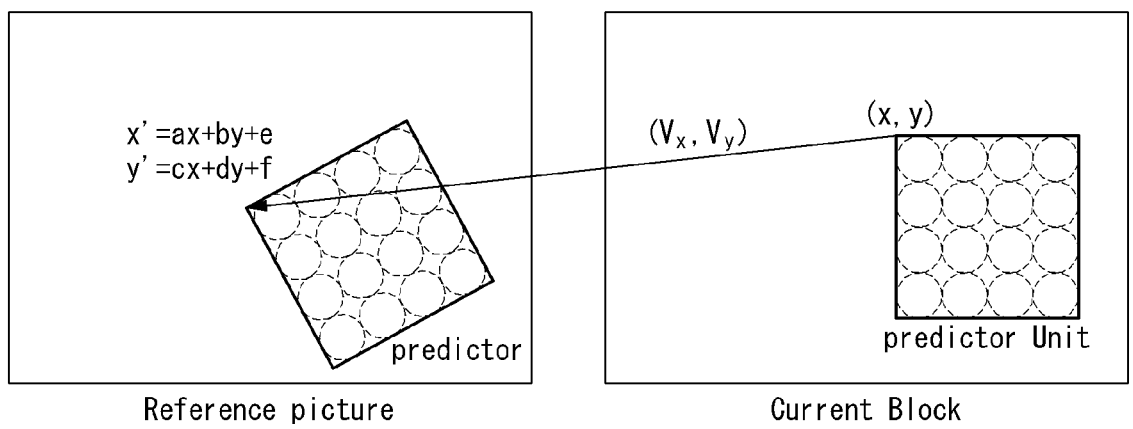

[FIG. 29]
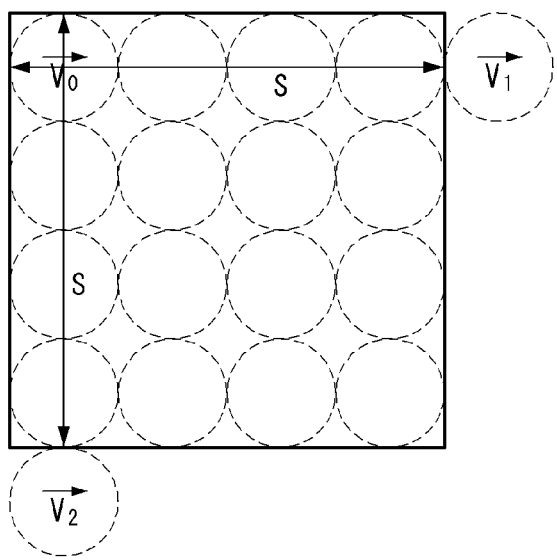
[FIG. 30]
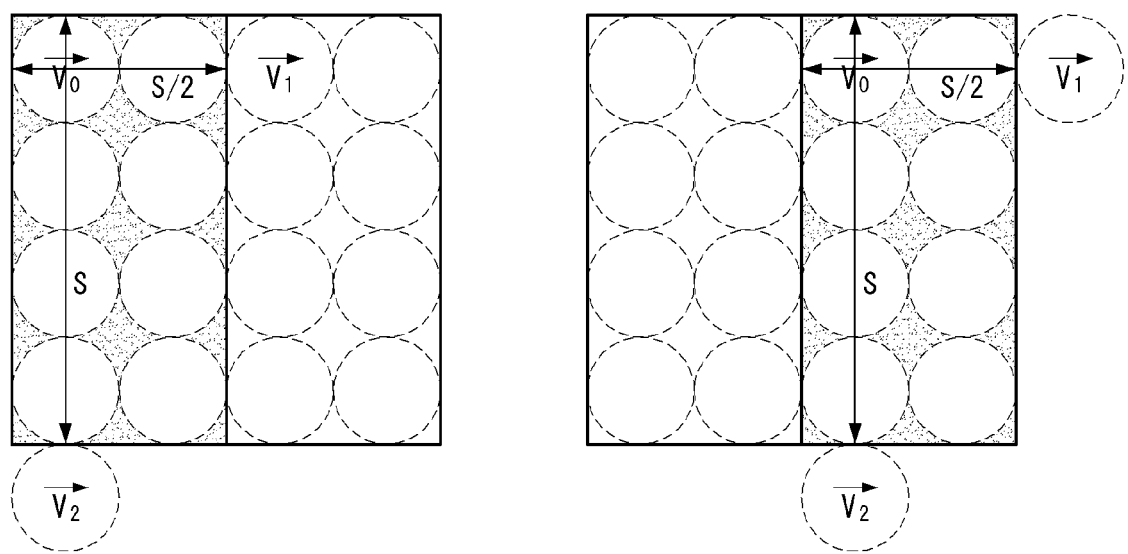

[FIG. 31]
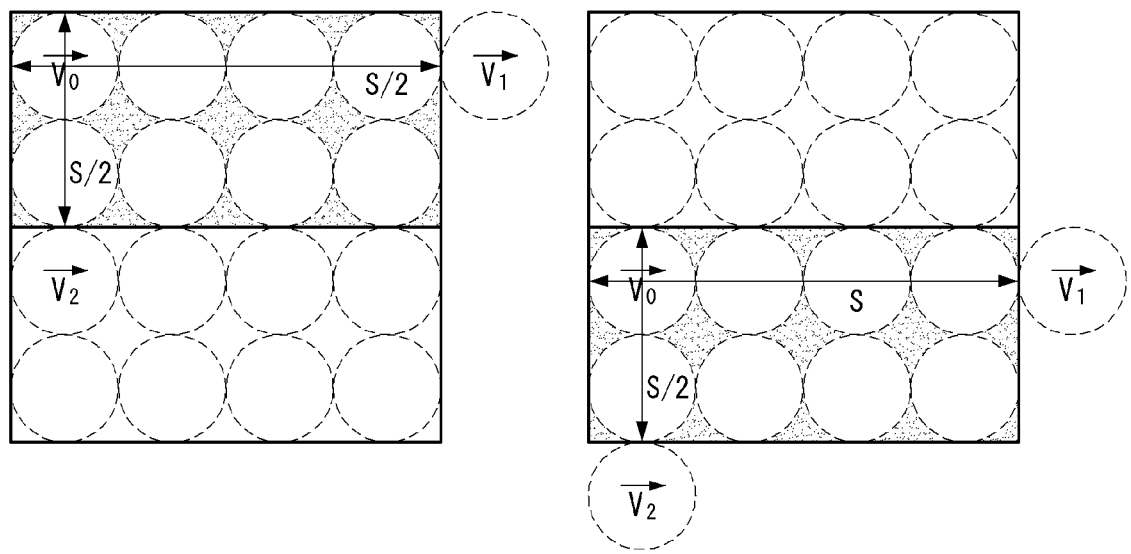

[FIG. 32]
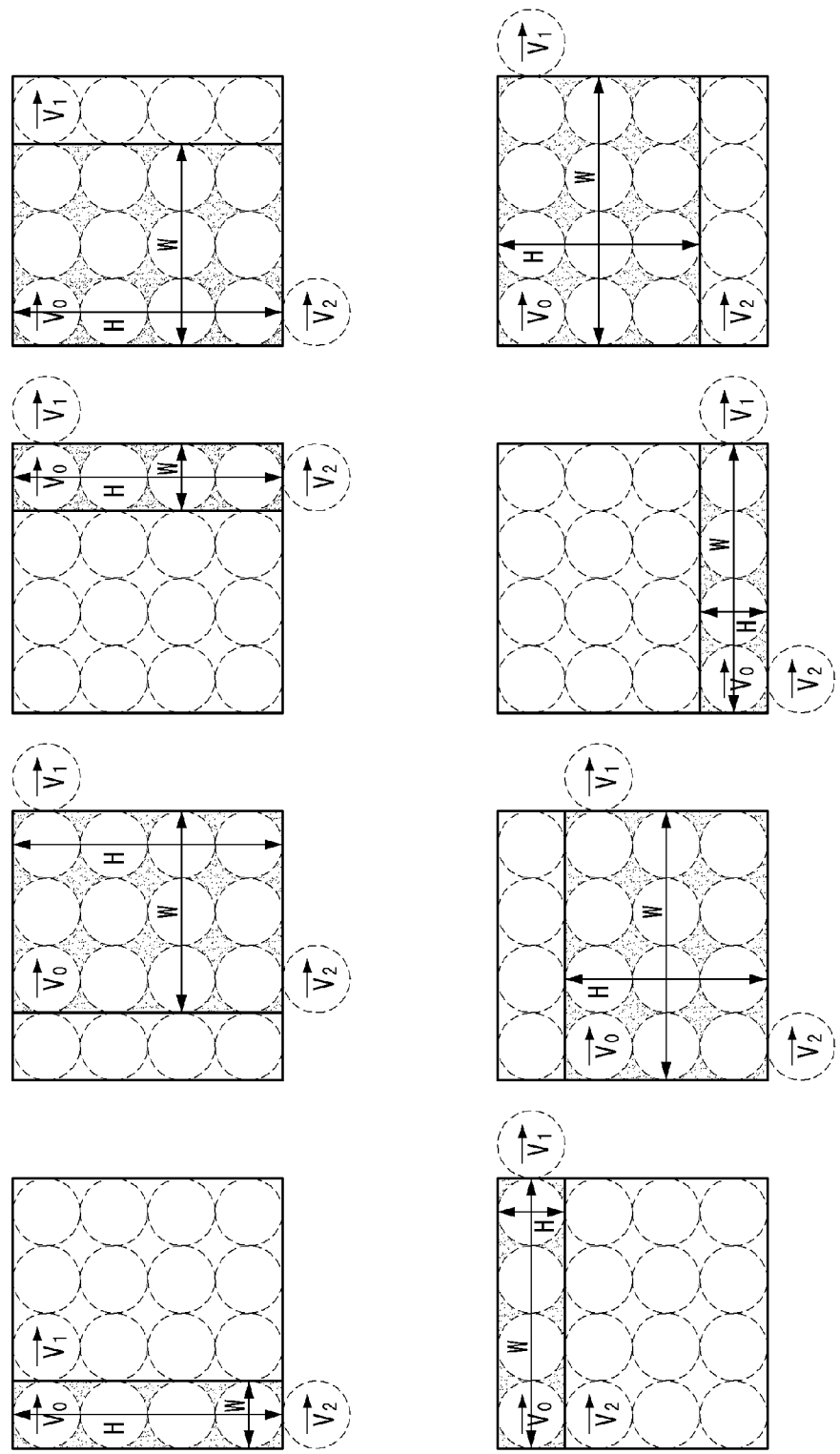

[FIG. 33]
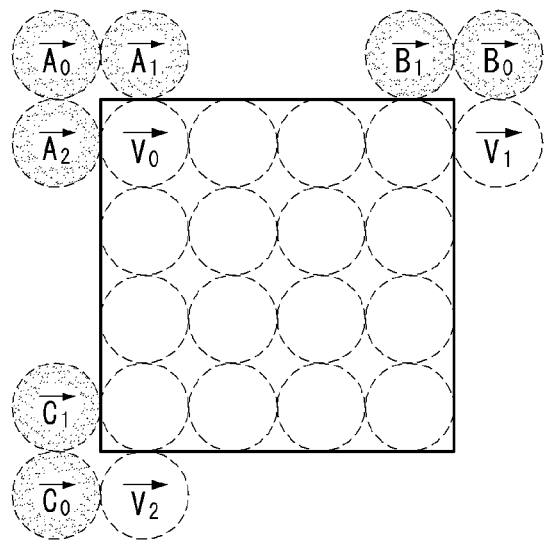
[FIG. 34]
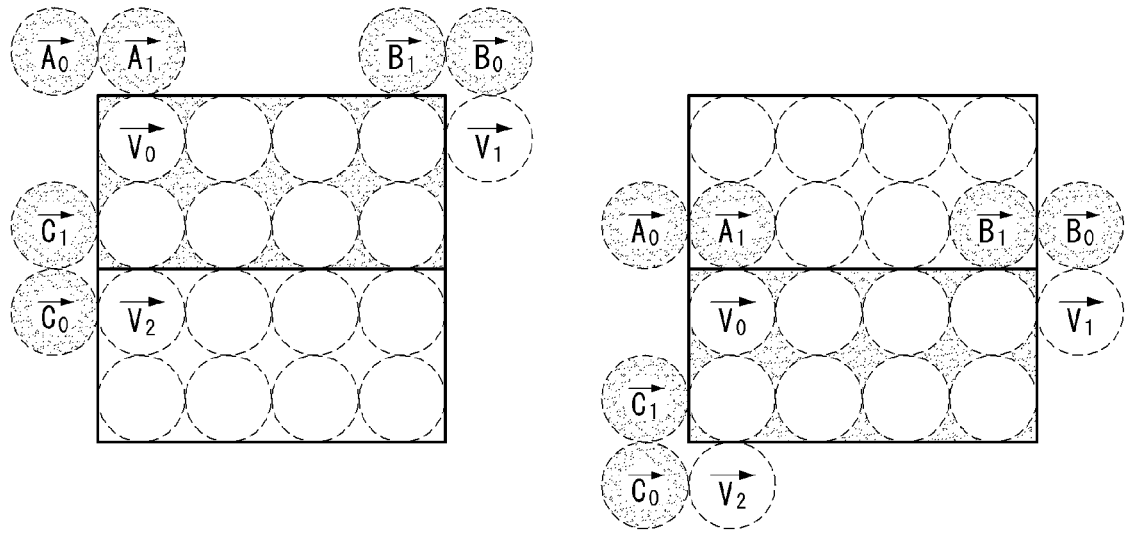

[FIG. 35]
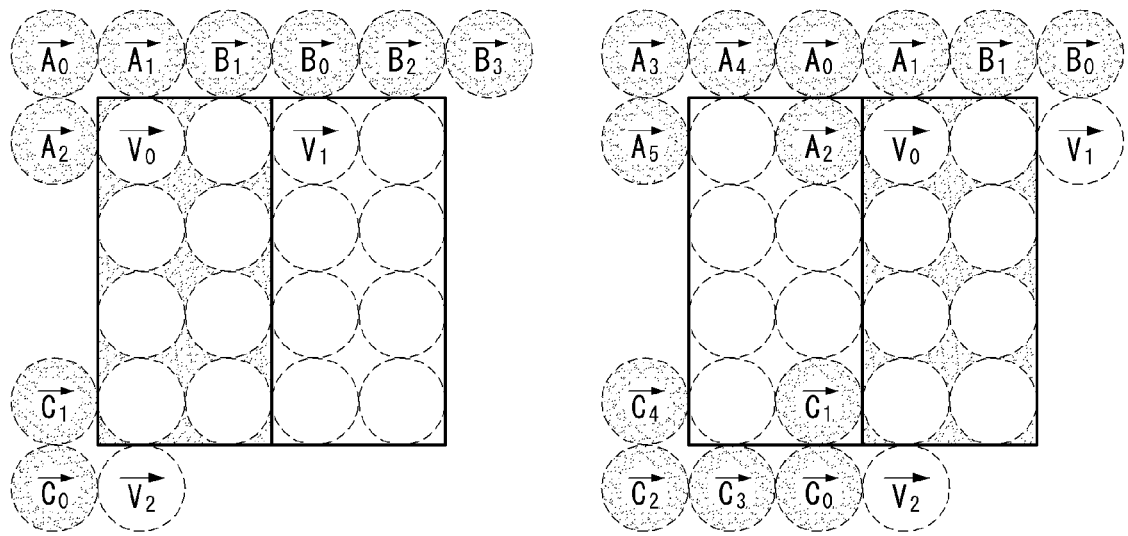
[FIG. 36]
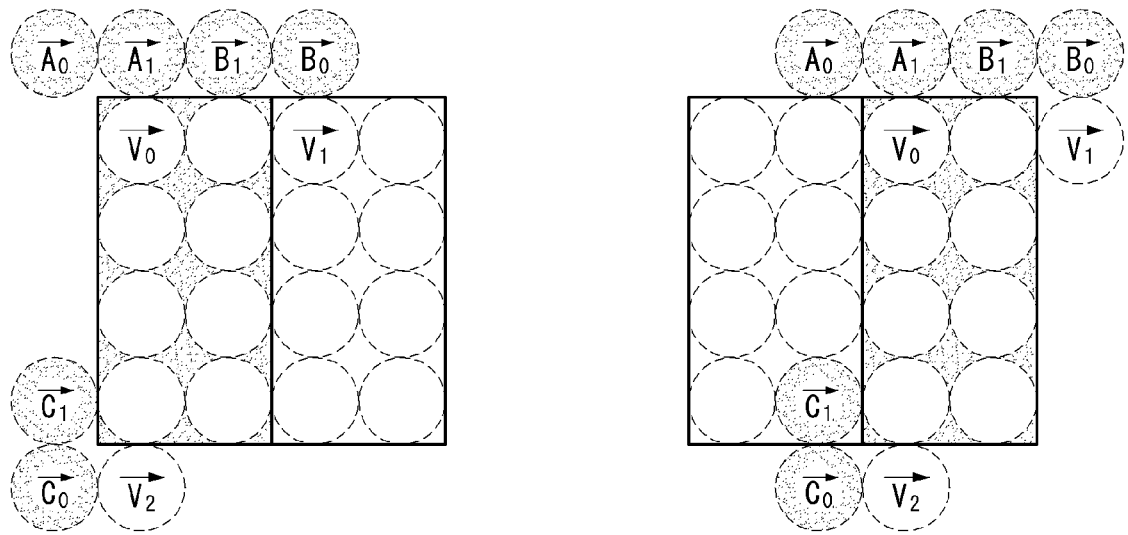

[FIG. 37]
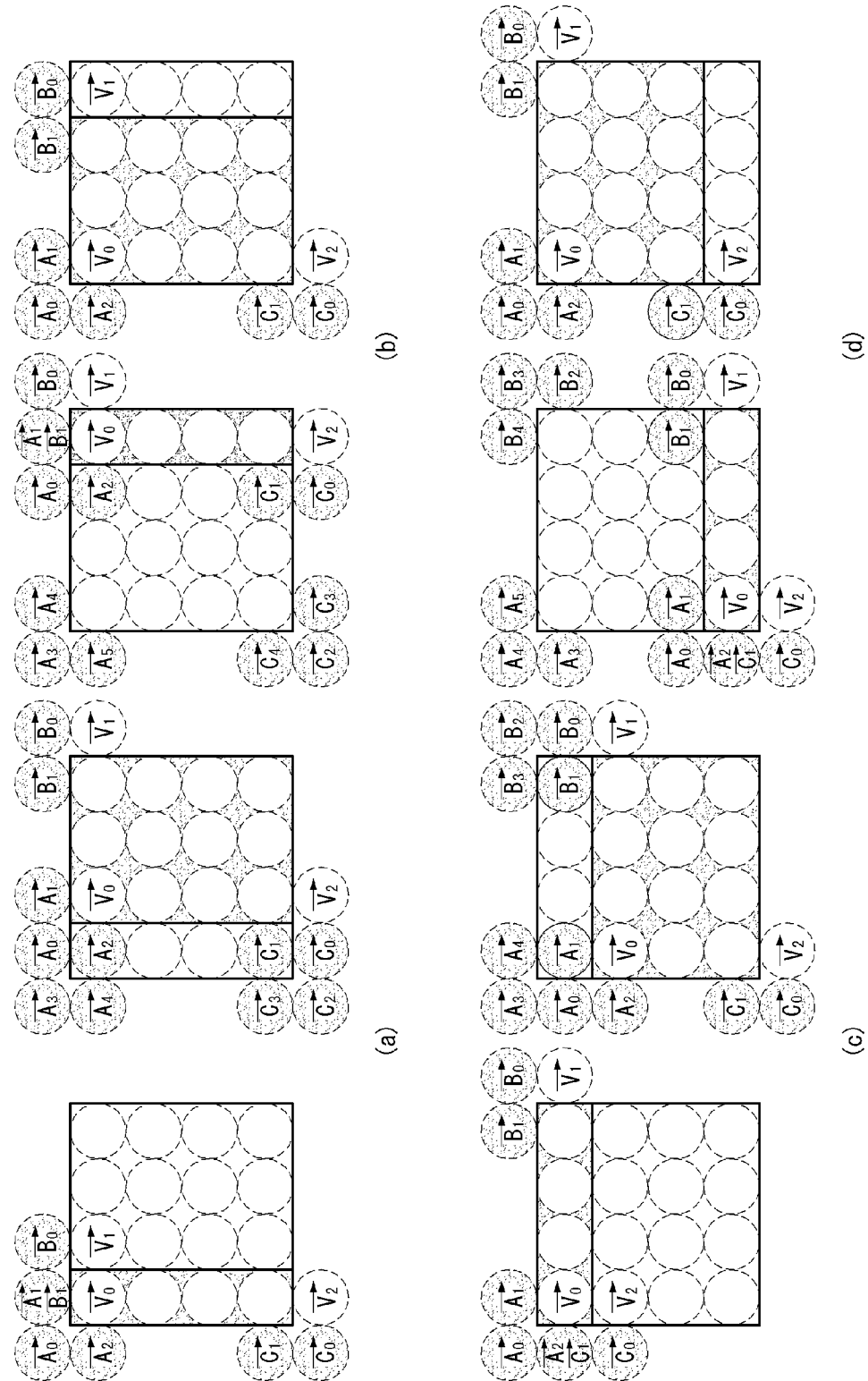

[FIG. 38]
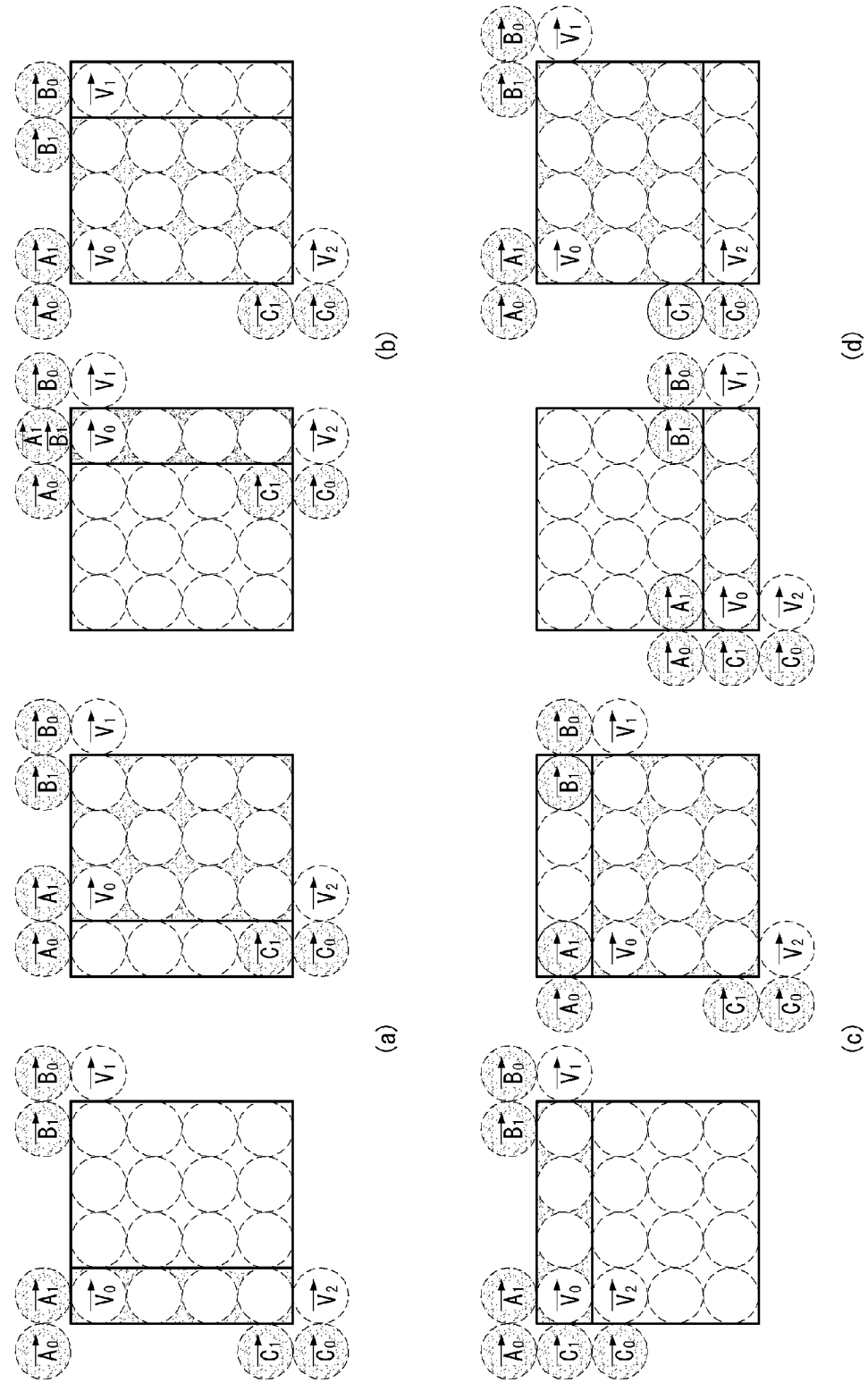

[FIG. 39]
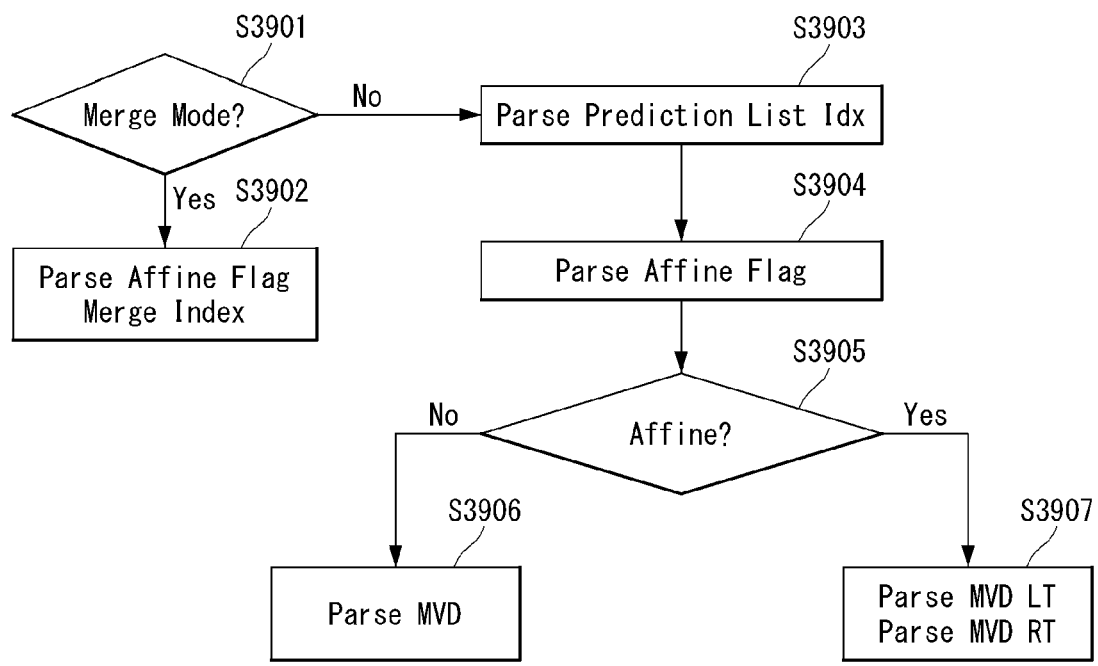

[FIG. 40]
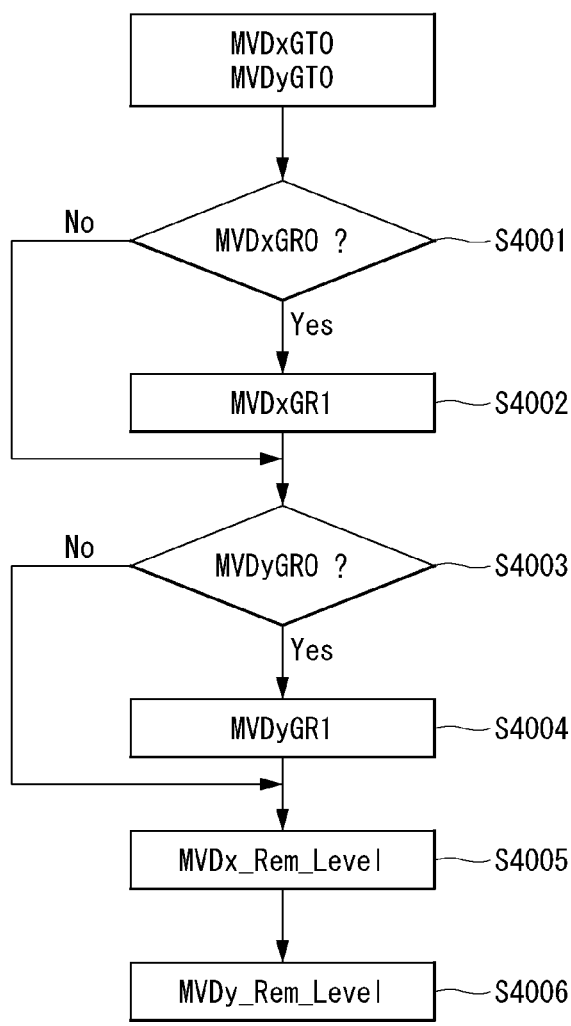

[FIG. 41]
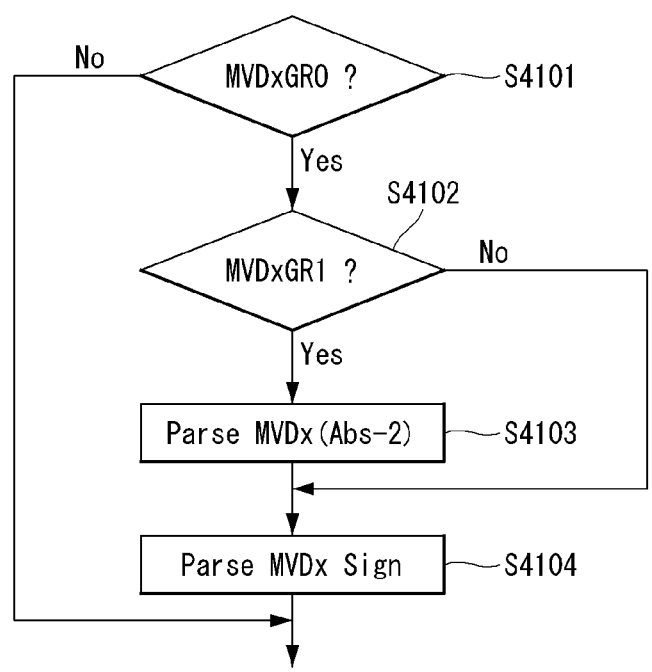

[FIG. 42]
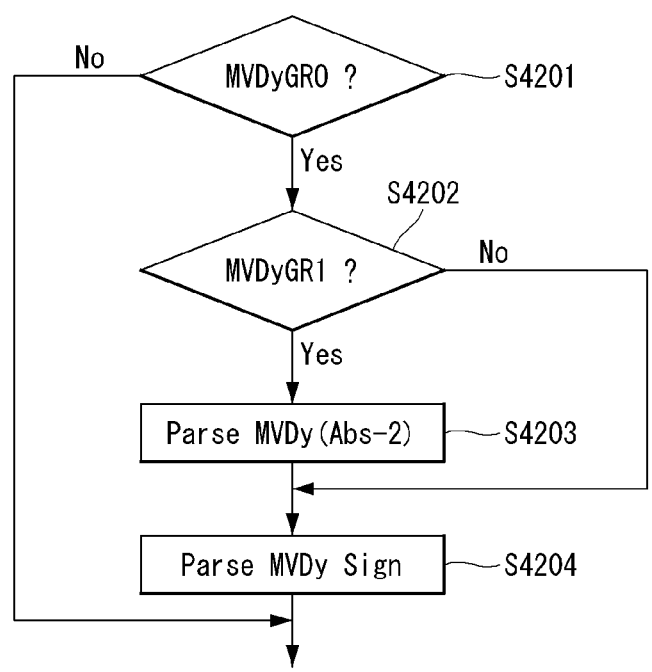

[FIG. 43]
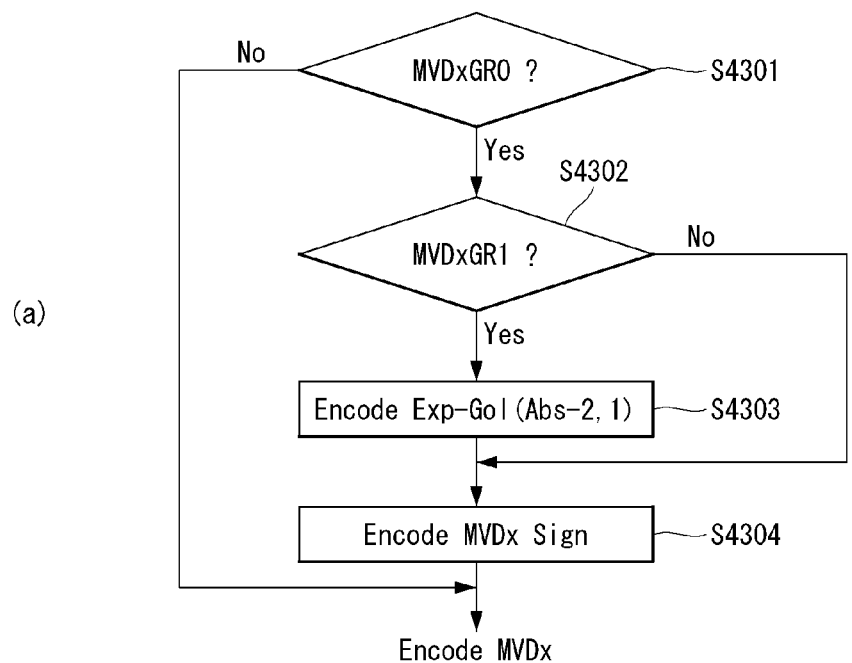
(a)
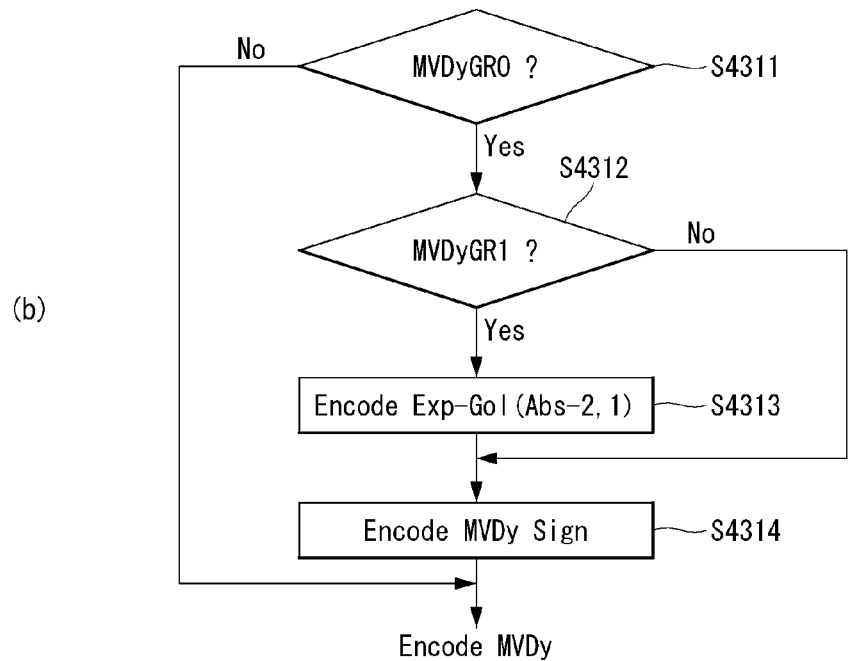
(b)

[FIG. 44]
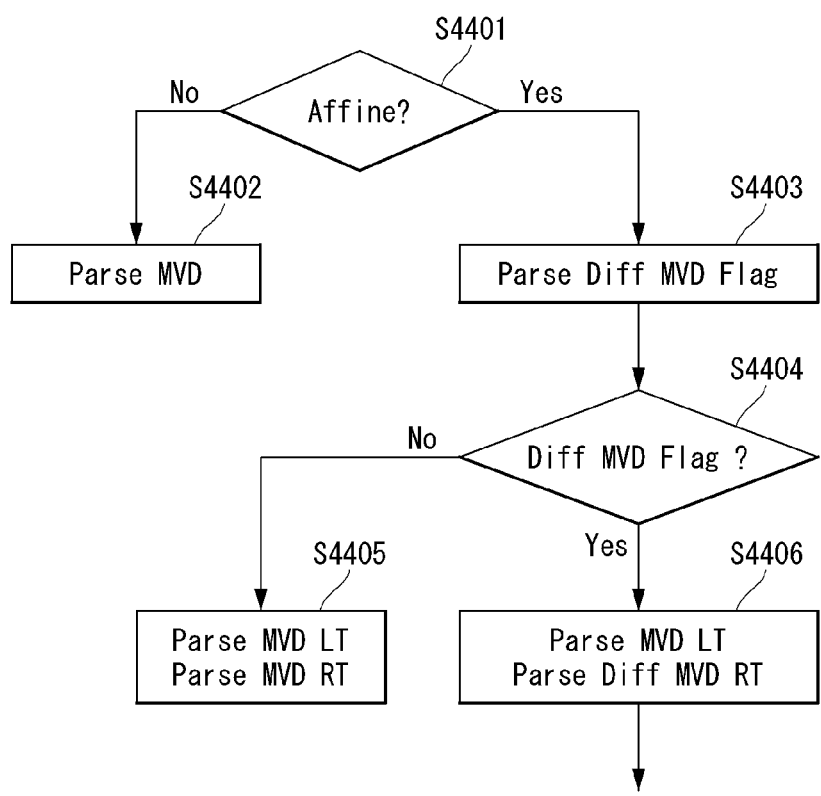

[FIG. 45]
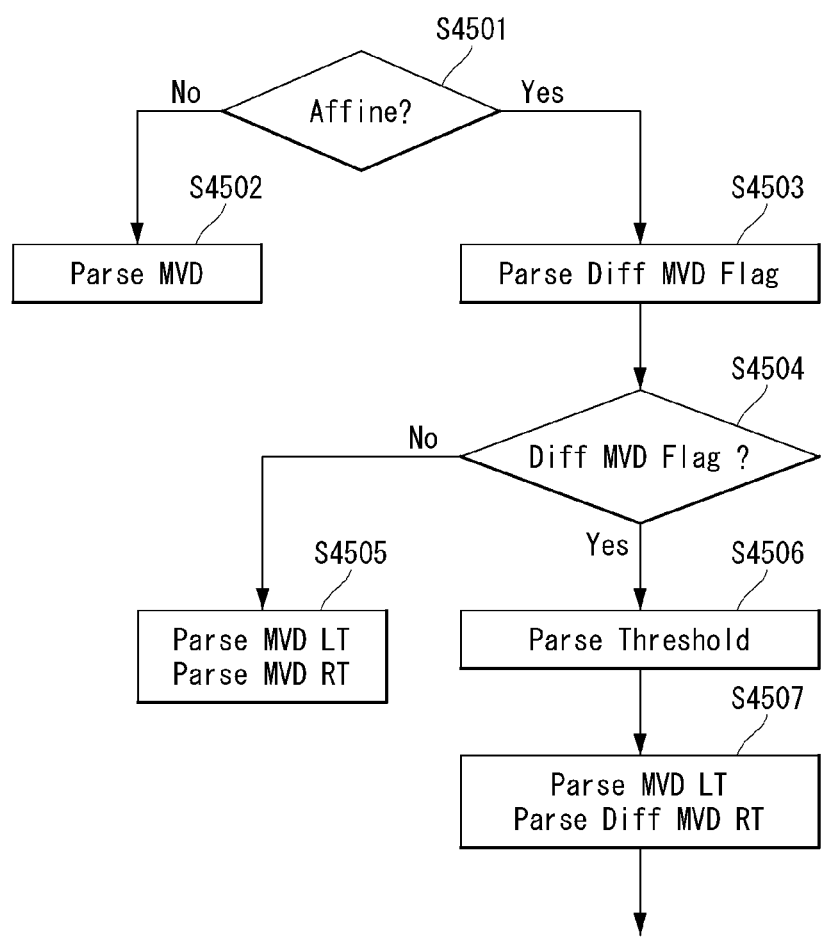

[FIG. 46]
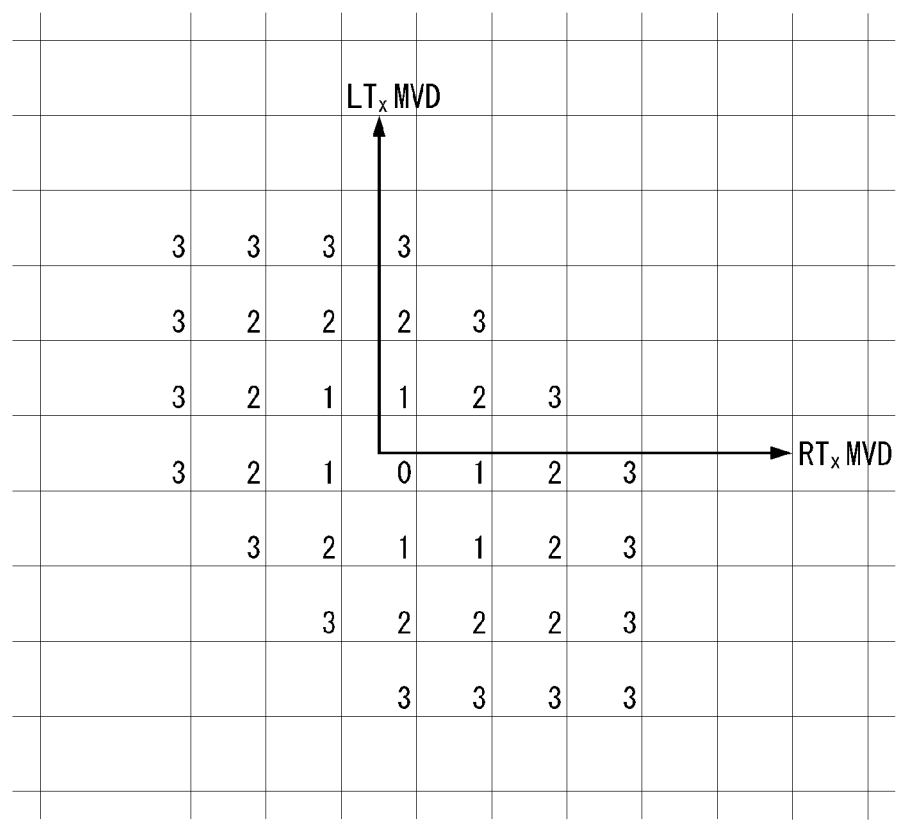

[FIG. 47]
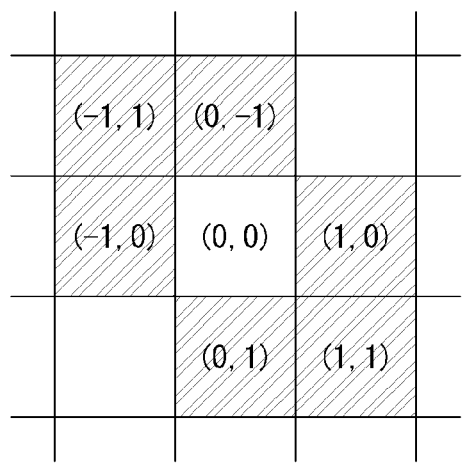
[FIG. 48]
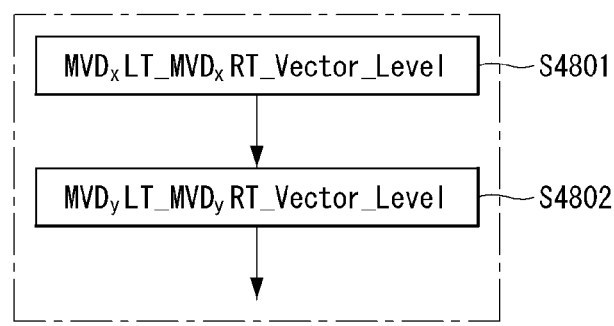

[FIG. 49]
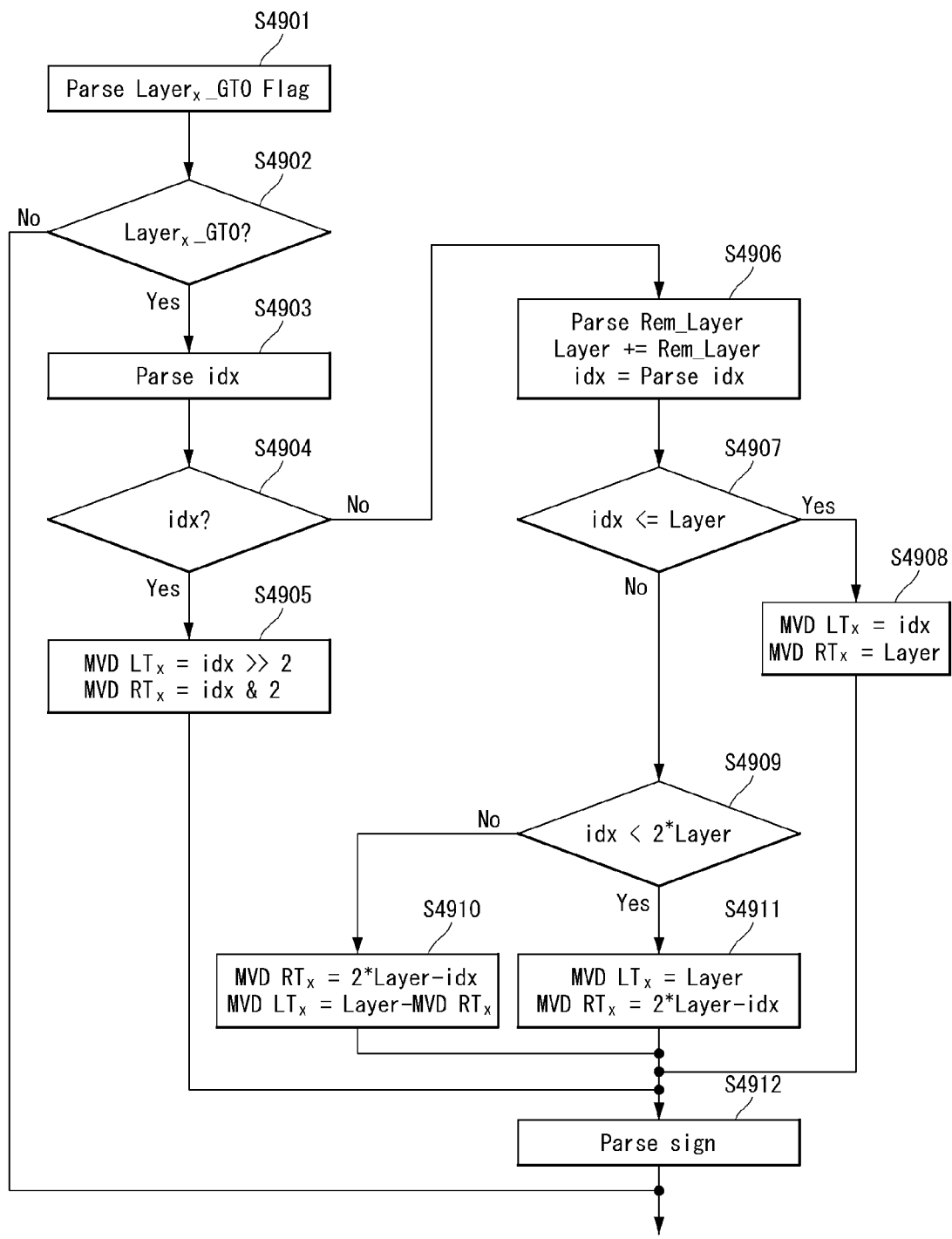

[FIG. 50]
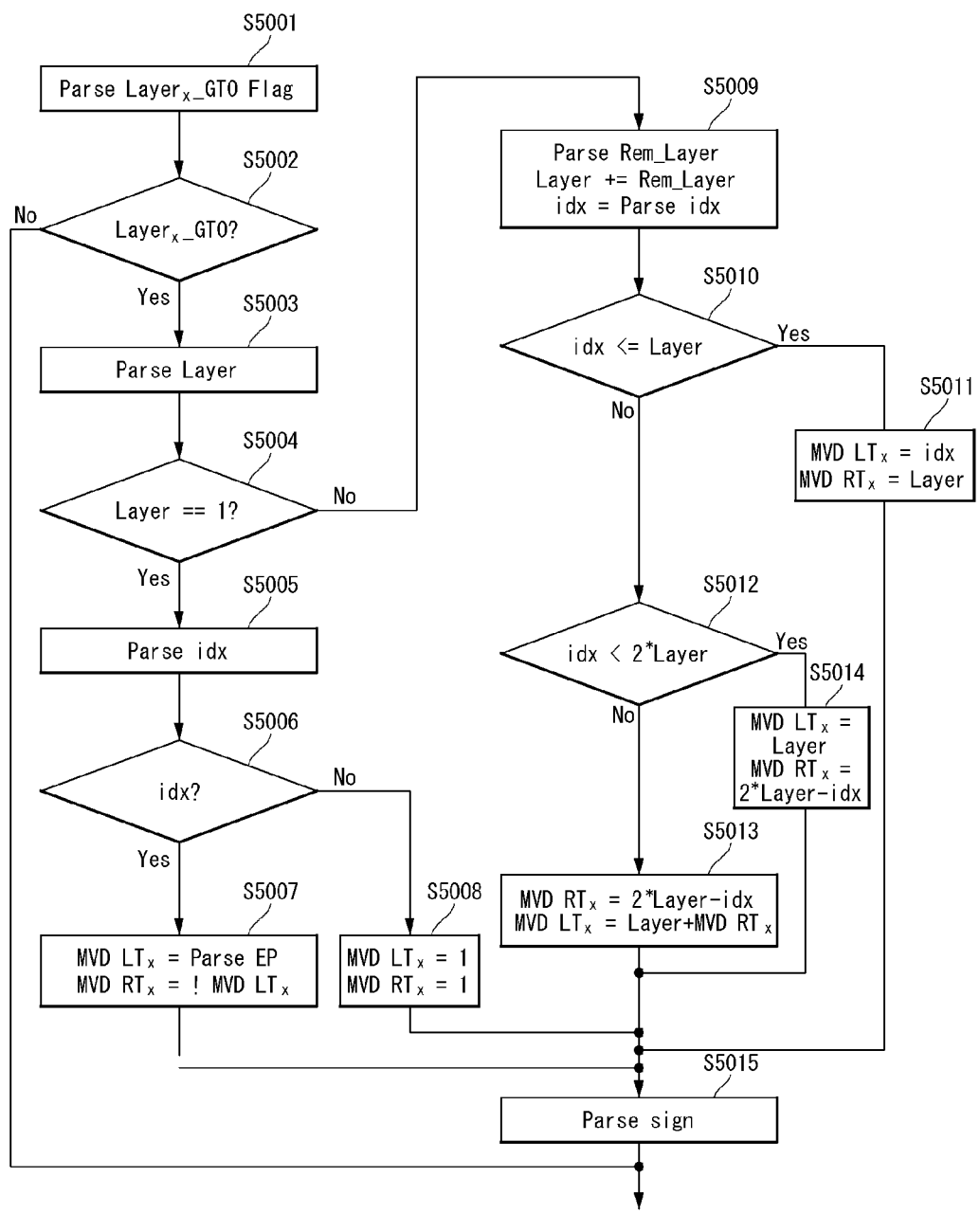

[FIG. 51]
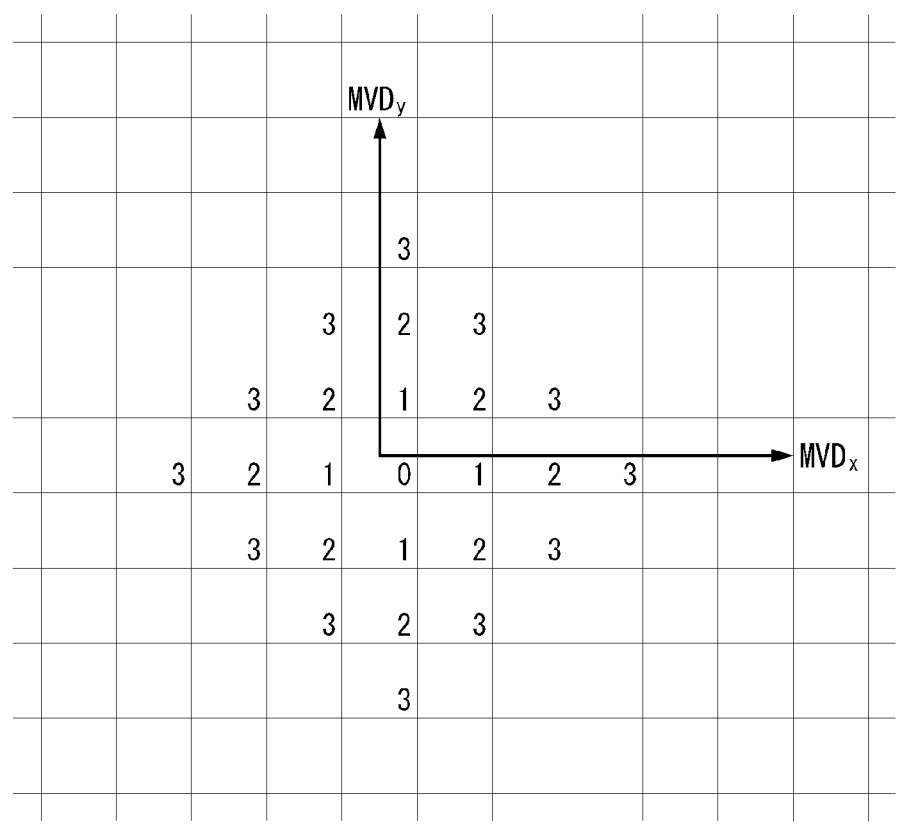

[FIG. 52]
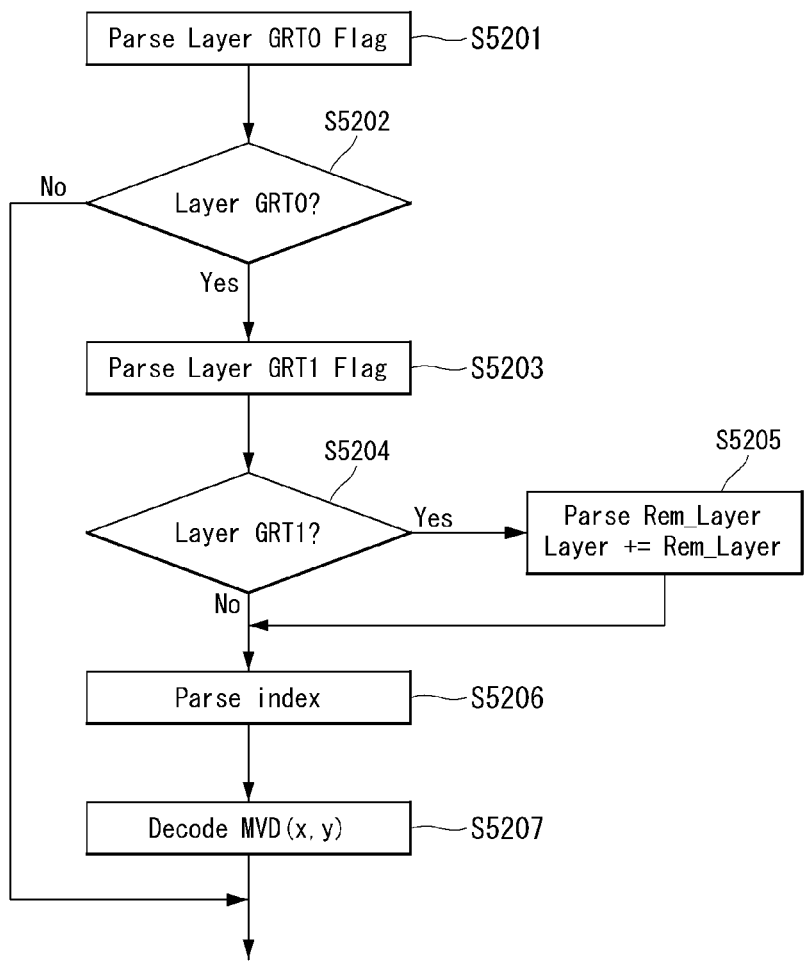

[FIG. 53]
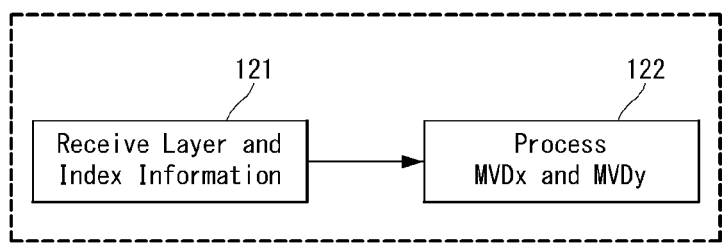
[FIG. 54]
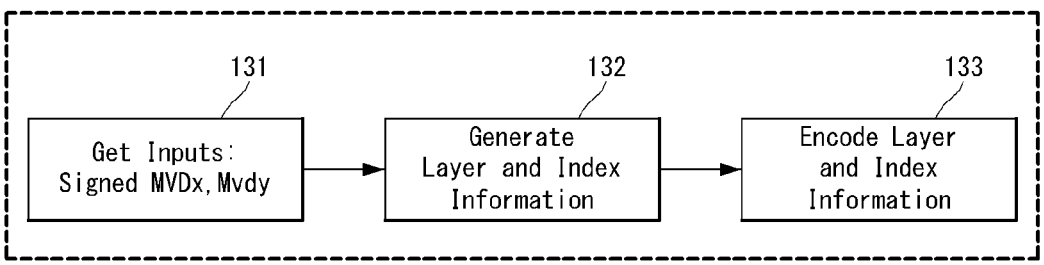

[FIG. 55]
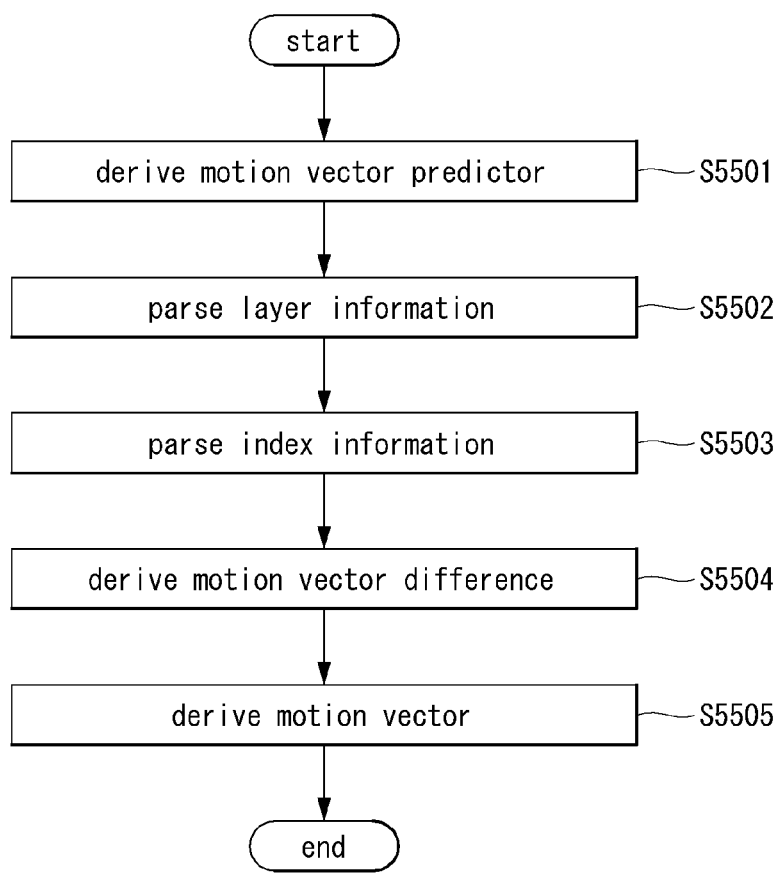

[FIG. 56]
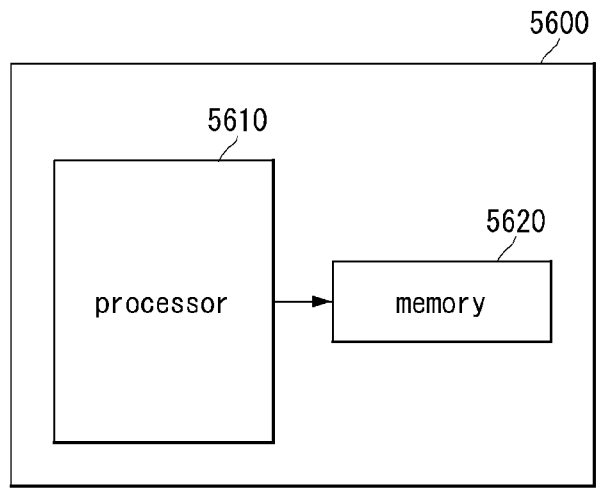
[FIG. 57]
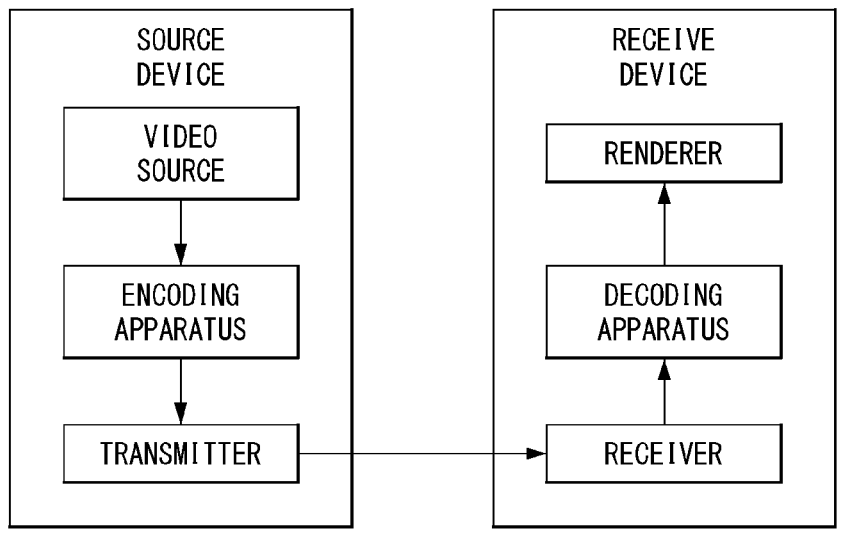

[FIG. 58]
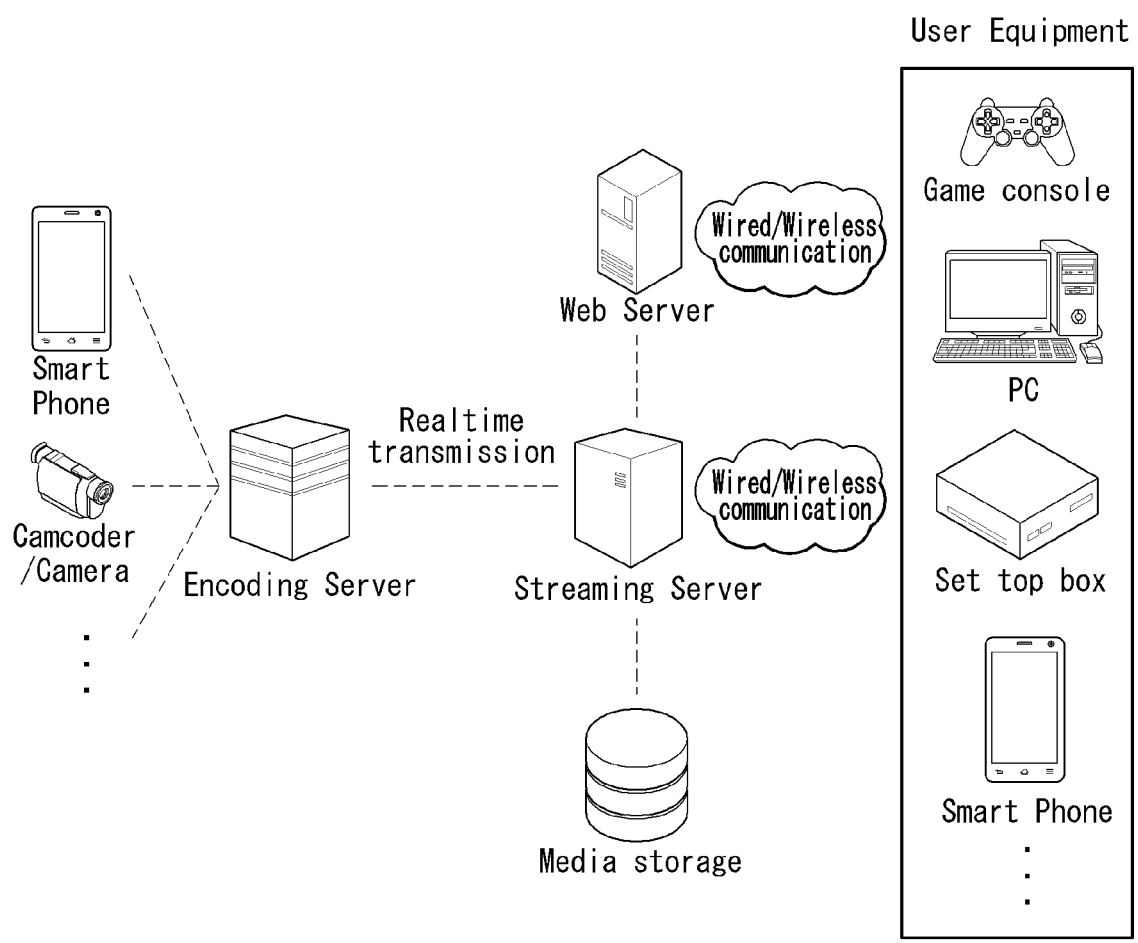

METHOD AND APPARATUS FOR PROCESSING VIDEO SIGNALS ON BASIS OF INTER PREDICTION

CROSS-REFERENCE TO RELATED APPLICATIONS

This application is the National Stage filing under 35 U.S.C. 371 of International Application No. PCT/KR2019/012354, filed on Sep. 23, 2019, which claims the benefit of U.S. Provisional Applications No. 62/735,028, filed on Sep. 22, 2018, the contents of which are all hereby incorporated by reference herein in their entirety.

TECHNICAL FIELD

Embodiments of the disclosure relate to methods and devices for processing video signals based on inter prediction, and specifically, to methods for vector-coding a motion vector difference used for inter prediction and devices therefor.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DETAILED DESCRIPTION OF THE DISCLOSURE

Technical Problem

Embodiments of the disclosure aim to propose vector coding techniques for jointly coding horizontal and vertical components of a motion vector difference using the correlation between motion vector differences.

Objects of the disclosure are not limited to the foregoing, and other unmentioned objects would be apparent to one of ordinary skill in the art from the following description.

Technical Solution

According to an embodiment of the disclosure, a method for processing a video signal based on inter prediction may comprise deriving a motion vector predictor using motion information for a neighboring block of a current block, parsing layer information indicating a current layer to which a motion vector difference used for inter prediction of the current block belongs, in a predefined layer structure in which combinations of at least one horizontal and vertical components of motion vector differences are divided into a plurality of layers, parsing index information indicating a specific combination in the current layer, deriving a motion vector difference of the current block using the layer information and the index information, and deriving a motion vector of the current block by adding the motion vector difference to the motion vector predictor.

Preferably, parsing the layer information may include parsing a first flag indicating whether an identification (ID) of the current layer is larger than 0 and, when the ID of the current layer is 0, parsing a second flag indicating whether the ID of the current layer is larger than 1.

Preferably, parsing the layer information may include parsing remaining layer information indicating the current layer among layers whose IDs are equal to or larger than 2 when the ID of the current layer is larger than 1.

Preferably, the remaining layer information may be binarized using an exponential Golomb code having an order of 1.

Preferably, the index information may be binarized using a truncated binarization method.

Preferably, the method may further comprise generating a prediction sample of the current block by performing inter prediction using the motion vector of the current block.

According to another embodiment of the disclosure, a device for decoding a video signal based on inter prediction may comprise a memory storing the video signal and a processor coupled with the memory, wherein the processor may derive a motion vector predictor using motion information for a neighboring block of a current block, parse layer information indicating a current layer to which a motion vector difference used for inter prediction of the current block belongs, in a predefined layer structure in which combinations of at least one horizontal and vertical components of motion vector differences are divided into a plurality of layers, parse index information indicating a specific combination in the current layer, derive a motion vector difference of the current block using the layer information and the index information, and derive a motion vector of the current block by adding the motion vector difference to the motion vector predictor.

Advantageous Effects

According to conventional video compression techniques, the horizontal component and the vertical component of the MVD are individually encoded/decoded. However, as described above, according to data analysis based on frequency analysis, the horizontal component and the vertical component of the MVD may have a mutual correlation and are highly likely to belong to the same layer in the layer structure according to an embodiment of the disclosure.

Accordingly, according to an embodiment of the disclosure, the MVD coding efficiency may be significantly increased by coding the horizontal and vertical components of the MVD together based on layer information and index information.

Effects of the disclosure are not limited to the foregoing, and other unmentioned effects would be apparent to one of ordinary skill in the art from the following description.

BRIEF DESCRIPTION OF DRAWINGS

In order to help understanding of the disclosure, the accompanying drawings which are included as a part of the Detailed Description provide embodiments of the disclosure and describe the technical features of the disclosure together with the Detailed Description.

FIG. 1 is a schematic block diagram of an encoding apparatus in which encoding of a video/image signal is performed as an embodiment to which the disclosure is applied.

FIG. 2 is a schematic block diagram of a decoding apparatus in which decoding of a video/image signal is performed as an embodiment to which the disclosure is applied.

FIG. 3 is a diagram illustrating an example of a multi-type tree structure to which the disclosure may be applied.

FIG. 4 is a diagram illustrating a signaling mechanism of partitioning information of a quadtree having a nested multi-type tree structure as an embodiment to which the disclosure may be applied.

FIG. 5 is a diagram illustrating a method for splitting a CTU into multiple CUs based on a quadtree and nested multi-type tree structure as an embodiment to which the disclosure may be applied.

FIG. 6 is a diagram illustrating a method for limiting ternary-tree splitting as an embodiment to which the disclosure may be applied.

FIG. 7 is a diagram illustrating redundant partitioning patterns which may occur in binary-tree partitioning and ternary-tree partitioning as an embodiment to which the disclosure may be applied.

FIGS. 8 and 9 are diagrams illustrating an inter prediction based video/image encoding method according to an embodiment of the disclosure and an inter prediction unit in an encoding apparatus according to an embodiment of the disclosure.

FIGS. 10 and 11 are diagrams illustrating an inter prediction based video/image decoding method according to an embodiment of the disclosure and an inter prediction unit in a decoding apparatus according to an embodiment of the disclosure.

FIG. 12 is a diagram for describing a neighboring block used in a merge mode or a skip mode as an embodiment to which the disclosure is applied.

FIG. 13 is a flowchart illustrating a method for configuring a merging candidate list according to an embodiment to which the disclosure is applied.

FIG. 14 is a flowchart illustrating a method for configuring a merging candidate list according to an embodiment to which the disclosure is applied.

FIG. 15 illustrates an example of motion models according to an embodiment of the disclosure.

FIG. 16 illustrates an example of a control point motion vector for an affine motion prediction according to an embodiment of the disclosure.

FIG. 17 illustrates an example of a motion vector for each subblock of a block to which an affine motion prediction according to an embodiment of the disclosure has been applied.

FIG. 18 illustrates an example of neighboring blocks used for an affine motion prediction in an affine merge mode according to an embodiment of the disclosure.

FIG. 19 illustrates an example in which a block on which an affine motion prediction is performed using neighboring blocks to which an affine motion prediction according to an embodiment of the disclosure has been applied.

FIG. 20 is a diagram for describing a method of generating a merge candidate list using peripheral affine coding blocks according to an embodiment of the disclosure.

FIGS. 21 and 22 are diagrams for describing a method of configuring an affine merge candidate list using a neighboring block encoded by an affine prediction according to an embodiment of the disclosure.

FIG. 23 illustrates an example of neighboring blocks used for an affine motion prediction in an affine inter mode according to an embodiment of the disclosure.

FIG. 24 illustrates an example of neighboring blocks used for an affine motion prediction in the affine inter mode according to an embodiment of the disclosure.

FIGS. 25 and 26 are diagrams illustrating a method of deriving motion vector candidates using motion information of neighboring blocks in the affine inter mode according to an embodiment of the disclosure.

FIG. 27 illustrates an example of a method of deriving an affine motion vector field in a subblock unit according to an embodiment of the disclosure.

FIG. 28 illustrates a method of generating a prediction block and a motion vector in an inter prediction to which an affine motion model according to an embodiment of the disclosure has been applied.

FIG. 29 is a diagram illustrating a method of performing a motion compensation based on a motion vector of a control point according to an embodiment of the disclosure.

FIG. 30 is a diagram illustrating a method of performing a motion compensation based on motion vectors of control points in a nonregular block according to an embodiment of the disclosure.

FIG. 31 is a diagram illustrating a method of performing a motion compensation based on motion vectors of control points in a nonregular block according to an embodiment of the disclosure.

FIGS. 32 to 38 are diagrams illustrating a method of performing a motion compensation based on motion vectors of control points in a nonregular block according to an embodiment of the disclosure.

FIG. 39 illustrates an overall coding structure for deriving a motion vector according to an embodiment of the disclosure.

FIG. 40 illustrates an example of an MVD coding structure according to an embodiment of the disclosure.

FIG. 41 illustrates an example of an MVD coding structure according to an embodiment of the disclosure.

FIG. 42 illustrates an example of an MVD coding structure according to an embodiment of the disclosure.

FIG. 43 illustrates an example of an MVD coding structure according to an embodiment of the disclosure.

FIG. 44 is a view illustrating a method for deriving affine motion vector difference information according to an embodiment of the disclosure.

FIG. 45 is a view illustrating a method for deriving motion vector difference information based on a threshold according to an embodiment of the disclosure.

FIG. 46 is a view illustrating a vector coding method for an affine motion vector difference according to an embodiment of the disclosure.

FIG. 47 is a view illustrating a vector coding method for an affine motion vector difference according to an embodiment of the disclosure.

FIG. 48 is a parsing flowchart for MVD components according to an embodiment of the disclosure.

FIG. 49 is a view illustrating a coding structure of a motion vector difference performed based on vector coding according to an embodiment of the disclosure.

FIG. 50 is a view illustrating a coding structure of a motion vector difference performed based on vector coding according to an embodiment of the disclosure.

FIG. 51 is a view illustrating a vector coding method for a motion vector difference according to an embodiment of the disclosure.

FIG. 52 is a view illustrating a vector coding method for a motion vector difference based on a layer structure according to an embodiment of the disclosure.

FIG. 53 is a view illustrating an example structure of a decoding apparatus according to an embodiment of the disclosure.

FIG. 54 is a view illustrating an example structure of an encoding apparatus according to an embodiment.

FIG. 55 is a flowchart illustrating a method for processing a video signal based on inter prediction according to an embodiment of the disclosure.

FIG. 56 is a block diagram illustrating an example device for processing video signals according to an embodiment of the disclosure.

FIG. 57 illustrates a video coding system according to the disclosure.

FIG. 58 is a view illustrating a structure of a content streaming system according to an embodiment of the disclosure.

MODE FOR CARRYING OUT THE DISCLOSURE

Hereinafter, preferred embodiments of the disclosure are described in detail with reference to the accompanying drawings. A detailed description to be disclosed along with the accompanying drawings are intended to describe some embodiments of the disclosure and are not intended to describe a sole embodiment of the disclosure. The following detailed description includes more details in order to provide full understanding of the disclosure. However, those skilled in the art will understand that the disclosure may be implemented without such more details.

In some cases, in order to avoid that the concept of the disclosure becomes vague, known structures and devices are omitted or may be shown in a block diagram form based on the core functions of each structure and device.

Although most terms used in the disclosure have been selected from general ones widely used in the art, some terms have been arbitrarily selected by the applicant and their meanings are explained in detail in the following description as needed. Thus, the disclosure should be understood with the intended meanings of the terms rather than their simple names or meanings.

Specific terms used in the following description have been provided to help understanding of the disclosure, and the use of such specific terms may be changed in various forms without departing from the technical sprit of the disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Hereinafter, for convenience of description, the processing unit may be referred to as a 'processing block' or a 'block'.

Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB), and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blu-ray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB of the memory 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture. The stored motion information may be forwarded to the inter predictor 180 to be utilized as motion information of a spatial neighboring block or motion information of a temporal neighboring block. The memory 170 may store reconstructed samples of the reconstructed blocks in the current picture and forward it to the intra predictor 185.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB), and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighboring block or motion information of a temporal neighboring block. The memory 170 may store reconstructed samples of the reconstructed blocks in the current picture and forward it to the intra predictor 265.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the disclosure may be performed based on various detailed techniques, and each of the various detailed techniques is described as below. It is apparent to those skilled in the art that the techniques described herein may be associated with the related procedure such as a prediction, a residual process ((inverse) transform, (de)quantization, etc.), a syntax element coding, a filtering, a partitioning/splitting in a video/image encoding/decoding procedure described above and/or described below.

The block partitioning procedure according to the disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of Picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include an N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

FIG. 3 is a diagram illustrating an example of a multi-type tree structure as an embodiment to which the disclosure may be applied.

In an embodiment of the disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the disclosure, generally, a CU, a PU and a TU may have the same block size. However, in the case that a maximum supported transform length is smaller than a width or a height of a color component, a CU and a TU may have different block sizes.

FIG. 4 is a diagram illustrating a signaling mechanism of partition split information of a quadtree having a nested multi-type tree structure as an embodiment to which the disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned). In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_split_cu_binary_flag, a multi-type tree splitting mode (MttSplitMode) may be derived as represented in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method of partitioning a CTU into multiple CUs based on a quadtree and nested multi-type tree structure as an embodiment to which the disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.
CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSize may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtsize (i.e., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

FIG. 6 is a diagram illustrating a method for limiting a ternary-tree split as an embodiment to which the disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT_split_type) and a syntax element including information a direction to which a leaf node of QT structure is partitioned between vertical and horizontal directions (e.g., MPT_split_mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

In the case that a portion of a tree node block exceeds a bottom or right picture boundary, the corresponding tree node block may be limited that all samples of all coded CUs are located within the picture boundaries. In this case, for example, the following split rules may be applied.

If a portion of a tree node block exceeds both the bottom and the right picture boundaries,
If the block is a QT node and the size of the block is larger than the minimum QT size, the block is forced to be split with QT split mode.
Otherwise, the block is forced to be split with SPLIT_BT_HOR mode
Otherwise if a portion of a tree node block exceeds the bottom picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_HOR mode.
Otherwise (the block is a BTT node or the size of the block is smaller than or equal to the minimum QT size), the block is forced to be split with SPLIT_BT_HOR mode.
Otherwise if a portion of a tree node block exceeds the right picture boundaries,
If the block is a QT node, and the size of the block is larger than the minimum QT size, and the size of the block is larger than the maximum BT size, the block is forced to be split with QT split mode.
Otherwise, if the block is a QT node, and the size of the block is larger than the minimum QT size and the size of the block is smaller than or equal to the maximum BT size, the block is forced to be split with QT split mode or SPLIT_BT_VER mode.
Otherwise (the block is a BTT node or the size of the block is smaller than or equal to the minimum QT size), the block is forced to be split with SPLIT_BT_VER mode.

The quadtree coding block structure accompanying the multi-type tree may provide a very flexible block partitioning structure. Due to spitting types supported to the multi-type tree, different splitting patterns may potentially cause the same coding block structure result in some cases. Generation of the redundant splitting patterns is limited to reduce a data mount of partitioning information. This will be described with reference to following drawings.

FIG. 7 is a diagram illustrating redundant partitioning patterns which may occur in binary-tree partitioning and ternary-tree partitioning as an embodiment to which the disclosure may be applied.

As illustrated in FIG. 7, two levels of consecutive binary splits in one direction have the same coding block structure as binary splitting for a center partition after the ternary splitting. In such a case, binary tree splitting (in the given direction) for the center partition of the ternary tree splitting may be limited. The limitation may be applied to CUs of all pictures. When specific splitting is limited, signaling of syntax elements may be modified by reflecting such a limitation case and the number of bits signaled for partitioning may be reduced through the modified signaling. For example, like the example illustrated in FIG. 7, when the binary tree splitting for the center partition of the CU is limited, a syntax element mtt_split_cu_binary_flag indicating whether the splitting is the binary splitting or the ternary splitting may not be signaled and the value may be inferred as 0 by the decoder.

Prediction

In order to reconstruct a current processing unit in which decoding is performed, decoded parts of a current picture or other pictures including the current processing unit may be used.

A picture using only the current picture for reconstruction, i.e., performing the intra prediction may be referred to as an intra picture or an I picture (slice), a picture (slice) using up to one motion vector and reference index in order to predict each unit may be referred to as a predictive picture or P picture (slice), and a picture (slice) using up to two motion vectors and reference indexes may be referred to as a bi-predictive picture or B picture (slice).

The intra prediction means a prediction method that derives a current processing block from a data element (e.g., a sample value, etc.) of the same decoded picture (or slice). In other words, the intra prediction means a method for predicting a pixel value of the current processing block by referring to reconstructed areas in the current picture.

Hereinafter, the inter prediction will be described in more detail.

Inter Prediction

The inter prediction means a prediction method of deriving the current processing block based on data elements (e.g., the sample value or motion vector) of pictures other than the current picture. In other words, the intra prediction means a method for predicting a pixel value of the current processing block by referring to reconstructed areas in other reconstructed pictures other than the current picture.

The inter prediction (inter-picture prediction) as a technique for eliminating redundancy existing between pictures is mostly performed by motion estimation and motion compensation.

In the disclosure, a detailed description of the inter prediction method described in FIGS. 1 and 2 above is made and the decoder may be represented as an inter prediction based video/image decoding method of FIG. 10 and an inter-prediction unit in the decoding apparatus of FIG. 11 to be described below. Moreover, the encoder may be represented as an inter prediction based video/image encoding method of FIG. 8 and the inter-prediction unit in the encoding apparatus of FIG. 9 to be described below. In addition, encoded data by FIGS. 8 and 9 may be stored in the form of a bitstream.

The prediction unit of the encoding apparatus/decoding apparatus may derive the predicted sample by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index.

In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information.

In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block.

The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

FIGS. 8 and 9 are diagrams illustrating an inter prediction based video/image encoding method according to an embodiment of the disclosure and an inter prediction unit in an encoding apparatus according to an embodiment of the disclosure.

Referring to FIGS. 8 and 9, S801 may be performed by the inter-prediction unit 180 of the encoding apparatus and S802 may be performed by the residual processing unit of the encoding apparatus. Specifically, S802 may be performed the subtraction unit 115 of the encoding apparatus. In S803, prediction information may be derived by the inter-prediction unit 180 and encoded by the entropy encoding unit 190. In S803, residual information may be derived by the residual processing unit and encoded by the entropy encoding unit 190. The residual information is information on the residual samples. The residual information may include information on quantized transform coefficients for the residual samples.

As described above, the residual samples may be derived as transform coefficients by the transform unit 120 of the encoding apparatus and the transform coefficients may be derived as quantized transform coefficients by the quantization unit 130. Information on the quantized transform coefficients may be encoded through a residual coding procedure by the entropy encoding unit 190.

The encoding apparatus performs inter prediction for the current block (S801). The encoding apparatus may derive the inter prediction mode and the motion information of the current block and generate predicted samples of the current block. Here, an inter prediction mode determining procedure, a motion information deriving procedure, and a generation procedure of the prediction samples may be simultaneously performed and any one procedure may be performed earlier than other procedures. For example, the inter-prediction unit 180 of the encoding apparatus may include a prediction mode determination unit 181, a motion information derivation unit 182, and a predicted sample derivation unit 183, and the prediction mode determination unit 181 may determine the prediction mode for the current block, the motion information derivation unit 182 may derive the motion information of the current block, and the predicted sample derivation unit 183 may derive motion samples of the current block.

For example, the inter-prediction unit 180 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S802). The encoding apparatus may derive the residual samples by comparing original samples of the current block and the predicted samples.

The encoding apparatus encodes image information including prediction information and residual information (S803). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information.

Further, the information on the motion information may include information indicating whether to apply L0 prediction, L1 prediction, or bi-prediction. The residual information is information on the residual samples. The residual information may include information on quantized transform coefficients for the residual samples.

An output bitstream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstructed picture (or reconstructed samples or reconstructed blocks) in the memory and utilize the reconstructed picture as the reference picture. The in-loop filtering procedure may be further applied to the reconstructed picture as described above.

FIGS. 10 and 11 are diagrams illustrating an inter prediction based video/image decoding method according to an embodiment of the disclosure and an inter prediction unit in a decoding apparatus according to an embodiment of the disclosure.

Referring to FIGS. 10 and 11, the decoding apparatus may perform an operation corresponding to the operation performed by the encoding apparatus. The decoding apparatus may perform the prediction for the current block based on received prediction information and derive the prediction samples.

S1001 to S1003 may be performed by the inter-prediction unit 260 of the decoding apparatus and the residual information of S1004 may be obtained from the bitstream by the entropy decoding unit 210 of the decoding apparatus. The residual processing unit of the decoding apparatus may derive the residual samples for the current block based on the residual information. Specifically, the dequantization unit 220 of the residual processing unit may derive transform coefficients by performing dequantization based on quantized transform coefficients derived based on the residual information and the inverse transform unit 230 of the residual processing unit may derive the residual samples for the current block by performing inverse transform for the transform coefficients. S1005 may be performed by the addition unit 235 or the reconstruction unit of the decoding apparatus.

Specifically, the decoding apparatus may determine the prediction mode for the current block based on the received prediction information (S1001). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S1002). For example, when the skip mode or the merge mode is applied to the current block, the decoding apparatus may configure the merging candidate list to be described below and select one merge candidate among the merge candidates included in the merging candidate list. The selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. The selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration as described below and in this case, the motion information of the current block may be derived according to a procedure disclosed in the prediction mode to be described below. In this case, the candidate list configuration may be omitted.

The decoding apparatus may generate the predicted samples for the current block based on the motion information of the current block (S1003). In this case, the reference picture may be derived based on the reference picture index of the current block and the predicted samples of the current block may be derived by using the samples of the reference block indicated by the motion vector of the current block on the reference picture. In this case, as described below, in some cases, a prediction sample filtering procedure for all or some of the prediction samples of the current block may be further performed.

For example, the inter-prediction unit 260 of the decoding apparatus may include a prediction mode determination unit 261, a motion information derivation unit 262, and a predicted sample derivation unit 263, and the prediction mode determination unit 261 may determine the prediction mode for the current block based on the received prediction mode information, the motion information derivation unit 262 may derive the motion information (the motion vector and/or reference picture index) of the current block based on the information on the received motion information, and the predicted sample derivation unit 263 may derive the predicted samples of the current block.

The decoding apparatus generates the residual samples for the current block based on the received residual information (S1004). The decoding apparatus may generate the reconstructed samples for the current block based on the predicted samples and the residual samples and generate the reconstructed picture based on the generated reconstructed samples (S1005). Thereafter, the in-loop filtering procedure may be further applied to the reconstructed picture as described above.

As described above, the inter prediction procedure may include an inter prediction mode determining step, a motion information deriving step depending on the determined prediction mode, and a prediction performing (predicted sample generating) step based on the derived motion information.

Determination of Inter Prediction Mode

Various inter prediction modes may be used for predicting the current block in the picture. For example, various modes including a merge mode, a skip mode, an MVP mode, an affine mode, and the like may be used. A decoder side motion vector refinement (DMVR) mode, an adaptive motion vector resolution (AMVR) mode, etc., may be further used as an ancillary mode. The affine mode may be referred to as an affine motion prediction mode. The MVP mode may be referred to as an advanced motion vector prediction (AMVP) mode.

The prediction mode information indicating the inter prediction mode of the current block may be signaled from the encoding apparatus to the decoding apparatus. The prediction mode information may be included in a bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags.

For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may be configured as one candidate of the merging candidate list or MVP candidate list as described below.

Derivation of Motion Information According to Inter Prediction Mode

The inter prediction may be performed by using the motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on an SAD between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

Merge Mode and Skip Mode

FIG. 12 is a diagram for describing a neighboring block used in a merge mode or a skip mode as an embodiment to which the disclosure is applied.

When the merge mode is applied, the motion information of the current prediction block is not directly transmitted and the motion information of the current prediction block is derived by using the motion information of a neighboring prediction block. Accordingly, flag information indicating that the merge mode is used and a merge index indicating which neighboring prediction block is used are transmitted to indicate the motion information of the current prediction block.

The encoder may search a merge candidate block used for deriving the motion information of the current prediction block in order to perform the merge mode. For example, up to five merge candidate blocks may be used, but the disclosure is not limited thereto. In addition, the maximum number of merge candidate blocks may be transmitted in a slider header (or tile group header) and the disclosure is not limited thereto. After finding the merge candidate blocks, the encoder may generate the merging candidate list and selects a merge candidate block having the smallest cost among the merge candidate blocks as a final merge candidate block.

The disclosure provides various embodiments for the merge candidate block constituting the merging candidate list.

As the merging candidate list, for example, five merge candidate blocks may be used. For example, four spatial merge candidates and one temporal merge candidate may be used. As a specific example, in the case of the spatial merge candidate, the blocks illustrated in FIG. 12 may be used as the spatial merge candidate.

FIG. 13 is a flowchart illustrating a method for configuring a merging candidate list according to an embodiment to which the disclosure is applied.

Referring to FIG. 13, a coding apparatus (encoder/decoder) inserts the spatial merge candidates derived by searching the spatial neighboring blocks of the current block into the merging candidate list (S1301). For example, the spatial neighboring blocks may include a bottom left corner neighboring block, a left neighbor bock, a top right corner neighboring block, a top neighboring block, and a top left corner neighboring block of the current block. However, this is an example and additional neighboring blocks including a right neighboring block, a bottom neighboring block, a bottom right neighboring block, and the like may be further used as the spatial neighboring blocks in addition to the spatial neighboring blocks. The coding apparatus may derive available blocks by searching the spatial neighboring blocks based on a priority and derive the motion information of the detected blocks as the spatial merge candidates. For example, the encoder and decoder may search five blocks illustrated in FIG. 12 in the order of A1, B1, B0, A0, and B2 and sequentially index the available candidates and configure the indexed candidates as the merging candidate list.

The coding apparatus inserts the temporal merge candidate derived by searching the temporal neighboring block of the current block into the merging candidate list (S1302). The temporal neighboring block may be positioned on the reference picture which is a different picture from the current picture at which the current block is positioned. The reference picture at which the temporal neighboring block is positioned may be referred to as a collocated picture or a col picture. The temporal neighboring block may be searched in the order of a bottom right corner neighboring block and a bottom right center block of a co-located block for the current block on the col picture.

Meanwhile, when motion data compression is applied, specific motion information may be stored as representative motion information in the col picture for each predetermined storage unit. In this case, motion information for all blocks in the predetermined storage unit need not be stored, and as a result, a motion data compression effect may be obtained. In this case, the predetermined storage unit may be predetermined for each 16×16 sample unit or 8×8 sample unit or size information for the predetermined storage unit may be signaled from the encoder to the decoder. When the motion data compression is applied, the motion information of the temporal neighboring block may be replaced with the representative motion information of the predetermined storage unit at which the temporal neighboring block is positioned.

In other words, in this case, in terms of implementation, the temporal merge candidate may be derived based on motion information of a prediction block covering a location subject to arithmetic right shift and then arithmetic left shift by a predetermined value based on a coordinate (top left sample position) of the temporal neighboring block other than a prediction block positioned on the coordinate of the temporal neighboring block. For example, when the predetermined storage unit is a 2n×2n sample unit, if the coordinate of the temporal neighboring block is (xTnb, yTnb), motion information of a prediction block positioned at ((xTnb>>n)<<n), (yTnb>>n)<<n)) which is a modified location may be used for the temporal merge candidate.

Specifically, for example, when the predetermined storage unit is a 16×16 sample unit, if the coordinate of the temporal neighboring block is (xTnb, yTnb), motion information of a prediction block positioned at ((xTnb>>4)<<4), (yTnb>>4)<<4)) which is a modified location may be used for the temporal merge candidate. Alternatively, for example, when the predetermined storage unit is an 8×8 sample unit, if the coordinate of the temporal neighboring block is (xTnb, yTnb), motion information of a prediction block positioned at ((xTnb>>3)<<3), (yTnb>>3)<<3)) which is a modified location may be used for the temporal merge candidate.

The coding apparatus may check whether the current number of merge candidates is smaller than the maximum number of merge candidates (S1303). The maximum number of merge candidates may be predefined or signaled from the encoder to the decoder. For example, the encoder may generate information on the maximum number of merge candidates and encode the generated information and transfer the encoded information to the decoder in the form of a bitstream. When the maximum number of merge candidates is completely filled, a subsequent candidate addition process may not be performed.

As the checking result, when the current number of merge candidates is smaller than the maximum number of merge candidates, the coding apparatus inserts additional merge candidates into the merging candidate list (S1304). The additional merge candidates may include, for example, ATMVP, a combined bi-predictive merge candidate (when a slice type of current slice is type B) and/or a zero-vector merge candidate.

As the checking result, when the current number of merge candidates is not smaller than the maximum number of merge candidates, the coding apparatus may terminate the configuration of the merging candidate list. In this case, the encoder may select an optimal merge candidate among the merge candidates constituting the merging candidate list based on rate-distortion (RD) cost and signal selection information (e.g., merge index) indicating the selected merge candidate to the decoder. The decoder may select the optimal merge candidate based on the merging candidate list and the selection information.

The motion information of the selected merge candidate may be used as the motion information of the current block and the predicted samples of the current block may be derived based on the motion information of the current block as described above. The encoder may derive the residual samples of the current block based on the predicted samples and signal the residual information for the residual samples to the decoder. The decoder may generate the reconstructed samples based on the residual samples derived based on the residual information and the predicted samples and generate the reconstructed picture based on the generated reconstructed samples as described above.

When the skip mode is applied, the motion information of the current block may be derived by the same method as the case where the merge mode is applied as above. However, when the skip mode is applied, a residual signal for the corresponding block is omitted, and as a result, the predicted samples may be directly used as the reconstructed samples.

MVP Mode

FIG. 14 is a flowchart illustrating a method for configuring a merging candidate list according to an embodiment to which the disclosure is applied.

When the motion vector prediction (MVP) mode is applied, a motion vector predictor (mvp) candidate list may be generated by using the motion vector of the reconstructed spatial neighboring block (e.g., may be the neighboring block described in FIG. 12 above) and/or the motion vector corresponding to the temporal neighboring block (or Col block). In other words, the motion vector of the reconstructed spatial neighboring block and/or the motion vector corresponding to the temporal neighboring block may be used as the motion vector predictor candidate.

The information on the prediction may include selection information (e.g., an MVP flag or MVP index) indicating an optimal motion vector predictor candidate selected among the motion vector predictor candidates included in the list. In this case, the predictor may select the motion vector predictor of the current block among the motion vector predictor candidates included in the motion vector candidate list by using the selected information. The predictor of the encoding apparatus may obtain a motion vector difference (MVD) between the motion vector and the motion vector predictor of the current block and encode the obtained MVD and output the encoded MVD in the form of the bitstream. In other words, the MVD may be obtained by a value obtained by subtracting the motion vector predictor from the motion vector of the current block. In this case, the predictor of the decoding apparatus may obtain the motion vector difference included in the information on the prediction and derive the motion vector of the current block by adding the motion vector difference and the motion vector predictor. The predictor of the decoding apparatus may obtain or derive the reference picture index indicating the reference picture from the information on the prediction. For example, the motion vector predictor candidate list may be configured as illustrated in FIG. 14.

Affine Motion Prediction

FIG. 15 illustrates an example of motion models according to an embodiment of the disclosure.

A conventional image compression technology (e.g., high efficiency video coding (HEVC)) uses one motion vector in order to represent a motion of a coding block. Although an optimum motion in a block unit may be represented for each block in a method using one motion vector, the optimum motion may not be actually an optimum motion of each pixel. Accordingly, if optimum motion vector is determined in a pixel unit, coding efficiency will be increased. Therefore, an embodiment of the disclosure describes a motion prediction method of encoding or decoding a video signal using a multi-motion model. In particular, a motion vector may be represented in each pixel unit or subblock unit of a block using motion vectors at two to four control points. A prediction scheme using such motion vectors of a plurality of control points may be denoted as an affine motion prediction, an affine prediction, etc.

An affine motion model according to an embodiment of the disclosure may represent four motion models, such as those illustrated in FIG. 15. An affine motion model that represents three motions (translation, scale, and rotate) among motions capable of representing the Affine motion model is denoted as a similarity (or simplified) affine motion model. In describing embodiments of the disclosure, the similarity (or simplified) affine motion model is basically described for convenience of description, but the disclosure is not limited thereto.

FIG. 16 illustrates an example of a control point motion vector for an affine motion prediction according to an embodiment of the disclosure.

As in FIG. 16, an affine motion prediction may determine motion vectors at pixel positions (or subblocks) included in a block using a pair of two control point motion vectors (CPMV) v_0 and v_1. In this case, a set of the motion vectors may be denoted as an affine motion vector field (MVF). In this case, the affine motion vector field may be determined using Equation 1 below.

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases} \quad \text{[Equation 1]}$$

In Equation 1, v_0 (v_0={v_0 x, v_0y}) indicates a motion vector CPMV0 at a first control point at the top left position of a current block 1300. v_1 (v_1={v_1x, v_1y}) indicates a motion vector CPMV1 at a second control point at the top right position of the current block 1300. Furthermore, w indicates the width of the current block 1300. v(v={v_x, v_y}) indicates a motion vector at a {x,y} position. A motion vector in a subblock (or pixel) unit may be derived using Equation 1. In an embodiment, motion vector precision may be rounded as 1/16 precision.

FIG. 17 illustrates an example of a motion vector for each subblock of a block to which an affine motion prediction according to an embodiment of the disclosure has been applied.

Referring to FIG. 17, in a coding or decoding process, an affine motion vector field (MVF) may be determined in a pixel unit or block unit. That is, in an affine motion prediction, a motion vector of a current block may be derived in a pixel unit or a subblock unit. [223] If an affine motion vector field is determined in the pixel unit, a motion vector may be obtained based on each pixel value. If an affine motion vector field is determined in the block unit, a motion vector of a block may be obtained based on a center pixel value of the corresponding block. In the disclosure, as in FIG. 17, a case where an affine motion vector field (MVF) is determined in a 4*4 block unit is assumed. However, this is for convenience of description and does not limit an embodiment of the disclosure. FIG. 17 illustrates an example of a case where a coding block is composed of 16*16 samples and an affine motion vector field (MVF) is determined in a block unit of a 4*4 size.

An affine motion prediction may include an affine merge mode (or AF_MERGE) and an affine inter mode (or AF_INTER). The AF_INTER mode may include an AF_4_INTER mode using a four-parameter-based motion model and an AF_6_INTER mode using a six-parameter-based motion model.

Affine Merge Mode

AF_MERGE determines control point motion vector (CPMV)s according to the affine motion model of the neighbouring block coded as the affine motion prediction. An affine coded neighbouring block in a search order may be used for AF_MERGE. A current block can be coded as AF_MERGE when one or more of the neighbouring blocks are coded as affine motion prediction.

That is, if the affine merge mode is applied, CPMVs of a current block may be derived using CPMVs of a neighboring block. In this case, the CPMVs of the neighboring block may be used as the CPMVs of the current block without any change. The CPMVs of the neighboring block are modified based on the size of the neighboring block and the size of the current block and may be used as the CPMVs of the current block.

FIG. 18 illustrates an example of neighboring blocks used in an affine motion prediction in an affine merge mode according to an embodiment of the disclosure.

In the affine merge (AF_MERGE) mode, the encoder may perform encoding as in the following process.

Step-1: Scan neighboring blocks A to E 1810, 1820, 1830, 1840, and 1850 of a current coding block 1800 in the alphabetical sequence. A block first coded in the affine prediction mode according to the scanning sequence is determined as a candidate block of affine merge (AF_MERGE)

Step-2: Determine an affine motion model using a control point motion vector (CPMV) of a determined candidate block Step-3: Determine a control point motion vector (CPMV) of the current block 1800 according to the affine motion model of the candidate block, and determine the MVF of the current block 1800.

FIG. 19 illustrates an example in which a block on which an affine motion prediction is performed using neighboring blocks to which an affine motion prediction according to an embodiment of the disclosure has been applied.

For example, as in FIG. 19, if a block A 1920 is coded in an affine mode, after the block A 1920 is determined as a candidate block, an affine motion model may be derived using control point motion vectors (CPMV) (e.g., v2 and v3) of the block A 1920, and control point motion vectors (CPMV) v0 and v1 of a current block 1900 may be determined. The affine motion vector field (MVF) of the current block 1900 may be determined based on the control point motion vectors (CPMV) of the current block 1900, and encoding may be performed.

FIG. 20 is a diagram for describing a method of generating a merge candidate list using peripheral affine coding blocks according to an embodiment of the disclosure.

Referring to FIG. 20, if a CPMV pair is determined using an affine merge candidate, candidates, such as those illustrated in FIG. 20, may be used. In FIG. 20, a case where the scan sequence of a candidate list is set as A, B, C, D, and E is assumed. However, the disclosure is not limited thereto, and the scan sequence may be previously set in various sequences.

In an embodiment, if the number of candidates (hereinafter may be denoted as affine candidates) coded in an affine mode (or affine prediction) available in neighboring blocks (i.e., A, B, C, D, and E) is 0, an affine merge mode of a current block may be skipped. If the number of available affine candidates is one (e.g., A), a motion model of a corresponding candidate may be used to derive control point motion vectors CPMV_0 and CPMV_1 of a current block. In this case, an index indicative of the corresponding candidate may not be necessary (or coded). If the number of available affine candidates is two or more, two candidates in the scanning sequence may be configured as a candidate list for AF_MERGE. In this case, candidate selection information, such as an index indicative of a candidate selected within the candidate list, may be signaled. The selection information may be a flag or index information, and may be denoted as AF_MERGE_flag, AF_merge_idx, etc.

In an embodiment of the disclosure, motion compensation for the current block may be performed based on a size of a sub-block. In this case, a sub-block size of the affine block (current block) is derived. If both width and height of the sub-block are larger than 4 luma samples, a motion vectors for each sub-block is derived and DCT-IF based motion compensation (1/16 pel for luma and 1/32 for chroma) can be invoked for the sub-block. Otherwise, enhanced bi-linear interpolation filter based motion compensation is invoked for the whole affine block.

In an embodiment of the disclosure, when merge/skip flag is true and both width and height for the CU are larger than or equal to 8, an affine flag in CU level is signalled in the bitstream to indicate whether affine merge mode is used. And when the CU is coded as AF_MERGE, the merge candidate index with maximum value 5 is signalled for specifying which motion information candidate in the affine merge candidate list is used for the CUA FIGS. 21 and 22 are diagrams for describing a method of configuring an affine merge candidate list using a neighboring block encoded by an affine prediction according to an embodiment of the disclosure.

Referring to FIG. 21, the affine merge candidate list is constructed as following steps.

1) Insert Model Based Affine Candidates

Model based affine candidate means that the candidate is derived from the valid neighbor reconstructed block coded in the affine mode. As shown in FIG. 21, the scan order for the candidate block is from left (A), above (b), above right (C), left bottom (D) to above left (E).

If the neighbour left bottom block A is coded in 6-parameter affine mode, the motion vectors v_4, v_5, and v_6 of the top left corner, above right corner and left bottom corner of the CU which contains the block A are obtained. And the motion vectors v0, v_1, and v_2 of the top left corner on the current CU is calculated according to v_4, v_5, and v_6 by 6-parameter affine model.

If the neighbour left bottom block A is coded in 4-parameter affine mode, the motion vectors v_4 and v_5 of the top left corner and above right corner of the CU which contains the block A are obtained. And the motion vectors v_0 and v_1 of the top left corner on the current CU is calculated according to v_4 and v_5 by 4-parameter affine model.

2) Insert Control Point Based Affine Candidates

Referring to FIG. 21, control points based candidate means the candidate is constructed by combining the neighbor motion information of each control point.

The motion information for the control points is derived firstly from the specified spatial neighbors and temporal neighbor shown in FIG. 21. CP_k (k=1, 2, 3, 4) represents the k-th control point. A, B, C, D, E, F and G are spatial positions for predicting CP_k (k=1, 2, 3); H is temporal position for predicting CP4.

The coordinates of CP_1, CP_2, CP_3 and CP_4 is (0, 0), (W, 0), (H, 0) and (W, H), respectively, where W and H are the width and height of current block.

The motion information of each control point is obtained according to the following priority order.

For CP_1, the checking priority is A→B→C, A is used if it is available. Otherwise, if B is available, B is used. If both A and B are unavailable, C is used. If all the three candidates are unavailable, the motion information of CP1 cannot be obtained.

For CP_2, the checking priority is E→D;
For CP_3, the checking priority is G→F;
For CP_4, H is used.

Secondly, the combinations of controls points are used to construct the motion model.

Motion vectors of two control points are needed to compute the transform parameters in 4-parameter affine model. The two control points can be selected from one of the following six combinations ({CP_1, CP_4}, {CP_2, CP_3}, {CP_1, CP_2}, {CP_2, CP_4}, {CP_1, CP_3}, {CP_3, CP_4}). For example, use the CP_1 and CP_2 control points to construct 4-parameter affine motion model, denoted as Affine (CP_1, CP_2).

Motion vectors of three control points are needed to compute the transform parameters in 6-parameter affine model. The three control points can be selected from one of the following four combinations ({CP_1, CP_2, CP_4}, {CP_1, CP_2, CP_3}, {CP_2, CP_3, CP_4}, {CP_1, CP_3, CP_4}). For example, use CP_1, CP_2 and CPv3 control points to construct 6-parameter affine motion model, denoted as Affine (CP_1, CP_2, CP_3).

Also, in an embodiment of the disclosure, in the affine merge mode, if the affine merge candidate exists, it can be always considered as six-parameter affine mode.

Affine Inter Mode

FIG. 23 illustrates an example of neighboring blocks used in an affine motion prediction in an affine inter mode according to an embodiment of the disclosure.

Referring to FIG. 23, an affine motion prediction may include an affine merge mode (or AF_MERGE) and an affine inter mode (or AF_INTER). In the affine inter mode (AF_INTER), after two control point motion vector prediction (CPMVP) and CPMV are determined, a control point motion vector difference CPMVD corresponding to a difference may be transmitted from the encoder to the decoder. A detained process of encoding the affine inter mode AF_INTER may be as follows.

Step-1: Determine two CPMVP pair candidates

Step-1.1: Determine a maximum of twelfth CPMVP candidate combinations (refer to Equation 2 below)

$$\{(v_0, v_1, v_2) | v_0 = \{v_A, v_B, v_C\}, v_1 = \{v_D, v_E\}, v_2 = \{v_F, v_G\}\} \quad \text{[Equation 2]}$$

In Equation 2, v_0 indicates a motion vector CPMV0 at a top left control point 2310 of a current block 2300. v_1 indicates a motion vector CPMV1 at the top right control point 2311 of the current block 2300. v_2 indicates a motion vector CPMV2 at the bottom left control point 2312 of the current block 2300. v_A indicates the motion vector of a neighboring block A 2320 neighboring the top left of the top left control point 2310 of the current block 2300. v_B indicates the motion vector of a neighboring block B 2322 neighboring the top of the top left control point 2310 of the current block 2300. vC indicates the motion vector of a neighboring block C 2324 neighboring the left of the top left control point 2310 of the current block 2300, v_D indicates the motion vector of a neighboring block D 2326 neighboring the top of the top right control point 2311 of the current block 2300. v_E indicates the motion vector of a neighboring block E 2328 neighboring the top right of the top right control point 2311 of the current block 2300. v_F indicates the motion vector of a neighboring block F 2330 neighboring the left of the bottom left control point 2312 of the current block 2300. v_G indicates the motion vector of a neighboring block G 2332 neighboring the left of the bottom left control point 2312 of the current block 2300.

Step-1.2: Use top two candidates sorted based on a smaller difference value (DV) in a CPMVP candidate combination (refer to Equation 3 below)

$$DV = |(v_{1x} - v_{0x})*h - (v_{2y} - v_{0y})*w| + |(v_{1y} - v_{0y})* h + (v_{2x} - v_{0x})*w| \quad \text{[Equation 3]}$$

v_0x indicates the x-axis element of the motion vector V0 or CPMV0 at the top left control point 2310 of the current block 2300. v_1x indicates the x-axis element of the motion vector V1 or CPMV1 at the top right control point 2311 of the current block 2300. v_2x indicates the x-axis element of the motion vector V_2 or CPMV2 at the bottom left control point 2312 of the current block 2300. v_0y indicates the y-axis element of the motion vector V_0 or CPMV_0 at the top left control point 2310 of the current block 2300. v_1y indicates the y-axis element of the motion vector V_1 or CPMV_1 at the top right control point 2311 of the current block 2300. v_2 y indicates the y-axis element of the motion vector V_2 or CPMV_2 at the bottom left control point 2312 of the current block 2300. w indicates the width of the current block 2300. h indicates the height of the current block 2300.

Step-2: Use an AMVP candidate list when a control point motion vector predictor (CPMVP) pair candidate is smaller than 2

Step-3: Determine a control point motion vector predictor (CPMVP) of each of two candidates, and optimally selects a candidate and CPMV having a smaller value as by comparing RD costs Step-4: Transmit an index corresponding to the optimum candidate and a control point motion vector difference (CPMVD)

In an embodiment of the disclosure, in AF_INTER, the construction process of the CPMVP candidate is provided. Same as AMVP, the number of candidate is two and the index indicating the position of candidate list is signaled.

The construction process of a CPMVP candidate list is as follows:

1) Scan the neighbouring blocks to check whether it is coded as the affine motion prediction or not. If the scanned block is coded as the affine prediction, derive the motion vector pair of current block from the affine motion model of the scanned neighbouring block until the number of candidate is two.

2) If the number of candidate is less than two, perform the candidate construction process. Also, in an embodiment of the disclosure, a four-parameter (two-control-point) affine inter mode is used to predict the content with the motion model of zoom-in/out and rotation. As shown in FIG. 16, the affine motion field of the block is described by two-control-point motion vectors.

The motion vector field (MVF) of a block is described by the previously described equation 1.

In the prior art, the advanced motion vector prediction (AMVP) mode needs to signal a motion vector prediction (MVP) index and motion vector differences (MVDs). When the AMVP mode is applied in this disclosure, an affine_flag is signaled to indicate whether the affine prediction is used. If the affine prediction is applied, the syntax of inter_dir, ref_idx, mvp_index, and two MVDs (mvd_x and mvd_y) are signaled. An affine MVP pair candidate list containing two affine MVP pairs is generated. The signaled mvp_index is used to select one of them. The affine MVP pair is generated by two kinds of affine MVP candidates. One is the spatial inherited affine candidate, and the other is the corner derived affine candidate. If the neighbor CUs are coded in the affine mode, the spatial inherited affine candidates can be generated. The affine motion model of the neighbor affine coded block is used to generate the motion vectors of the two-control point MVP pair. The MVs of the two-control point MVP pair of the spatial inherited affine candidate are derived by using the following equations.

$$V_{0x} = V_{B0x} + (V_{B2\_x} - V_{B0x})*(\text{posCurCU\_Y} - \text{posRefCU\_Y})/\text{RefCU\_height} + (V_{B1x} - V_{B0x})*(\text{posCurCU\_X} - \text{posRefCU\_X})/\text{RefCU\_width} \quad \text{[Equation 4]}$$

$$V_{0y} = V_{B0y} + (V_{B2\_y} - V_{B0y})*(\text{posCurCU\_Y} - \text{posRefCU\_Y})/\text{RefCU\_height} + (V_{B1y} - V_{B0y})*(\text{posCurCU\_X} - \text{posRefCU\_X})/\text{RefCU\_width} \quad \text{[Equation 5]}$$

Where V_B0, V_B1, and V_B2 can be replaced by the top-left MV, top-right MV, and bottom-left MV of any reference/neighbor CU, (posCurCU_X, posCurCU_Y) is the position of the top-left sample of the current CU relative to the top-left sample of the frame, (posRefCU_X, posRefCU_Y) is the position of the top-left sample of the reference/neighbor CU relative to the top-left sample of the frame.

$$V_{1x} = V_{B0x} + (B_{B1x} - V_{B0x})*\text{CU\_width}/\text{RefCU\_width} \quad \text{[Equation 6]}$$

$$V_{1y} = V_{B0y} + (V_{B1y} - V_{B0y})*\text{CU\_width}/\text{RefCU\_width} \quad \text{[Equation 7]}$$

FIG. 24 illustrates an example of neighboring blocks used for an affine motion prediction in the affine inter mode according to an embodiment of the disclosure.

Referring to FIG. 24, if the number of the MVP pairs is smaller than 2, the corner derived affine candidate is used. The neighbor motion vectors, as shown in FIG. 24, are used to derive the affine MVP pair. For the first corner derived affine candidate, the first available MV in set A (A0, A1, and A2) and first available MV in set B (B0 and B1) are used to construct the first MVP pair. For the second corner derived affine candidate, the first available MV in set A and first available MV in set C (C0 and C1) are used to calculate the MV of top-right control point. The first available MV in set A and the calculated top-right control point MV are the second MVP pair.

In an embodiment of the disclosure, two candidate sets with two (three) candidates {mv_0, mv_1} ({mv_0, mv_1, mv_2) are used to predict two (three) control points of the affine motion model. Given motion vector difference vectors, mvd_0, mvd_1, mvd_2, the control points are calculated by using the following equations.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0 \qquad \text{[Equation 8]}$$

FIGS. 25 and 26 are diagrams illustrating a method of deriving motion vector candidates using motion information of neighboring blocks in the affine inter mode according to an embodiment of the disclosure.

The affine candidate list is appended sequentially by extending affine motion from spatial neighboring blocks (extrapolated affine candidates), the combination of motion vectors from spatial neighboring blocks (virtual affine candidates) and HEVC motion vector prediction (MVP) candidates until there are two affine MVPs in the candidate list. The candidate sets are constructed as follows:

1. Up to two different affine MV predictor sets are derived from affine motion of the neighboring blocks. Neighboring blocks A0, A1, B0, B1, and B2 as shown in FIG. 25 are checked. If the neighboring block is coded using affine motion model and its reference frame is same as the reference frame of the current block, MVs at two (for 4-parameter affine model) or three (for 6-parameter affine model) control points of the current block are derived from the affine model of this neighbor.

2. FIG. 29 shows the neighboring blocks used to generate the virtual affine candidate set. The neighboring MVs are divided into three groups: S_0={mv_A, mv_B, mv_C}, S_1={mv_D, mv_E} and S_2={mv_F, mv_G}. mv_0 is the first MV in S0 that refers to the same reference picture as the current block; mv_1 is the first MV in S1 that refers to the same reference picture of the current block; and mv_2 is the first in S2 that refers to the same reference picture of the current block.

If only mv_0 and mv_1 can be found, mv_2 is derived as by using the following equation.

$$\overline{mv}_2^x = \overline{mv}_0^x - h\frac{(\overline{mv}_1^y - \overline{mv}_0^y)}{w},$$

$$\overline{mv}_2^y = \overline{mv}_0^y + h\frac{(\overline{mv}_1^x - \overline{mv}_0^x)}{w}, \qquad \text{[Equation 9]}$$

Referring to Equation 9, the current block size is W×H.

If only mv_0 and mv_2 can be found, mv_1 is derived by using the following equation.

$$\overline{mv}_1^x = \overline{mv}_0^x + h\frac{(\overline{mv}_2^y - \overline{mv}_0^y)}{w},$$

$$\overline{mv}_1^y = \overline{mv}_0^y - h\frac{(\overline{mv}_2^x - \overline{mv}_0^x)}{w}. \qquad \text{[Equation 10]}$$

In an embodiment of the disclosure, Affine inter may be performed according to the following sequence.

Input: affine motion parameters, reference picture samples
Output: prediction block of a CU
Process
Derive sub-block size of the affine block
If both width and height of the sub-block are larger than 4 luma samples,
For each sub-block
Derive the motion vector for the sub-block.
DCT-IF based motion compensation (1/16 pel for luma and 1/32 for chroma) is invoked for the sub-block
Otherwise, enhanced bi-linear interpolation filter based motion compensation is invoked for the whole affine block Also, in an embodiment of the disclosure, when merge/skip flag is false and both width and height for the CU are larger than or equal to 8, an affine flag in CU level is signalled in the bitstream to indicate whether affine inter mode is used. And when the CU is coded as affine inter mode, a model flag is signalled for specifying whether 4-parameter or 6-parameter affine model is used for this CU. If the model flag is true, AF_6_INTER mode (6-parameter affine model) is applied and 3 MVDs will be parsed; otherwise, AF_6_INTER mode (4-parameter affine model) is applied and 2 MVDs will be parsed.

In AF_4_INTER mode, similar to affine merge mode, affine motion vector pairs extrapolated from neighbour blocks coded in the affine mode are constructed and insert into candidate list firstly.

After that, if the size of the candidate list is smaller than 4, candidates with motion vector pair {(v_0, v_1)|v0={v_A, v_B,v_c},v_1={v_D, v_E}} is constructed using the neighbour blocks. As shown in FIG. 22, v_0 is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select v_1 from the neighbour block D and E is similar. When the candidate list is larger than 4, the candidates are firstly sorted according to the consistency of the neighbouring motion vectors (similarity of the two motion vectors in a pair candidate) and only the first four candidates are kept.

If the number of candidate list is smaller than 4, the list is padded by the motion vector pair composed by duplicating each of the AMVP candidates.

In AF_6_INTER mode, similar to affine merge mode, affine motion vector triples extrapolated from neighbour blocks coded in the affine mode are constructed and insert into candidate list firstly.

After that, if the size of the candidate list is smaller than 4, candidates with motion vector triples {(v_0, v_1, v_2)|v0={v_A, v_B, v_c}, v1={v_D, v_E}, v2={v_G, v_H}} is constructed using the neighbour blocks. As shown in FIG. 22, v_0 is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select v_1 from the neighbour block D and E, and select v_2 from F and G is similar. When the candidate list is larger than 4, the candidates are firstly sorted according to the consistency of the neighbouring motion vectors (similarity of the two motion vectors in a triple candidate) and only the first four candidates are kept.

If the number of candidate list is smaller than 4, the list is padded by the motion vector triple composed by duplicating each of the AMVP candidates.

After the CPMV of the current CU are derived, according to the number of affine parameters, the MVF of the current CU is generated according to the following Equation 11 for 4-parameter affine model, and according to the following Equation 12 for 6-parameters affine model.

$$\begin{cases} v_x = \dfrac{v_{1x} - v_{0x}}{W}x - \dfrac{v_{1y} - v_{0y}}{W}y + v_{0x} \\ v_y = \dfrac{v_{1y} - v_{0y}}{W}x - \dfrac{v_{1x} - v_{0x}}{W}y + v_{0y} \end{cases} \quad [\text{Equation 11}]$$

$$\begin{cases} v_x = \dfrac{v_{1x} - v_{0x}}{W}x - \dfrac{v_{2x} - v_{0x}}{H}y + v_{0x} \\ v_y = \dfrac{v_{1y} - v_{0y}}{W}x - \dfrac{v_{2y} - v_{0y}}{H}y + v_{0y} \end{cases} \quad [\text{Equation 12}]$$

The sub-block size MXN is derived as in the following Equation 13, where MvPre is the motion vector fraction accuracy (1/16).

$$\begin{cases} M = \text{clip3}\left(4, w, \dfrac{w \times MvPre}{\max(\text{abs}(v_{1x} - v_{0x}), \text{abs}(v_{1y} - v_{0y}))}\right) \\ N = \text{clip3}\left(4, h, \dfrac{h \times MvPre}{\max(\text{abs}(v_{2x} - v_{0x}), \text{abs}(v_{2y} - v_{0y}))}\right) \end{cases} \quad [\text{Equation 13}]$$

After derived by Equation 12, M and N should be adjusted downward if necessary to make it a divisor of w and h, respectively. If M or N is smaller than 8, WIF is applied; otherwise, sub-block based affine motion compensation is applied.

FIG. 27 illustrates an example of a method of deriving an affine motion vector field in a subblock unit according to an embodiment of the disclosure.

Referring to FIG. 27, to derive motion vector of each M×N sub-block, the motion vector of the center sample of each sub-block, as shown in FIG. 27, is calculated according to Equation 11 or Equation 12, and rounded to 1/16 fraction accuracy. Then the SHVC upsampling interpolation filters are applied to generate the prediction of each sub-block with derived motion vector.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample, the additional interpolation filters of 1/32 pel fractional positions are derived by using the average of the filters of the two neighbouring 1/16 pel fractional positions.

AF_MERGE mode is selected at the encoder-side in the similar way as conventional merge mode selection is performed. The candidate list is constructed firstly, and minimum RD-cost inside the candidates is selected to compare with RD-cost of other inter modes. Result of this comparison is a decision whether AF_MERGE is applied or not.

For AF_4_INTER mode, a RD cost check is used to determine which motion vector pair candidate is selected as the control point motion vector prediction (CPMVP) of the current CU. After the CPMVP of the current affine CU is determined, affine motion estimation is applied and the control point motion vector (CPMV) is found. Then the difference of the CPMV and the CPMVP is decided.

In encoder side, AF_6_INTER mode will only be verified when AF_MERGE or AF_4_INTER mode is selected as the best mode in the previous mode selected stage.

In an embodiment of the disclosure, affine inter (affine AMVP) mode can be performed as below:

1) AFFINE_MERGE_IMPROVE: instead of finding the first neighboring block in the affine mode, the improvement tries to find the neighboring block with the largest coding unit size as the affine merge candidate.

2) AFFINE_AMVP_IMPROVE: add the neighboring blocks in the affine mode to the affine AMVP candidate list similar to the traditional AMVP process.

The detailed affine AMVP candidate list construction process is as follows.

First, the below left neighboring block is checked whether it is using the affine motion model and has the reference index with the current reference index. If it does not exist, the left neighboring block is then checked in the same way. If it does not exist, the below left neighboring block is checked whether it is using the affine motion model and with the different reference index. If it exists, the scaled affine motion vector is added to the reference picture list. If it does not exist, the left neighboring block with be checked in the same way. [330] Second, the above right neighboring block, the above neighboring block, and above left neighboring block will then be checked in the same way.

If we have found two candidates after the above processes, we will have finished constructing the affine AMVP candidate lists. If we have not found two candidates, the original process in the JEM software will be performed to construct the affine AMVP candidate lists.

3) AFFINE_SIX_PARAM: besides the four-parameter affine motion model, six-parameter affine motion model is also added as an additional model.

The six parameter affine motion model is derived by using the following equation.

$$\begin{cases} MV_x = ax + by + c \\ MV_y = dx + ey + f \end{cases} \quad [\text{Equation 14}]$$

Since there are six-parameters in the above motion model, three motion vectors in the above left position MV_0, the above right position MV_1, and the bottom left position MV_2 are needed to determine the model. The three motion vectors are determined in a similar way as the two motion vectors in the four-parameter affine motion model. Note that the affine model merge is always set as the six-parameter affine motion model.

4) AFFINE_CLIP_REMOVE: delete the motion vector constraints for all the affine motion vectors. Let the motion compensation process handle the motion vector constraints themselves.

Affine Motion Model

As described above, various affine motion models may be used or considered in the Affine inter prediction. For example, the Affine motion model may represent four motions as in FIG. 15. An affine motion model that represents three motions (translation, scale, and rotate), among motions capable of representing the Affine motion model, may be called a similarity (or simplified) affine motion model. The number of CPMVs derived depending on which one of the affine motion models is used and/or a method of deriving a sample/subblock unit MV of a current block may be different.

motion model can be used. In AF_INTER, a six-parameter motion model is proposed to use in addition to the existing a four parameter motion model in JEM. The six-parameter affine motion model is described in the following Equation 15.

$$x'=a*x+b*y+c$$

$$y'=d*x+e*y+f \qquad \text{[Equation 15]}$$

Here, the coefficients a, b, c, d, e, and f are the affine motion parameters and, (x,y) and (x',y') are the co-ordinates of pixel location before and after the transformation of the affine motion model. To use the affine motion model in video coding, if CPMV0, CPMV1 and CPMV2 are the MV for CP0 (left above), CP1 (right above) and CP2 (left bottom), Equation 16 can be described as:

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases} \qquad \text{[Equation 16]}$$

where CPMV_0={v_0x,v_0y}, CPMV_1={v_1x,v_1y}, CPMV_2={v_2 x,v_2y}, and w and h are the width and the height of coding block, respectively. Equation 16 describes the motion vector field (MVF) of a block.

A flag is parsed at the CU level to indicate whether the four-parameter or the six-parameter affine motion model is used when the neighboring blocks are coded as the affine prediction. If no neighboring block is coded as the affine prediction, the flag is skipped and four-parameter model is used for the affine prediction. In other words, the six-parameter model is considered in the condition that one or more of the neighboring blocks are coded as the affine motion model. When it comes to the number of CPMVD, two and three CPMVDs are signaled for the four-parameter and six-parameter affine motion model, respectively. [345] Also, in an embodiment of the disclosure, pattern-matched motion vector refinement can be used. In the pattern-matched motion vector derivation (named PMMVD in JEM encoder description, shortened to PMVD in this document) of JEM, the decoder needs to evaluate several motion vector (MV) candidates to determine a starting MV candidate for CU-level search. In sub-CU-level search, in addition to the best CU-level MV, several MV candidates are added. The decoder needs to evaluate these MV candidates to find the best MV, which requires a lot of memory bandwidth. In the proposed pattern-matched motion vector refinement (PMVR), the concepts of template matching and bilateral matching in PMVD in JEM are adopted. One PMVR_flag is signaled when skip mode or merge mode is selected to indicate PMVR is enabled or not. To reduce the memory bandwidth requirement significantly in comparison with PMVD, a MV candidate list is generated, and a starting MV candidate index is explicitly signaled if PMVR is applied.

The candidate list is generated by using merge candidate list generation process, but the sub-CU merge candidates, e.g., the affine candidates and ATMVP candidates, are excluded. For bilateral matching, only the uni-prediction MV candidate is included. A bi-prediction MV candidate is divided into two uni-prediction MV candidates. Also, similar MV candidates (MV differences smaller than a pre-defined threshold) are also removed. For the CU-level search, a diamond search MV refinement is performed starting from the signaled MV candidate.

The sub-CU-level search is only enabled for the bilateral matching merge mode. To reduce memory bandwidth, only the MV determined from the CU-level search is evaluated. The search window of the sub-CU-level search for all sub-CUs is the same as the search window of the CU-level search. Therefore, no additional bandwidth is required for sub-CU-level search.

The template matching is also used to refine the MVP in AMVP mode. In AMVP mode, two MVPs are generated by using HEVC MVP generation process, and one MVP index is signaled to select one of them. The selected MVP is further refined by using template matching in PMVR. If the adaptive motion vector resolution (AMVR) is applied, the MVP is rounded to the corresponding precision before template matching refinement. This refinement process is named as pattern-matched motion vector predictor refinement (PMVPR). In the rest of this document, if not particularly specified, PMVR includes template matching PMVR, bilateral matching PMVR, and PMVPR.

To reduce the memory bandwidth requirement, the PMVR is disabled for 4×4, 4×8, and 8×4 CUs. To further reduce the memory bandwidth requirement, the search range of {template matching, bilateral matching} for CU area equal to 64 is reduced to {±2, ±4}, and the search range of {template matching, bilateral matching} for CU area larger than 64 is reduced to {±6, ±8}. By using all the above methods described in this PMVR section, the required memory bandwidth is reduced from 45.9× in PMVD of JEM-7.0 to 3.1× in PMVR, compared to the worst case in HEVC.

Application Technology when Affine is Used in a Non-QT Block

FIG. 28 illustrates a method of generating a prediction block and a motion vector in an inter prediction to which an affine motion model according to an embodiment of the disclosure has been applied.

FIG. 28 shows an equation for deriving a motion vector if an affine motion model is applied. The motion vector may be derived based on the following equation 17.

$$V_x=(1-a)x-by-e$$

$$(V_x,V_y)=(x-x',y-y')$$

$$V_y=-cx+(1-d)y-f \qquad \text{[Equation 17]}$$

In this case, v_x indicates the x component of a sample unit motion vector of an (x, y) coordinate sample within a current block. v_y indicates the y component of the sample unit motion vector of the (x, y) coordinate sample within the current block. That is, (v_x, v_y) becomes sample unit motion vectors of the (x, y) coordinate sample. In this case, a, b, c, d, e, and f indicate parameters of an equation for deriving the sample unit motion vectors of the (x, y) coordinates from the control points (CP) of the current block. The CP may be represented as a control pixel. The parameters may be derived from motion information of CPs of each PU transmitted in a PU unit. The equation for deriving the sample unit motion vectors derived from the motion information of the CPs may be applied to each sample of a block, and may be derived as the position of the sample within a reference image based on the x-axis and y-axis relative position of each sample. The sample unit motion vector may be differently derived depending on the size, asymmetrical or symmetrical, block position, etc. of a block in a QTBT(TT) block partition structure, and a detailed embodiment thereof is illustrated through FIGS. 29 to 38.

FIG. 29 is a diagram illustrating a method of performing a motion compensation based on a motion vector of a control point according to an embodiment of the disclosure.

Referring to FIG. 29, a case where a current block is an 2N×2N block is assumed and described. For example, a motion vector of a top left sample within the current block may be said to be v_0. Furthermore, the motion vectors of CPs may be said to be v_1 and v_2 using, as CPs, the samples of neighboring blocks neighboring the current block. That is, assuming that the width and height of the current block are S and coordinates at the top left sample position of the current block are (xp, yp), the coordinates of CP0 among the CPs may be said to be (xp, yp), the coordinates of CP1 may be said to be (xp+S, yp), and the coordinates of CP2 may be said to be (xp, yp+S). The motion vector of the CP0 may be said to be v_0, the motion vector of the CP1 may be said to be v_1, and the motion vector of the CP2 may be said to be v_2. A sample unit motion vector may be derived using the motion vectors of the CPs. The sample unit motion vector may be derived based on the following equation 18.

$$V_x = \frac{V_{x_1} - V_{x_0}}{S}x - \frac{V_{x_2} - V_{x_0}}{S}y + V_{x_0}$$
$$V_y = \frac{V_{y_1} - V_{y_0}}{S}x - \frac{V_{y_2} - V_{y_0}}{S}y + V_{y_0}$$
[Equation 18]

In this case, v_x and v_y indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2. The motion vectors of samples within the current block may be derived based on relative positions within the current block according to an equation for deriving a sample unit motion vector, such as Equation 18.

FIG. 30 is a diagram illustrating a method of performing a motion compensation based on motion vectors of control points in a nonregular block according to an embodiment of the disclosure.

FIG. 30 illustrates the CPs of a block partitioned into N×2N. An equation for deriving a sample unit motion vector within a current block may be driven using the same method as that of the partitioning type 2N×2N. In a process of deriving the equation, a width value suitable for a shape of the current block may be used. In order to derive the sample unit motion vector, three CPs may be derived. The positions of the CPs may be adjusted as in FIG. 30. That is, assuming that the width and height of a current block are S/2 and S and the coordinates of the current block at the top left sample position are (xp, yp), the coordinates of CP0 of the CPs may be (xp, yp), the coordinates of CP1 thereof may be (xp+S/2, yp), and the coordinates of CP2 may be (xp, yp+S). The sample unit motion vector may be derived based on the following equation 19.

$$V_x = \frac{2(V_{x_1} - V_{x_0})}{S}x - \frac{V_{x_2} - V_{x_0}}{S}y + V_{x_0}$$
[Equation 19]
$$V_y = \frac{2(V_{y_1} - V_{y_0})}{S}x - \frac{V_{y_2} - V_{y_0}}{S}y + V_{y_0}$$
-continued In this case, vx and vy indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2, respectively. Equation 3 indicates an equation for deriving a sample unit motion vector in which the width of the current block is considered to be S/2. The motion vectors of samples within the current block partitioned from a CU based on the partitioning type N×2N may be derived based on relative positions within the current block according to an equation for deriving a sample unit motion vector, such as Equation 19.

FIG. 31 is a diagram illustrating a method of performing a motion compensation based on motion vectors of control points in a nonregular block according to an embodiment of the disclosure.

FIG. 31 illustrates blocks partitioned based on the partitioning type 2N×N. In order to derive a sample unit motion vector, three CPs may be derived. The height of a current block may be adjusted to S/2 based on a shape of the current block shown in FIG. 31 by adjusting the positions of the CPs as in FIG. 31. That is, assuming that the width and height of the current block are S and S/2 and the coordinates of the current block at the top left sample position are (xp, yp), the coordinates of CP0 among the CPs may be (xp, yp), the coordinates of CP1 may be (xp+S, yp), and the coordinates of CP2 may be (xp, yp+S/2). A sample unit motion vector may be derived based on the following equation 20.

$$V_x = \frac{V_{x_1} - V_{x_0}}{S}x - \frac{2(V_{x_2} - V_{x_0})}{S}y + V_{x_0}$$
[Equation 20]
$$V_y = \frac{V_{y_1} - V_{y_0}}{S}x - \frac{2(V_{y_2} - V_{y_0})}{S}y + V_{y_0}$$

In this case, v_x and v_y indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2, respectively. Equation 4 indicates an equation for deriving a sample unit motion vector in which the height of the current block has been considered to be S/2. Motion vectors of each sample within a current block partitioned from a CU based on the partitioning type 2N×N may be derived based on relative positions within the current block according to an equation for deriving a sample unit motion vector, such as Equation 4.18.

FIGS. 32 to 38 are diagrams illustrating a method of performing a motion compensation based on motion vectors of control points in a nonregular block according to an embodiment of the disclosure.

FIG. 32 illustrates the CPs of asymmetrical current blocks. As illustrated in FIG. 32, the width and height of the asymmetrical current blocks may be said to be W and H. In order to derive a sample unit motion vector, three CPs of each current block may be derived. The coordinates of the CPs may be adjusted based on a width and height based on a shape of a current block as in FIG. 32. That is, assuming that the width and height of the current block is W and H and the coordinates of each current block at a top left sample position are (xp, yp), the coordinates of CP0 among the CPs may be set as (xp, yp), the coordinates of CP1 may be set as (xp+W, yp), and the coordinates of CP2 may be set as (xp, yp+H). In this case, a sample unit motion vector within the current block may be derived based on the following equation 21.

$$V_x = \frac{V_{x_1} - V_{x_0}}{W}x - \frac{V_{x_2} - V_{x_0}}{H}y + V_{x_0}$$
$$V_y = \frac{V_{y_1} - V_{y_0}}{W}x - \frac{V_{y_2} - V_{y_0}}{H}y + V_{y_0}$$
[Equation 21]

In this case, v_x and v_y indicate the x component and y component of a motion vector for a sample at (x, y) coordinates within the current block, respectively. v_x0 and v_y0 indicate the x component and y component of a motion vector v_0 for the CP0, respectively. v_x1 and v_y1 indicate the x component and y component of a motion vector v_1 for the CP1, respectively. v_x2 and v_y2 indicate the x component and y component of a motion vector v_2 for the CP2. Equation 21 indicates an equation for deriving a sample unit motion vector in which the width and height of asymmetrical current blocks have been considered.

Meanwhile, according to the disclosure, in order to reduce the amount of data for motion information of CPs indicated in a block unit, motion information prediction candidates for at least one CP may be selected based on motion information of a neighboring block or a neighbor sample for a current block. The motion information prediction candidate may be called an affine motion information candidate or an affine motion vector candidate. The affine motion information candidates may include the contents disclosed with reference to FIGS. 33 to 38, for example.

MVD Coding

The current state-of-the art video coding standard uses motion vectors and its motion vector predictors to generate motion vector differences (MVD). The MVD can be more formally defined as the difference between the motion vector and the motion vector predictor. Similar to the motion vector, the MVD has an x 0 and y component that correspond to the motion in x (horizontal) and y (vertical) directions. The MVD is an attribute that is available only when the coding unit is encoded using the (Advanced) Motion Vector Prediction ((A)MVP) mode.

Once the MVD is determined, it is then encoded using entropy techniques. The video standards rely on using MVDs as one of its possible ways to exploit the redundancy in motion vectors and to achieve compression. At the decoder, the motion vector difference (MVD) is decoded before the motion vectors of the coding unit are decoded. Encoding MVD over encoding the actual motion vectors serves to exploit the redundancy between the motion vectors and its predictors and in so doing enhance the compression efficiency. The input to the MVD coding stage at the decoder is just the coded MVD bins that have been parsed for decoding. The inputs to the MVD coding stage at the encoder are the actual MVD values and additionally a flag ("imv" flag) that indicates the resolution for the MVD encoding. The flag is used to decide if the MVD should be expressed as 1-pel (or pixel), 4-pel or as quarter-pel.

FIG. 39 illustrates an overall coding structure for deriving a motion vector according to an embodiment of the disclosure.

Referring to FIG. 39, the coding unit is initially checked if it is the Merge Mode (S3901).

If the coding unit is in Merge mode, an affine flag and merge index are parsed to proceed with the decoding (S3902).

If the coding unit is not in Merge mode, it then exists in the AMVP mode. In the AMVP mode, the list information is first parsed, i.e., if List 0 or List 1 or both the lists are to be used (S3903).

Then, the affine flag is parsed (S3904). Following this, the parsed Affine flag is checked if it is true or false (S3905).

If true, then parse_MVD_LT and parse_MVD_RT corresponding to the left (LT) and right (RT) MVDs are processed (S3906). If the Affine flag is false, then the MVD is processed (S3907). Affine motion modeling in the special case of AMVP will be described in detail below.

FIG. 40 shows an example of an MVD coding structure according to an embodiment of the disclosure.

Referring to FIG. 40, first and foremost, the MVD greater than zero flags for the horizontal (MVDxGT0) and vertical (MVDYGT0) components are parsed (S4001).

Following this, the parsed data for the horizontal component is checked if it's greater than zero (i.e., MVDxGT0) (S4002). If the MVDxGT0 flag is true (i.e. MVDxGT0 is equal to '1'), then the horizontal component greater than one is parsed (i.e., MVDxGT1) (S4002). If the MVDxGT0 is not true (i.e. MVDxGT0 is equal to '0'), then the MVDxGT1 data is not parsed.

A similar procedure is then followed for the vertical component (S4003, S4004).

Following this, the parsed MVD data can be processed further in the blocks labelled MVDx_Rem_Level and MVDy_Rem_Level in order to obtain the reconstructed MVDs (S4005, S4006).

FIG. 41 shows an example of an MVD coding structure according to an embodiment of the disclosure.

FIG. 41 illustrates how the decoder processes the data in the block MVDx_Rem_Level in FIG. 40 further so as to decode the MVDx component. If the decoded flag indicating that the parsed data would be greater than zero (i.e., MVDxGT0) is true (S4101) and the decoded flag indicating the parsed data would be greater than one (i.e., MVDxGT1) is true (S4102), then the bins corresponding to the parsed MVDx component are decoded using Exponential Golomb (EG) Code with order one (S4103). The inputs to the EG would be the bins containing the absolute min two (i.e., Abs-2) MVD values and the Golomb order of one.

The sign information is then parsed by decoding the bypass bin containing the information (S4104). If the decoded bypass bin has a value of 1, then a negative sign is appended to the decoded MVDx. If however, the decoded bypass bin has a value of 0, then the decoded MVD is indicated as a positive value. If MVDxGR0 is true but the MVDxGR1 is not true, then this indicates that the absolute value of the MVDx being decoded is 1. The sign information is then parsed and updated. However, if the MVDxGR0 is false, then the reconstructed MVDx is 0.

A similar process is used to decode the MVDy (i.e., MVDy_Rem_Level) at the decoder is shown in the FIG. 42 below.

FIG. 42 shows an example of an MVD coding structure according to an embodiment of the disclosure.

Referring to FIG. 42, if the decoded flag indicating that the parsed MVDy greater than zero (i.e., MVDyGT0) is true (S4201), then the flag MVDyGR1 is checked (S4202).

If both MVDyGR0 and MVDyGR1 are true, then the parsed MVD data is decoded using EG Code with inputs being the bins containing the absolute minus two (Abs-2) MVD and order one (S4203). Following this, the sign information is parsed and decoded to obtain the decoded MVDy (S4204). If MVDyGR0 is true but MVDyGR1 is false then, the absolute vertical value is considered to be either +1/−1. The sign information is then parsed in a similar manner as explained above and decoded, so as to obtain the decoded MVDy. If the MVDyGR0 flag is false, MVDy is zero.

FIG. 43 shows an example of an MVD coding structure according to an embodiment of the disclosure.

Referring to FIG. 43, at the encoder the signed MVD values are to be encoded. Similar to the FIG. 41, the greater than zero bins are encoded for the x and y components (S4301, S4311), i.e., MVDxGR0 and MVDyGR0 by checking the absolute values of the horizontal and vertical components. Then the greater than one flags are encoded for the horizontal and vertical components (S4302, S4312), i.e., MVDxGR1 and MVDyGR1. Following this the absolute MVD values are encoded similar to the decoder, the horizontal and vertical components are encoded sequentially.

For the horizontal MVD encoding, if the absolute horizontal MVD component is greater zero (i.e., MVDxGR0) and if it is greater than one (i.e., MVDxGR1), then the (absolute value −2) is encoded using the EG Code with order one (S4303). Following this the sign information is encoded using bypass bin (S4304). If MVDxGR0 was true and MVDxGR1 was not true, then just the sign information is encoded. If MVDxGR0 is not true, then the MVDx is zero. The same process is repeated to encode MVDy (S4313, S4314).

Affine Coding

Prior video coding standards have only considered translational motion model. However, the underlying motion may incorporate effects such as zooming, rotation, panning and other irregular motions. In order to capture this nature of motion, the latest video coding standard introduced Affine motion coding, where by the irregular characteristics of the motion information can be captured using either a 4-parameter or a 6-parameter Affine motion model.

If a 4 parameter model is used, then 2 control points are generated and if the 6-parameter model is used 3 control points are used. FIG. 16, previously described, illustrates the concept of affine motion more clearly. By using the 4-parameter model, the current block is encoded using two control point motion vectors given by v_0 (cpmv_0) and v1 (cpmv_1).

Once these control points are derived, the MVF for each of the 4×4 sub-blocks is described by the following equation 22.

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$ [Equation 22]

Where (v_0x, v_0 y) is motion vector of the top-left corner control point, and (v_1x, v_1y) is motion vector of the top-right corner control point. The motion vector of each 4×4 sub-block is calculated by deriving the motion vector of the center sample of each sub-block as illustrated in the FIG. 27, previously described.

Embodiment 1

In an embodiment of the disclosure, there is proposed a method for utilizing the correlation between motion vector differences (MVDs) of control points and removing redundancy by coding some control points based on differences between control points.

In the disclosure, for convenience of description, a case where an affine motion model using four parameters is applied, that is, a case where the upper left and upper right control points are used for affine motion prediction, is mainly described, but the disclosure is limited thereto. Even when a motion model using six parameters is applied, or when three or more control points are used through other cases, the difference transmission method between MVDs proposed in the disclosure may be applied in substantially the same/similar manner.

That is, in the embodiment of the disclosure, the encoder/decoder may use the correlation between the upper left and upper right control points and redundancy between MVDs by coding any one control point (e.g., the upper right control point) using the MVD difference between the upper left and upper right control points.

According to an embodiment, the decoder may restore (or derive) the MVD of the upper right control point by decoding the MVD of the upper left control point according to a conventional MVD coding method, decoding the difference between the MVDs of the upper left and upper right control points to the MVD of the upper left control point, and adding the difference between the MVDs of the upper left and upper right control points to the MVD of the upper left control point.

According to the disclosure, the MVD difference between the upper left control point and the upper right control point may be shortly referred to as an MVD difference (or difference MVD), but the disclosure is not limited thereto.

FIG. 44 is a view illustrating a method for deriving affine motion vector difference information according to an embodiment of the disclosure.

Referring to FIG. 44, the following description focuses primarily on a decoder for convenience of description, but the disclosure is not limited thereto, and the method of signaling MVD information according to an embodiment of the disclosure may be performed in an encoder and a decoder in substantially the same manner. Although it is described above in connection with FIG. 44 that two control points at the upper left and upper right sides are used for affine prediction, the disclosure is not limited thereto. For example, although three control points at the lower left, upper left, and upper right sides are used, the same may be applied likewise.

According to an embodiment of the disclosure, the encoder/decoder may encode/decode the MVD of the upper right control point using the difference between the MVDs of the upper left and upper right control points.

The decoder identifies whether affine prediction (or affine motion prediction) is applied to the current block (S4401). When affine prediction is not applied to the current block, the decoder parses the MVD of the current block (S4402).

When affine prediction is applied to the current block, the decoder parses the MVD difference flag (S4403) and identifies whether the MVD difference is used in the current block based on the MVD difference flag (S4404). If the MVD difference is not used in the current block, the decoder parses the MVDs for the upper left and upper right control points in the same way as conventional (S4405).

When the MVD difference is used in the current block, the decoder parses the MVD of the upper left control point and parses the MVD difference (S4406). The decoder may restore (or derive or obtain) the MVD of the upper right control point by adding the MVD difference to the MVD of the upper left control point.

In one embodiment, a syntax element may be transmitted through a bit stream to achieve the proposed method. For example, a flag (or syntax element), e.g., is_delta_affine_MVD, indicating that the MVD difference has been used (or whether the MVD difference is activated) may be transmitted through the bit stream. Further, a flag (or syntax element) that is used at a slice, coding tree unit, or coding unit level and indicates whether the MVD difference is used in a corresponding level unit may be transmitted from the encoder to the decoder. Table 2 below shows possible use of a high-level syntax in a bit stream when the MVD difference flag is used.

TABLE 2

| high_level_parameter_set( ) { | Description |
|---|---|
| ... | |
| is_delta_affine_MVD | u (1) |
| ... | |

In Table 2, when is_delta_affine_MVD is 1, it indicates that is_delta_affine_MVD is present in a slice header of a non-IDR picture of a coded video sequence (CVS). When is_delta_affine_MVD is 0, it indicates that is_delta_affine_MVD does not exist in the slice header and that the adaptive difference MVD according to the present embodiment is not used in CVS.

Further, in an embodiment, a syntax element for indicating whether the difference MVD according to the present embodiment is applied at a slice, coding tree unit, or coding unit level may be additionally signaled. For example, a syntax structure according to Table 3 below may be defined.

TABLE 3

| slice_segment_header( ) { | Description |
|---|---|
| ... | |
| if(is_delta_affine_MVD) | |
| slice_delta_mvd | u (1) |
| ... | |
| } | |
| ... | |

In Table 3, if slice_delta_mvd is 0, it indicates that the current CU (or current slice) does not use the MVD difference (or MVD difference function), and if slice_delta_mvd is 1, it indicates that the CU uses the MVD difference. Further, in Table 6, it is assumed that a syntax element indicating whether to apply the MVD difference is included in the slice segment header, but the disclosure is not limited thereto and may be included in syntax of various levels. For example, a syntax element indicating whether to apply the MVD difference may be included in the coding tree unit syntax and the coding unit syntax.

Further, in another embodiment, the MVD difference may always be applied (or used) without signaling whether to use.

Embodiment 2

In an embodiment of the disclosure, a method for determining whether to use the MVD difference based on a threshold is proposed to control the use of the MVD difference technique. This ensures a higher level of correlation between the upper left MVD and the upper right MVD prior to applying the proposed method, thereby increasing the flexibility and further enhancing the accuracy of the first embodiment described above. As an example, the threshold may be determined in various ways. For example, the threshold may adopt an empirical value or may be derived from basic data statistics. An example in which the threshold is used is described below with reference to the drawings.

FIG. 45 is a view illustrating a method for deriving motion vector difference information based on a threshold according to an embodiment of the disclosure.

Referring to FIG. 45, the following description focuses primarily on a decoder for convenience of description, but the disclosure is not limited thereto, and the method of signaling MVD information according to an embodiment of the disclosure may be performed in an encoder and a decoder in substantially the same manner. Although it is described above in connection with 45 that two control points at the upper left and upper right sides are used for affine prediction, the disclosure is not limited thereto. For example, although three control points at the lower left, upper left, and upper right sides are used, the same may be applied likewise.

According to an embodiment of the disclosure, the encoder/decoder may encode/decode the MVD of the upper right control point using the difference between the MVDs of the upper left and upper right control points and, in this case, a threshold may be used.

The decoder identifies whether affine prediction (or affine motion prediction) is applied to the current block (S4501). When affine prediction is not applied to the current block, the decoder parses the MVD of the current block (S4502).

When affine prediction is applied to the current block, the decoder parses the MVD difference flag (S4503) and identifies whether the MVD difference is used in the current block based on the MVD difference flag (S4504). If the MVD difference is not used in the current block, the decoder parses the MVDs for the upper left and upper right control points in the same way as conventional (S4505).

When the MVD difference is used in the current block, the decoder parses the threshold (S4506). The decoder parses the MVD of the upper left control point based on the parsed threshold and parses the MVD difference (S4507). The decoder may restore (or derive or obtain) the MVD of the upper right control point by adding the MVD difference to the MVD of the upper left control point.

In one embodiment, the threshold may be used to compare a difference between the MVDs of the upper left control point and the upper right control point. That is, when the difference between the MVDs of the upper left control point and the upper right control point is greater than the threshold, the proposed MVD difference method may not be applied. If the difference between the MVDs of the upper left control point and the upper right control point is less than or equal to the threshold, the MVD difference method may be applied.

A different threshold may be set per picture, slice, CTU, or CU. In this case, the threshold may be transmitted in each header, or may be extended and transmitted in another header. Alternatively, the threshold may be kept fixed. In this case, syntax parsing or additional overhead signaling may not be required.

Embodiment 3

In an embodiment of the disclosure, other context models and binarization methods may be additionally applied to the above-described embodiments. That is, in the above-described embodiments 1 and 2, since the upper-right control point is coded based on a difference between the MVDs of the upper-left and upper-right control points, it is advantageous that it does not share the same context model with the upper left control point in performing entropy coding on MVDx_GR0, MVDy_GR0, and MVDx_GR1 and MVDy_GR1 flags. This is because there is a high possibility that the default probability of MVD is different from the probability obtained from coding on the upper right control point by using the difference MVD.

Here, MVDx_GR0 and MVDy_GR0 are flags indicating whether the horizontal and vertical components, respectively, of the MVD are greater than 0. MVDx_GR1 and MVDy_GR1 are flags indicating whether the horizontal and vertical components, respectively, of the MVD are greater than 1.

Accordingly, in an embodiment of the disclosure, the encoder/decoder may use different context models in performing entropy coding on syntax elements indicating MVD information for the upper right control point and the upper left control point. Further, in an embodiment, different binarization techniques for syntax elements indicating MVD information for the upper right control point and the upper left control point may be used to enhance compression performance.

Embodiment 4

In an embodiment of the disclosure, there is proposed a vector coding technique for jointly coding the MVDs of upper left and upper right control points for each of horizontal and vertical components. This embodiment independently derives the correlation between the upper left and upper right control points of the horizontal and vertical components by data statistics.

FIG. 46 is a view illustrating a vector coding method for an affine motion vector difference according to an embodiment of the disclosure.

FIG. 46 is derived from data statistics using frequency analysis. Although it is described above in connection with FIG. 46 that two control points at the upper left and upper right sides are used for affine prediction, the disclosure is not limited thereto. For example, although three control points at the lower left, upper left, and upper right sides are used, the same may be applied likewise. Further, in FIG. 46, a method for performing vector coding on the MVD of the horizontal component (i.e., the x-axis component) is described, and the same may be applied to the MVD of the vertical component (i.e., the y-axis component).

As an example, the MVD horizontal components on the upper left and upper right sides may be displaced and distributed in an elliptical shape as illustrated in FIG. 46. Here, the center point in the position (0, 0) which is not shaded indicates that the MVD horizontal components of the upper left and upper right control points correspond to 0. The center point corresponds to a MVD combination that occurs most frequently in the data set. FIG. 46 may be regarded as a grid having positive and negative MVD values.

Further, a block adjacent to the center point means an increase or decrease in MVD value at a single control point or both control points. Frequency analysis of data suggests that certain groups of MVD values occur with similar probabilities. That is, blocks illustrated in the same pattern in FIG. 46 may be classified into one group, and MVD values within each group may be generated with similar probabilities according to data frequency analysis.

Consequently, in the disclosure, a layer representing an MVD combination (or group) having a similar probability of occurrence is defined. In one embodiment, four layers may be defined as illustrated in FIG. 46. In another embodiment, it may be extended to incorporate several different layers. However, according to data analysis, it may be identified that most of the data may be processed by the layers illustrated in 46.

FIG. 47 is a view illustrating a vector coding method for an affine motion vector difference according to an embodiment of the disclosure.

Referring to FIG. 47, two layers as described above in connection with FIG. 46 are shown as an example. An unshaded first layer and a shaded second layer are shown.

The first layer includes a center point of the (0,0) position, and the second layer includes some of the coordinates adjacent to the center point.

Referring to FIGS. 46 and 47, the MVD value generally increases as each concentric circle (i.e., layer) increases. As described above, the vertical component of MVD also exhibits the same characteristics. Data analysis suggests that there is a high correlation between the affine MVDs of the upper left and upper right control points, which may be jointly used.

The method described above in connection with FIG. 39 may be applied to the coding structure according to an embodiment of the disclosure. Referring back to FIG. 39 described above, in step S3907, the decoder does not individually parse the MVD of the upper left control point and the MVD of the upper right control point, but parses the MVDs of the upper left and upper right control points together (or simultaneously).

In an embodiment, whether to use (or apply) a vector coding scheme may be activated/deactivated through a flag syntax. In this case, the decoder may perform an additional check to determine whether the CU should be coded in the vector coding mode.

FIG. 48 is a parsing flowchart for MVD components according to an embodiment of the disclosure.

Referring to FIG. 48, the encoder/decoder encodes/decodes the level for the horizontal component of the upper left and upper right control point MVDs (S4801) and encodes/decodes the level of the vertical component of the upper left and upper right control point MVDs. (S4802). That is, the encoder/decoder may parse the MVDs of the upper left and upper right control points together (or simultaneously).

As an embodiment, the encoder/decoder may determine (or derive) final MVD horizontal/vertical components by obtaining layer information for the horizontal/vertical components and then encoding/decoding index information indicating specific coordinates in the layer.

FIG. 49 is a view illustrating a coding structure of a motion vector difference performed based on vector coding according to an embodiment of the disclosure.

Referring to FIG. 49, the following description focuses primarily on a decoder for convenience of description, but the disclosure is not limited thereto, and the method of signaling affine motion vector difference information according to an embodiment of the disclosure may be performed in an encoder and a decoder in substantially the same manner.

In an embodiment of the disclosure, MVDs for upper left and upper right control points may be coded together based on vector coding. In FIG. 49, a method for performing vector coding on the MVD of the horizontal component (i.e., the x-axis component) is described, and the same may be applied to the MVD of the vertical component (i.e., the y-axis component). FIG. 49 corresponds to the MVDx_LT_MVDx_RT_Vector_Level analysis step of step S4801 of FIG. 48.

The decoder parses a flag (i.e., Layer$_x$_GT0) indicating whether the layer of the horizontal components of the MVDs of the upper left and upper right control points is larger than layer 0 (i.e., the first layer) (S4901). The layer 0 indicates a layer including the center point of the (0,0) position. If the flag is false, all of the horizontal components of the control points correspond to 0, and in this case, the decoder performs an MVDy_LT_MVDy_RT_Vector_Level analysis step (i.e., S4802 in FIG. 48).

If Layer$_x$_GT0 is true, the decoder parses a first index indicating a bin coded with two contexts (S4902 and S4903). The first index may determine (i) whether the target MVDx combination is in layer 1 (i.e., the second layer), and if so, which index it corresponds to in the corresponding layer, or (ii) whether the decoding needs to perform a process for checking a subsequent layer (S4904). For example, the first index may have the results of {(0,0), (0,1), (1,0), (1,1)}. If the first index value is (0,0), it indicates that the target MVD combination does not exist in the current layer and a subsequent layer need be checked. The remaining three combinations represent index values indicating specific coordinates within the layer.

That is, if the first index value is not (0, 0), the MVD horizontal components of the upper left and upper right control points are derived (or obtained) based on the first index value (S4905). In one embodiment, the MVD horizontal component of the upper left control point may be derived by performing a right shift operation by 2 for the first index, and the MVD horizontal component of the upper right control point may be derived by performing an AND operation of the first index and 2.

If the first index value is (0, 0), the decoder increases the layer to a next layer (i.e., the third layer) and then parses layer and/or index information (S4906). In an embodiment, the layer and index information may be parsed using an exponential Golomb code having an exponential Golomb parameter of 1 (i.e., order of 1). Then, the decoder identifies whether it is included in the third layer based on the index information (S4907 and S4909) and determines an exact combination of MVDx based on the index information in the layer determined based thereupon (S4908, S4910, and S4911). The index information in step S4906 may be a first index or a second index that is additionally parsed in step S4906.

The decoder parses sign information for the final MVDx values of the upper left and upper right control points (S4912). When the above-described process is complete, the decoder derives the MVD vertical component by performing the step of determining MVDy_LT_MVDy_RT_Vector_ Level (i.e., S4802 in FIG. 48).

To integrate a more general structure, a coding structure resultant from modifying the conventional structure by the above-described embodiments is described below.

FIG. 50 is a view illustrating a coding structure of a motion vector difference performed based on vector coding according to an embodiment of the disclosure.

Referring to FIG. 50, the following description focuses primarily on a decoder for convenience of description, but the disclosure is not limited thereto, and the method of signaling affine motion vector difference information according to an embodiment of the disclosure may be performed in an encoder and a decoder in substantially the same manner. No duplicate description related to FIG. 55 is given below.

In the embodiment of the disclosure, the decoder parses the Layerx_GT0 flag indicating whether it is larger than a first layer (the layer having a layer value of 0) (S5001) and, if the Layerx_GT0 flag is true (S5002), parses the Layerx_GT1 layer indicating whether it is larger than a second layer (the layer having a layer value of 1) (S5503).

If the value of Layerx_GT1 is 0 (i.e., when belonging to the first layer), the decoder parses a first index and decodes the horizontal component of the MVD based on the value of the index (S5004 to S5008). In this case, the value of the first index may have a value of 0 or 1. If it has a value of 0, the horizontal components of the MVDs of the upper left and upper right control points all may have a value of 1. Otherwise, it may be determined as a combination of (1, 0) or (0, 1).

If the value of Layerx_GT1 is 1, the decoder parses the remaining layer information indicating a specific layer among the subsequent layers and a second index (S5009). The remaining layer may have a value obtained by subtracting 2 from the current layer (or the final layer). In one embodiment, the decoder may decode the remaining layer information and/or the second index using an exponential Golomb code having an exponential Golomb parameter of 1 (i.e., order of 1) and/or truncated binarization (TB) (or truncated unary binarization). Further, the decoder may determine the current layer by adding the remaining layer to the first layer value.

The decoder identifies whether the second index is less than or equal to the current layer (S5010). Once the index is decoded, a combination of MVD values needs to be determined. To this end, an additional check may be performed to determine an exact MVD combination, i.e., whether the index is equal to or smaller than the layer ID. According to the result of the check, the MVD (LTx, RTx) having the second index smaller than or equal to the current layer may be determined to have a value equal to (index, Layer Id) (S5011).

The decoder identifies whether the second index is less than twice the current layer (S5012). If the index is less than twice the layer, MVD (LTx, RTx) may be determined to have the same value as (Layer Id, 2*Layer Id−index) (S5013). Otherwise, the MVD (LTx, RTx) may be determined to have the same value as (Layer Id+2*Layer Id−index, 2*Layer Id−index) (S5014). Then, sign information is parsed (S5015). The layer information and index coding described above are examples, and the disclosure is not limited thereto.

As an embodiment of the disclosure, the following methods may be applied to the embodiments described above.
Context model may be varied
Different binarization techniques may be applied.
When exponential Golomb code is used, different Golomb orders may be used.
Layer information and index may be coded with only the exponential Golomb code.

Embodiment 5

In an embodiment of the disclosure, a method for jointly coding MVDs for x and y components using vector coding techniques is proposed. In the above-described embodiment, the correlation between the horizontal and vertical components of the MVDs of the left (LT) and right (RT) control points is used only for the affine motion model. Hereinafter, a generalized MVD coding method that is not limited to the affine motion model and retains the previously described layer and index concept is proposed.

FIG. 51 is a view illustrating a vector coding method for a motion vector difference according to an embodiment of the disclosure.

FIG. 51 may be derived using data statistics using frequency analysis. Referring to FIG. 51, it is shown that when the x-MVD components (i.e., the horizontal direction components of the MVD) are divided for the y-MVD components, each layer may form a rhombus shape. In the structure illustrated in FIG. 51, the center point (i.e., the position where the value is 0) indicates the position where the MVDx and MVDy values are 0 (i.e., 0,0 marked next to FIG.).

The center point (0,0) corresponds to an MVD combination that most frequently occurs in the data set. In this case, FIG. 51 may be regarded as a grid having positive and negative MVD values, and in a block adjacent to the center point, the MVD value may increase or decrease along the horizontal or vertical axis.

According to the data frequency analysis, the MVD values of a specific group may occur with similar probabilities. As a result, according to an embodiment of the disclosure, a layer representing MVD combinations having similar probabilities may be defined. The layers illustrated in FIG. 51 are an example, and may be extended to include several other layers. Further, in this embodiment, sign information may not be separately coded, which may save signaling bits. As an embodiment, the MVD may be encoded/decoded using layer and index information.

FIG. 52 is a view illustrating a vector coding method for a motion vector difference based on a layer structure according to an embodiment of the disclosure.

Referring to FIG. 52, for convenience of description in applying an embodiment of the disclosure, the description focuses primarily on a decoder, but the MVD coding method according to an embodiment of the disclosure may be applied to an encoder in substantially the same manner.

Referring to FIG. 52, to decode the MVD of the current block, the decoder first parses a Layer GRT0 flag indicating whether the layer is greater than 0 (S5201). In the disclosure, the layer (or layer ID) may have an integer (i.e., 0, 1, 2, 3, 4, . . . ) in ascending order from 0. In the disclosure, when the layer is 0, the layer is a layer that comes first and may be referred to as the first layer, and similarly, when the layer is 1, the layer is a layer that comes second and may be referred to as the second layer. That is, a layer ID and a layer order may have a difference of 1 in value. When the Layer GRT0 flag is 0 (i.e., false), both the MVDx and MVDy values may be determined to be 0.

If the Layer GRT0 flag is true, the decoder parses the Layer GRT1 flag (S5202 and S5203). In the disclosure, the Layer GRT0 flag and the Layer GRT1 flag are not limited by their names. If the Layer GRT1 flag is true, the current layer is 2 or more, and the decoder parses Rem_Layer indicating the remaining layer information (S5205). The remaining layer (i.e., Rem_Layer) may be a value obtained by subtracting 2 from the current layer (or the final layer). In one embodiment, the decoder may decode the remaining layer information using an exponential Golomb code having an exponential Golomb parameter of 1 (i.e., order of 1) and/or truncated binarization (TB) (or truncated unary binarization). When the Layer GRT1 flag is true, the current layer is 1, and the index to be decoded may be placed in the second layer.

The decoder parses an index indicating a specific MVD combination in the determined current layer (S5206). In one embodiment, the decoder may decode the index using an exponential Golomb code having an exponential Golomb parameter of 1 (i.e., order of 1) and/or truncated binarization (TB) (or truncated unary binarization).

The decoder derives the MVD based on the determined current layer and index values (S5207).

According to conventional video compression techniques, the horizontal component (x) and the vertical component (y) of the MVD are individually encoded/decoded. However, as described above, according to data analysis based on frequency analysis, the horizontal component and the vertical component of the MVD may have a mutual correlation and are highly likely to belong to the same layer in the layer structure according to an embodiment of the disclosure.

Accordingly, according to an embodiment of the disclosure, the MVD coding efficiency may be significantly increased by coding the horizontal and vertical components of the MVD together based on layer information and index information.

Embodiment 6

In one embodiment of the disclosure, a specific method for finally deriving MVD based on the index parsed in the decoding structure of embodiment 5 is described. That is, in steps S5206 and S5207 of FIG. 52 described above, the MVD (x, y) value may be determined according to a method as described below. In the disclosure, for convenience of description, layer may be referred to as Lyr, and index may be referred to as idx.

First, when the layer is 1, MVDs in the horizontal and vertical directions may be determined according to Equation 23 below.

$$MVD_x=((idx \leq Lyr)?idx:(Lyr<<1)-idx)$$

$$MVD_y=((idx \leq Lyr)?!idx:(idx==2?-1:0)) \quad \text{[Equation 23]}$$

Referring to Equation 23, when idx≤Lyr, MVD_x may be determined as idx, and when idx>Lyr, MVD_x may be determined as (Lyr<<1)−idx. Here, << denotes an operator of left shifting the left value by the right value. When idx≤Lyr, MVDy may be determined as !idx, and when idx>Lyr, MVDy may be determined as (idx==2?−1:0).

First, when the layer is larger than 1, MVDs in the horizontal and vertical directions may be determined according to Equation 24 below.

$$MVD_x=(idx \leq Lyr?idx:(idx \leq ((Lyr<<1)+Lyr)? \\ (Lyr<<1)-idx:idx-(Lyr<<2))$$

$$MVD_y=((idx \leq (Lyr<<1))?Lyr-idx:idx-((Lyr<<1)+ \\ Lyr)) \quad \text{[Equation 24]}$$

Referring to Equation 24, when idx≤Lyr, MVD_x may be determined as idx, and when idx>Lyr, MVD_x is (idx≤ ((Lyr<<1) Lyr)?(Lyr<<1)−idx:idx−(Lyr<<2). When idx≤ (Lyr<<1), MVD_y may be determined as Lyr-idx, and when idx>(Lyr<<1), MVD_y may be determined as idx− ((Lyr<<1) Lyr).

Likewise, the index within the layer may be determined according to a method as described below. As an embodiment, it may be determined by the encoder according to the following method, or it may be predefined in the encoder and the decoder in the same method.

First, when MVD_x and MVD_y are 0, the layer (or layer ID) may be determined as 0.

If the layer is 1, the index may be determined (or calculated) using Equation 25 below.

$$idx=(MVD_x \geq 0)?(Lyr-MVD_y):(Lyr<<1)-MVD_x) \quad \text{[Equation 25]}$$

Referring to Equation 25, when MVD_x is greater than or equal to 0, the index may be derived as Lyr−MVD_y, otherwise, the index may be derived as (Lyr<<1)−MVD_x.

If the layer is greater than 1, the index may be derived using Equation 26 below.

$$idx=(MVD_x \geq 0)?(Lyr-MVD_y):((MVD_y \leq 0)?((Lyr<<1)-MVD_x):(((Lyr<<1)+MVD_y)))$$ [Equation 26]

Referring to Equation 26, when MVD_x is greater than or equal to 0, the index may be derived as Lyr−MVD_y, otherwise, the index may be derived as (MVD_y≤0)? ((Lyr<<1)−MVD_x):((((Lyr<<1) Lyr)+MVD_y).

In one embodiment, Table 4 below illustrates a layer and index table according to a combination of horizontal and vertical components of the MVD. That is, the index value may be allocated according to a combination of the horizontal and vertical components of the MVD as shown in Table 4 below by applying the above-described methods.

TABLE 4

| $MVD_x$ | $MVD_y$ | Layer | Index |
|---|---|---|---|
| 0 | 0 | 0 | — |
| 0 | 1 | 1 | 0 |
| 1 | 0 | 1 | 1 |
| 0 | −1 | 1 | 2 |
| −1 | 0 | 1 | 3 |
| 0 | 2 | 2 | 0 |
| 1 | 1 | 2 | 1 |
| 2 | 0 | 2 | 2 |
| 1 | −1 | 2 | 3 |
| 0 | −2 | 2 | 4 |
| −1 | −1 | 2 | 5 |
| −2 | 0 | 2 | 6 |
| −1 | 1 | 2 | 7 |
| ... | ... | ... | ... |

FIG. 53 is a view illustrating an example structure of a decoding apparatus according to an embodiment of the disclosure.

The decoding apparatus illustrated in FIG. 53 may be included in the encoding apparatus 200 of FIG. 2 (or the inter predictor 260 or the motion information derivation unit 262 of FIG. 11).

The layer and index information receiver (or a receiving component) 121 may receive layer and index information. In this case, the methods described above in connection with Embodiments 5 and 6 may be applied.

The MVDx and MVDy processor (or a processing component) 122 may decode MVDx and MVDy using the determined layer information and index information. As an example, Equations 23 to 26 described above may be used to determine the MVDx and MVDy components.

FIG. 54 is a view illustrating an example structure of an encoding apparatus according to an embodiment.

The encoding apparatus illustrated in FIG. 54 may be included in the encoding apparatus 100 of FIG. 1 (or the inter predictor 180 or the motion information derivation unit 182 of FIG. 9).

The encoding apparatus may perform operations opposite to the above-described operations of the decoding apparatus.

First, the input receiver 131 receives a signed MVD (x, y) as an input for entropy coding.

The layer and index information generator (or a generating component) 132 generates layer and index information. As an example, Equations 23 to 26 described above may be used to determine layer and index information.

Thereafter, the entropy encoder (or a component for entropy coding) 133 entropy-codes the determined layer and index information.

The embodiments of the disclosure described above have been separately described for convenience of description, but the disclosure is not limited thereto. In other words, the embodiments described above in connection with embodiments 1 to 5 may be performed independently or in combination of one or more thereof.

FIG. 55 is a flowchart illustrating a method for processing a video signal based on inter prediction according to an embodiment of the disclosure.

Referring to FIG. 55, the following description focuses primarily on a decoder for convenience of description, but the disclosure is not limited thereto. The method for processing video signals based on inter prediction according to embodiments of the disclosure may be performed in an encoder and a decoder in the same manner.

The decoder derives a motion vector predictor using motion information for a neighboring block of a current block (S5501).

The decoder parses layer information indicating a current layer to which a motion vector difference used for inter prediction of the current block belongs, in a predefined layer structure (S5502). Here, in the layer structure, a combination of at least one horizontal and vertical directions (or components) of motion vector differences may be divided into a plurality of layers.

The decoder parses index information indicating a specific combination in the current layer (S5503).

The decoder derives a motion vector difference of the current block using the layer information and the index information (S5504).

The decoder derives a motion vector of the current block by adding the motion vector difference to the motion vector predictor (S5505).

As described above, parsing the layer information may include parsing a first flag indicating whether an identification (ID) of the current layer is larger than 0 and, when the ID of the current layer is 0, parsing a second flag indicating whether the ID of the current layer is larger than 1.

As described above, parsing the layer information may include parsing remaining layer information indicating the current layer among layers whose IDs are equal to or larger than 2 when the ID of the current layer is larger than 1.

As described above, the remaining layer information may be binarized using an exponential Golomb code having an order of 1.

As described above, the index information may be binarized using a truncated binarization method.

As described above, the method may further comprise generating a prediction sample of the current block by performing inter prediction using the motion vector of the current block.

FIG. 56 is a block diagram illustrating an example device for processing video signals according to an embodiment of the disclosure. The image signal processing device of FIG. 56 may correspond to the encoding device 100 of FIG. 1 or the decoding device 200 of FIG. 2.

The video signal processing device 5600 for processing video signals may include a memory 5620 for storing video signals and a processor 5610 coupled with the memory to process video signals.

According to an embodiment of the disclosure, the processor 5610 may be configured as at least one processing circuit for processing image signals and may execute instructions for encoding or decoding image signals to thereby process image signals. In other words, the processor 5610 may encode raw image data or decode encoded image signals by executing encoding or decoding methods described above.

FIG. 57 illustrates a video coding system to which the disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 58 is a configuration diagram of a content streaming system as an embodiment to which the disclosure is applied.

Referring to FIG. 58, the content streaming system to which the disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an Ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for processing a video signal based on inter prediction by an apparatus, the method comprising:
    deriving a motion vector predictor based on motion information for a neighboring block of a current block;
    parsing layer information indicating a current layer to which a motion vector difference used for inter prediction of the current block belongs, in a predefined layer structure in which combinations of at least one horizontal and vertical components of motion vector differences are divided into a plurality of layers;
    parsing index information indicating a specific combination in the current layer;
    deriving a motion vector difference of the current block using the layer information and the index information; and
    deriving a motion vector of the current block by adding the motion vector difference to the motion vector predictor,
    wherein parsing the layer information includes:
        parsing a first flag indicating whether an identification (ID) of the current layer is larger than 0, and
        parsing a second flag indicating whether the ID of the current layer is larger than 1 when the ID of the current layer is larger than 0.

2. The method of claim 1, wherein
    parsing the layer information includes parsing remaining layer information indicating the current layer among layers whose IDs are equal to or larger than 2 when the ID of the current layer is larger than 1.

3. The method of claim 2, wherein
    the remaining layer information is binarized using an exponential Golomb code having an order of 1.

4. The method of claim 1, wherein
    the index information is binarized using a truncated binarization scheme.

5. The method of claim 1, further comprising:
    generating a prediction sample of the current block by performing inter prediction using the motion vector of the current block.

6. A method of encoding a video signal based on inter prediction by an apparatus, the method comprising:
    deriving a motion vector of a current block based on the inter prediction;
    deriving a motion vector predictor based on motion information for a neighboring block of the current block;
    generating a motion vector difference of the current block based on the motion vector and the motion vector predictor of the current block;
    generating layer information indicating a current layer to which the motion vector difference belongs, in a predefined layer structure in which combinations of at least one horizontal and vertical components of motion vector differences are divided into a plurality of layers; and
    generating index information indicating a specific combination in the current layer,
    wherein generating the layer information includes:
        generating a first flag indicating whether an identification (ID) of the current layer is larger than 0, and
        generating a second flag indicating whether the ID of the current layer is larger than 1 when the ID of the current layer is larger than 0.

7. The method of claim 6, wherein generating the layer information includes:
 generating remaining layer information indicating the current layer among layers whose IDs are equal to or larger than 2 when the ID of the current layer is larger than 1.

8. The method of claim 7, further comprising:
 binarizing the remaining layer information using an exponential Golomb code having an order of 1.

9. The method of claim 6, further comprising:
 binarizing the index information using a truncated binarization scheme.

10. The method of claim 6, further comprising:
 generating a residual sample of the current block by performing the inter prediction using the motion vector of the current block.

11. A non-transitory computer-readable storage medium for encoded image information generated by performing steps of:
 deriving a motion vector of a current block based on inter prediction;
 deriving a motion vector predictor based on motion information for a neighboring block of the current block;
 generating a motion vector difference of the current block based on the motion vector and the motion vector predictor of the current block;
 generating layer information indicating a current layer to which the motion vector difference belongs, in a predefined layer structure in which combinations of at least one horizontal and vertical components of motion vector differences are divided into a plurality of layers; and
 generating index information indicating a specific combination in the current layer,
 wherein generating the layer information includes:
  generating a first flag indicating whether an identification (ID) of the current layer is larger than 0, and
  generating a second flag indicating whether the ID of the current layer is larger than 1 when the ID of the current layer is larger than 0.

* * * * *